United States Patent
Tsubota et al.

(10) Patent No.: US 10,366,477 B2
(45) Date of Patent: Jul. 30, 2019

(54) IMAGE PROCESSING APPARATUS AND IMAGE PROCESSING METHOD

(71) Applicant: PANASONIC INTELLECTUAL PROPERTY MANAGEMENT CO., LTD., Osaka (JP)

(72) Inventors: Kazuhiro Tsubota, Kanagawa (JP); Ryoji Ogino, Kanagawa (JP); Kojiro Iwasaki, Tokyo (JP); Mikio Morioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 7 days.

(21) Appl. No.: 15/802,677

(22) Filed: Nov. 3, 2017

(65) Prior Publication Data
US 2018/0053286 A1  Feb. 22, 2018

Related U.S. Application Data

(63) Continuation of application No. 15/183,197, filed on Jun. 15, 2016, now Pat. No. 9,836,829, which is a
(Continued)

(30) Foreign Application Priority Data

Jan. 31, 2012 (JP) .................................. 2012-017576
Feb. 10, 2012 (JP) .................................. 2012-027160
(Continued)

(51) Int. Cl.
*G06T 5/00*   (2006.01)
*H04N 7/18*   (2006.01)
(Continued)

(52) U.S. Cl.
CPC ............ *G06T 5/006* (2013.01); *G06K 9/2081* (2013.01); *G06T 3/00* (2013.01); *G06T 5/001* (2013.01);
(Continued)

(58) Field of Classification Search
None
See application file for complete search history.

(56) References Cited

U.S. PATENT DOCUMENTS

| | | | |
|---|---|---|---|
| 4,862,388 A | 8/1989 | Bunker | |
| 7,218,342 B2 | 5/2007 | Kobayashi et al. | |

(Continued)

FOREIGN PATENT DOCUMENTS

| | | |
|---|---|---|
| JP | 8-055133 | 2/1996 |
| JP | 11-250238 | 9/1999 |

(Continued)

OTHER PUBLICATIONS

Takahashi et al., "Visual Features Extraction for Human Identification with Privacy Protection," ITE Technical Report, vol. 36, No. 18, pp. 23-26, Mar. 23, 2012.
(Continued)

*Primary Examiner* — Iman K Kholdebarin
(74) *Attorney, Agent, or Firm* — Greenblum & Bernstein, P.L.C.

(57) ABSTRACT

A method for processing an image includes receiving an input image having distortion, receiving position information input by a user on the received input image, generating a first image by correcting the input image having distortion, and translating a position on the input image having distortion indicated by the received position information into a position on the generated first image. The method further includes setting, on the generated first image, a first mask area having a predetermined shape and including the posi-
(Continued)

tion on the generated first image translated from the position on the input image having distortion, and performing mask processing on the set first mask area on the generated first image.

17 Claims, 62 Drawing Sheets

Related U.S. Application Data continuation of application No. 14/444,275, filed on Jul. 28, 2014, now Pat. No. 9,396,529, which is a continuation-in-part of application No. PCT/JP2013/000423, filed on Jan. 28, 2013.

(30) Foreign Application Priority Data

Mar. 2, 2012 (JP) ................................ 2012-047166
Mar. 29, 2012 (JP) ............................... 2012-075741

(51) Int. Cl.
*G06T 3/00* (2006.01)
*H04N 5/232* (2006.01)
*H04N 5/262* (2006.01)
*G06T 5/20* (2006.01)
*H04N 1/387* (2006.01)
*G06K 9/20* (2006.01)

(52) U.S. Cl.
CPC ............ *G06T 5/20* (2013.01); *H04N 1/3872* (2013.01); *H04N 5/23238* (2013.01); *H04N 5/2628* (2013.01); *H04N 7/18* (2013.01); *H04N 1/387* (2013.01)

(56) References Cited

U.S. PATENT DOCUMENTS

| | | | |
|---|---|---|---|
| 7,366,359 B1 | 4/2008 | Davey et al. | |
| 7,893,959 B2 * | 2/2011 | Miyata | ............. G08B 13/19686 348/153 |
| 8,015,511 B2 | 9/2011 | Krasnoperova | |
| 8,223,214 B2 | 7/2012 | Toguchi | |
| 8,417,059 B2 | 4/2013 | Yamada | |
| 9,396,529 B2 * | 7/2016 | Tsubota | .................... G06T 3/00 |
| 9,532,008 B2 | 12/2016 | Ohnishi | |
| 9,836,829 B2 * | 12/2017 | Tsubota | .................... G06T 3/00 |
| 2003/0227555 A1 | 12/2003 | Kobayashi et al. | |
| 2004/0227978 A1 * | 11/2004 | Enomoto | ................ G06T 5/006 358/3.26 |
| 2005/0135700 A1 | 6/2005 | Anderson | |
| 2008/0036877 A1 | 2/2008 | Arima | |
| 2009/0160996 A1 | 6/2009 | Yamaoka et al. | |
| 2009/0207269 A1 | 8/2009 | Yoda | |
| 2009/0244327 A1 * | 10/2009 | Toguchi | ............... H04N 5/2353 348/239 |
| 2010/0002070 A1 | 1/2010 | Ahiska | |
| 2010/0142838 A1 * | 6/2010 | Ivansen | ............... G03F 7/70291 382/243 |
| 2012/0113209 A1 | 5/2012 | Ritchey | |
| 2014/0085514 A1 * | 3/2014 | Lin | ........................ H04N 5/217 348/241 |
| 2014/0160282 A1 | 6/2014 | Yamagi | |
| 2018/0053286 A1 * | 2/2018 | Tsubota | .................... G06T 3/00 |

FOREIGN PATENT DOCUMENTS

| | | |
|---|---|---|
| JP | 2002-010063 | 1/2002 |
| JP | 2002-268624 | 9/2002 |
| JP | 2004-15362 | 1/2004 |
| JP | 3996805 | 10/2007 |
| JP | 2008-61172 | 3/2008 |
| JP | 2009-038646 | 2/2009 |
| JP | 2009-081496 | 4/2009 |
| JP | 2009-194687 | 8/2009 |
| JP | 2009-239499 | 10/2009 |
| JP | 2010-178160 | 8/2010 |
| JP | 2011-061511 | 3/2011 |
| WO | 2007/055336 | 5/2007 |
| WO | 2012/001947 | 1/2012 |

OTHER PUBLICATIONS

Japan Office Action, issued in Japan Patent Application No. 2017-030820, dated Mar. 6, 2018, together with an English language translation thereof.
Notice of Allowance issued in the related JP patent application No. 2017-030820, dated Jul. 3, 2018, together with an English language translation thereof.
Office Action issued in Japan Counterpart Patent Appl. No. 2013-556256, dated Oct. 18, 2016.
International Search Report from PCT/JP2013/000423, dated Apr. 9, 2013.
Office Action issued in counterpart JP patent application No. 2018-145254, dated May 7, 2019, together with an English machine translation thereof.

* cited by examiner $(x_0, y_0), (x_1, y_1)...$

IMAGE PROCESSING APPARATUS AND IMAGE PROCESSING METHOD

CROSS REFERENCE TO RELATED APPLICATIONS

This application is a continuation of U.S. application Ser. No. 15/183,197 filed on Jun. 15, 2016, which is a continuation of U.S. application Ser. No. 14/444,275 filed Jul. 28, 2014, which is a continuation-in-part of International Application No. PCT/JP2013/000423, filed Jan. 28, 2013, and also claims the benefits of Patent Application No. 2012-017576 filed in Japan on Jan. 31, 2012, Patent Application No. 2012-027160 filed in Japan on Feb. 10, 2012, Patent Application No. 2012-047166 filed in Japan on Mar. 2, 2012, and Patent Application No. 2012-075741 filed in Japan on Mar. 29, 2012, the contents of which are incorporated by reference herein in their entirety.

FIELD

The technology herein relates to an image processing apparatus and an image forming method that performs distortion correction processing for an image having distortion and performs masking processing for a partial area of the image having distortion.

BACKGROUND AND SUMMARY

Conventionally, monitoring cameras are often installed in public spaces such as a street. An image obtained by shooting with the monitoring camera may include an area unnecessary for monitoring purposes. Further, from a viewpoint of privacy protection, it may be undesirable to acquire and store a still image or a moving image of such an unnecessary area. In order to cope with this, there is known a shooting system that shoots a range to be monitored with a monitoring camera and performs masking processing for a partial area of an image obtained by the monitoring camera for privacy protection (for example, see Patent Literature 1 (JP 3996805 B2) and Patent Literature 2 (U.S. Pat. No. 7,366,359)).

An omnidirectional camera provided with a fish-eye lens and thus capable of shooting an omnidirectional image is sometimes used as a monitoring camera. An angle of view in such an omnidirectional camera is about 360°, and an omnidirectional image having a circular shape or a doughnut shape is obtained. In this omnidirectional image, uneven distortion occurs depending on location. In order to facilitate visualization of the circular or doughnut shaped omnidirectional image on a rectangular viewer screen, distortion correction processing is performed for the omnidirectional image. Specifically, for example, a partial area of the omnidirectional image is cut out, and then distortion correction processing is performed for the cut-out image, or distortion correction processing is performed for the omnidirectional image to develop the omnidirectional image into a panoramic image.

FIG. 41A illustrates an example of the omnidirectional image, FIG. 41B illustrates an example in which cut-out/distortion-corrected images corresponding to a plurality of cut-out ranges are displayed in a juxtaposed manner, together with the omnidirectional image, and FIG. 41C illustrates a display example of a panoramic image corresponding to the omnidirectional image of FIG. 41A. As illustrated in FIGS. 41A to 41C, when the omnidirectional image is obtained, a plurality of ways of distortion correction processing can be performed for the omnidirectional image.

As described above, the conventional monitoring camera can arbitrarily specify the cut-out range in the omnidirectional image, i.e., a cut-out view angle and a cut-out position and obtain a cut-out/distortion-corrected image corresponding to the cut-out view angle and position. Further, during shooting of a moving image, the cut-out range can be changed in real time. For example, a configuration is possible, in which the cut-out range is changed so as to follow a moving object detected in an image and, at the same time, the cut-out/distortion-corrected image corresponding to the cut-out range is generated.

When the masking processing is performed for the partial area on the omnidirectional image, distortion is removed from an unmasking area by performing the distortion correction processing; however, the masking area assumes a distorted shape in the distortion-corrected image and looks horrible.

In a monitoring camera system of Patent Literature 1, the masking area is displayed in a rectangle. FIG. 18 is a view for explaining processing performed in Patent Literature 1. In the drawing, P1 to P4 are each a vertex of the masking area, and MLU, MRU, MLD, and MRD are each a vertex of a rectangle formed by horizontal and vertical lines circumscribed to a figure surrounded by P1 to P4. In the monitoring camera system of Patent Literature 1, when the masking area surrounded by the P1 to P4 is distorted in a case where a configuration of a signal generation section limits the masking shape to a rectangle formed by horizontal and vertical lines, the area surrounded by the MLU, MRU, MLD, and MRD which is circumscribed to the figure surrounded by P1 to P4 is masked.

The monitoring camera system of Patent Document 1 is only configured to mask the rectangle formed by horizontal and vertical lines circumscribed to the area to be masked which is surrounded by the P1 to P4 along the requirement of the signal generation section, but not configured to deform the shape of the masking area from a viewpoint of improving appearance. That is, it is not always true that masking of the rectangle formed by the horizontal and vertical lines circumscribed to the masking area surrounded by P1 to P4 results in good visibility.

Further, it is difficult for a user to imagine how a shape of a masking area that the user specifies on the image having distortion changes on the distortion-corrected image. Particularly, a correction parameter to be used in distortion correction processing differs depending on the cut-out range, so that even if a masking area having the same shape and located at the same position as previous one is specified on the image having distortion, when a plurality of different cut-out ranges is set, it is very difficult to estimate how the masking area is deformed by the distortion correction processing to be performed for the individual cut-out range.

In a technology described in Patent Literature 2, a processing range is specified on a distortion-corrected image, and the specified processing range is projected onto a coordinate of the image having distortion before distortion correction processing. However, when the processing range is specified by a method as described in Patent Literature 2, that specifies an arbitrary range on the image having distortion, a shape of the range changes depending on presence/absence of the distortion correction processing, a difference in display mode, or an image cut-out position. This complicates the range specification to be conducted by a user, and a position of the specified range is difficult to understand. Further, in the technology described in Patent Literature 2, it is necessary to project a large number of coordinates before and after the distortion correction processing and, accordingly, an amount of information to be processed becomes extremely large.

A purpose of the present technology is to provide an improved image processing apparatus and an improved image processing method for providing a distortion-corrected image including a masking area.

The present disclosure provides an image processing apparatus that includes: a masking area retaining section that retains a masking area set for an image having distortion; a masking processing section that performs masking processing for the image having distortion using the masking area of the masking area retaining section; a distortion correction section that corrects the image having distortion that is subjected to the masking processing using a correction parameter for correcting distortion of the image having distortion; and a masking area shaping section that shapes the masking area of the corrected image into a predetermined shape.

As described below, the present technology has other aspects. Therefore, the disclosure of the technology is intended to provide some of the aspects of the technology, and is not intended to limit the scope of the technology as described and claimed herein.

DESCRIPTION OF EMBODIMENTS

Figure 1:
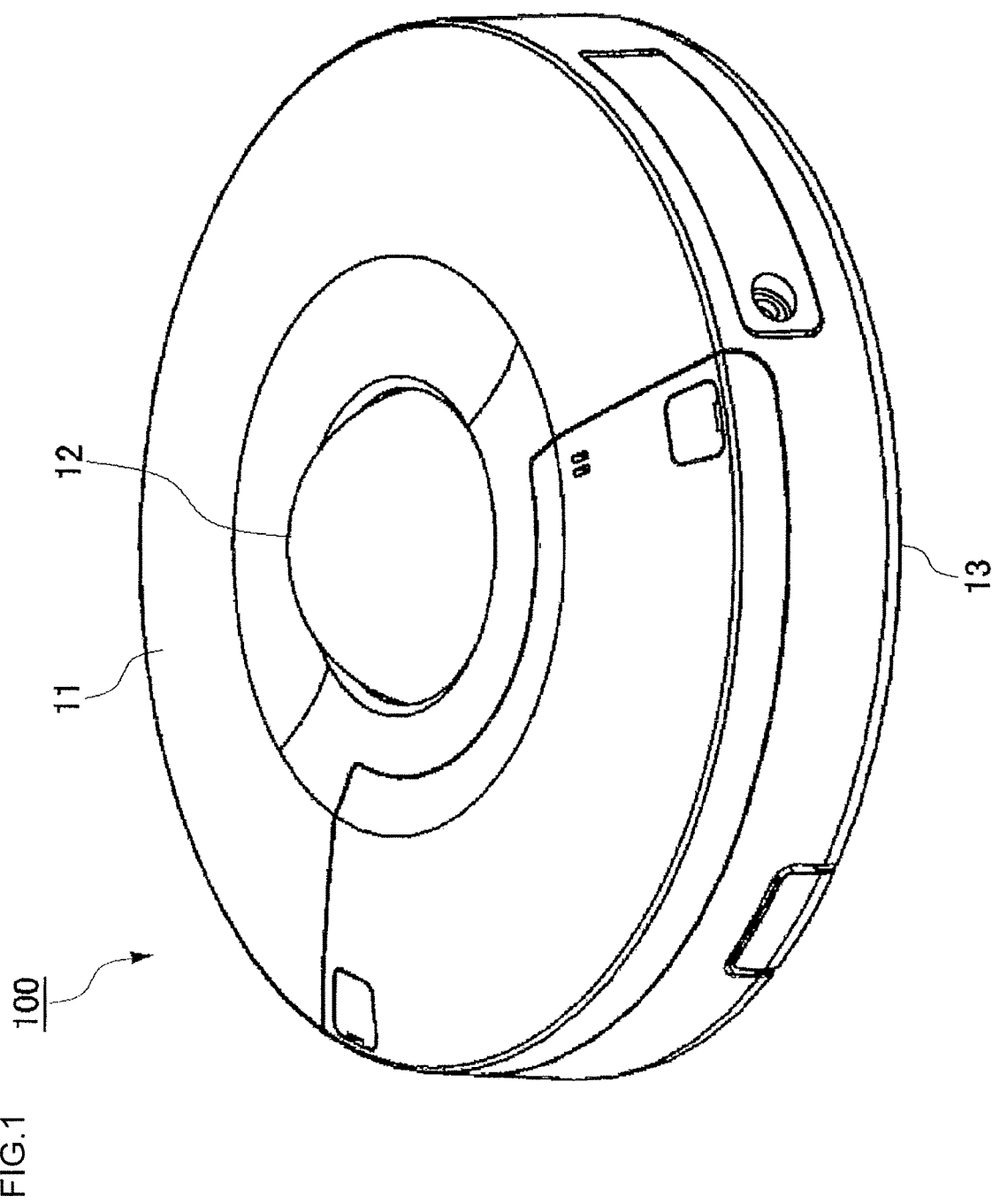
FIG. 1 is an outer appearance view of a camera in a first embodiment of the present technology.

Detailed description of the present technology will be described below. Embodiments to be described below are merely examples of the present technology and can be modified into various aspects. Thus, specific structures and functions disclosed herein do not limit the scope of the present technology.

An image processing apparatus according to one embodiment of the present technology includes: a masking area retaining section that retains a masking area set for an image having distortion; a masking processing section that performs masking processing for the image having distortion using the masking area of the masking area retaining section; a distortion correction section that corrects the image having distortion that is subjected to the masking processing using a correction parameter for correcting distortion of the image having distortion; and a masking area shaping section that shapes the masking area of the corrected image into a predetermined shape.

According to this configuration, appearance of the masking area on a distortion-corrected image obtained by correcting the distortion of the image having distortion is improved.

The image processing apparatus may include a masking area detection section that detects the masking area of the image corrected by the distortion correction section. The masking area shaping section may shape the masking area detected by the masking area detection section into a predetermined shape.

According to this configuration, the masking area detection section can detect the masking area from the distortion-corrected image and can thereby shape the detected masking area.

In the image processing apparatus, the masking area shaping section may shape the masking area into a rectangle surrounded by lines perpendicular and parallel to the image.

According to this configuration, the masking area can be shaped into a shape having improved appearance.

In the image processing apparatus, the masking are a shaping section may shape the masking area such that a line that is transformed into a curve by distortion correction processing by the distortion correction section is transformed into a straight line.

According to this configuration, the masking area can be shaped into a shape having improved natural appearance.

In the image processing apparatus, the image having distortion may be an image cut out from an omnidirectional image, and the masking area shaping section may shape the masking area according to a direction in which the image having distortion is cut out from the omnidirectional image.

According to this configuration, the masking area can be shaped such that an upright direction of a subject and that of the masking area coincide with each other on an image cut out from the omnidirectional image.

In the image processing apparatus, in performing the correction processing, the distortion correction section may linearly interpolate source coordinates for each square formed by a plurality of pixels to fill in pixels of corresponding coordinates, and the masking area shaping section may set the square including the corrected masking area as a masking area after shaping.

According to this configuration, the masking area is not formed into an area including a diagonal or a curved side but can be formed into a shape along a boundary of the square, thereby improving appearance of the masking area.

In the image processing apparatus, the masking area shaping section may set a plurality of squares including the squares that include the corrected masking area and formed into a rectangular shape as a whole as a masking area after shaping.

According to this configuration, the masking area can be shaped using the square used in the distortion correction processing, thereby improving appearance of the masking area.

The image processing apparatus may include an imaging section that inputs the image having distortion.

According to this configuration, appearance of the masking area on the distortion-corrected image obtained by correcting the distortion of the image having distortion input from the shooting section is improved.

In the image processing apparatus, the imaging section may include a fish-eye lens.

According to this configuration, an image having distortion with a wide view angle can be obtained in the shooting section, and appearance of the masking area on the distortion-corrected image obtained by correcting the distortion of the image having distortion is improved.

The image processing apparatus may include: a specification section that a user uses to specify, on the image having distortion, a masking area to be retained in the masking area retaining section; and a masking area correction section that corrects, by the correction parameter, the masking area specified by the specification section. The corrected masking area may be displayed simultaneously when the user specifies the masking area.

According to this configuration, when specifying a masking area, it is possible to confirm how the specified masking area is applied to the image having distortion.

The image processing apparatus may further include a specification section that a user uses to specify, on the image having distortion, a masking area to be retained in the masking area retaining section; and a masking area correction section that corrects, by the correction parameter, the masking area specified by the specification section. The corrected masking area may be displayed in a superimposed manner on the image having distortion when the user specifies the masking area.

According to this configuration, it is possible to confirm a specified masking area on the image having distortion.

An image processing apparatus according to another embodiment of the present technology includes: a masking area retaining section that retains a masking area set for an image having distortion; a masking area correction section that corrects the masking area of the masking area retaining section using a correction parameter for correcting the image having distortion; a masking area shaping section that shapes the masking area corrected by the masking area correction section into a predetermined shape; an inverse transform/correction section that performs inverse transform using the correction parameter for the masking area shaped by the masking area shaping section; a masking processing section that performs masking processing for the image having distortion using the masking area that is subjected to the inverse transform by the inverse transform/correction section; and a distortion correction section that corrects the image having distortion that is subjected to the masking processing using the correction parameter.

According to this configuration, it is possible to shape the masking area to be subjected to the correction processing into a shape with good visibility after the distortion correction processing to be performed for the image having distortion on which the masking processing is subjected to the masking area.

An image processing apparatus according to still another embodiment of the present technology includes: a masking area retaining section that retains a masking area set for an image having distortion; a distortion correction section that corrects the image having distortion using a correction parameter for correcting distortion of the image having distortion; a masking area correction section that corrects the masking area of the masking area retaining section using the correction parameter; a masking area shaping section that shapes the masking area corrected by the masking area correction section into a predetermined shape; and a masking processing section that performs masking processing for the masking area on the image corrected by the distortion correction section which is shaped by the masking area shaping section.

According to this configuration, both the image having distortion and masking area are corrected, and the masking area is then shaped into a shape with improved appearance to be applied to the distortion-corrected image.

An image processing method according to one embodiment of the present technology includes the steps of: acquiring an image having distortion; retaining a masking area set for the image having distortion; performing masking processing for the image having distortion using the masking area; correcting the image having distortion that is subjected to the masking processing using a correction parameter for correcting distortion of the image having distortion; and shaping the masking area of the corrected image into a predetermined shape.

Also according to this configuration, appearance of the masking area on a distortion-corrected image obtained by correcting the distortion of the image having distortion is improved.

Hereinafter, a shooting system according to respective embodiments of the present technology will be described using the drawings. A shooting system described herein is a system that processes a shot image, and a part of or the entire configuration of the shooting system can be regarded as an image processing apparatus.

1. First to Third Embodiments 1-1. First Embodiment

Figure 2:
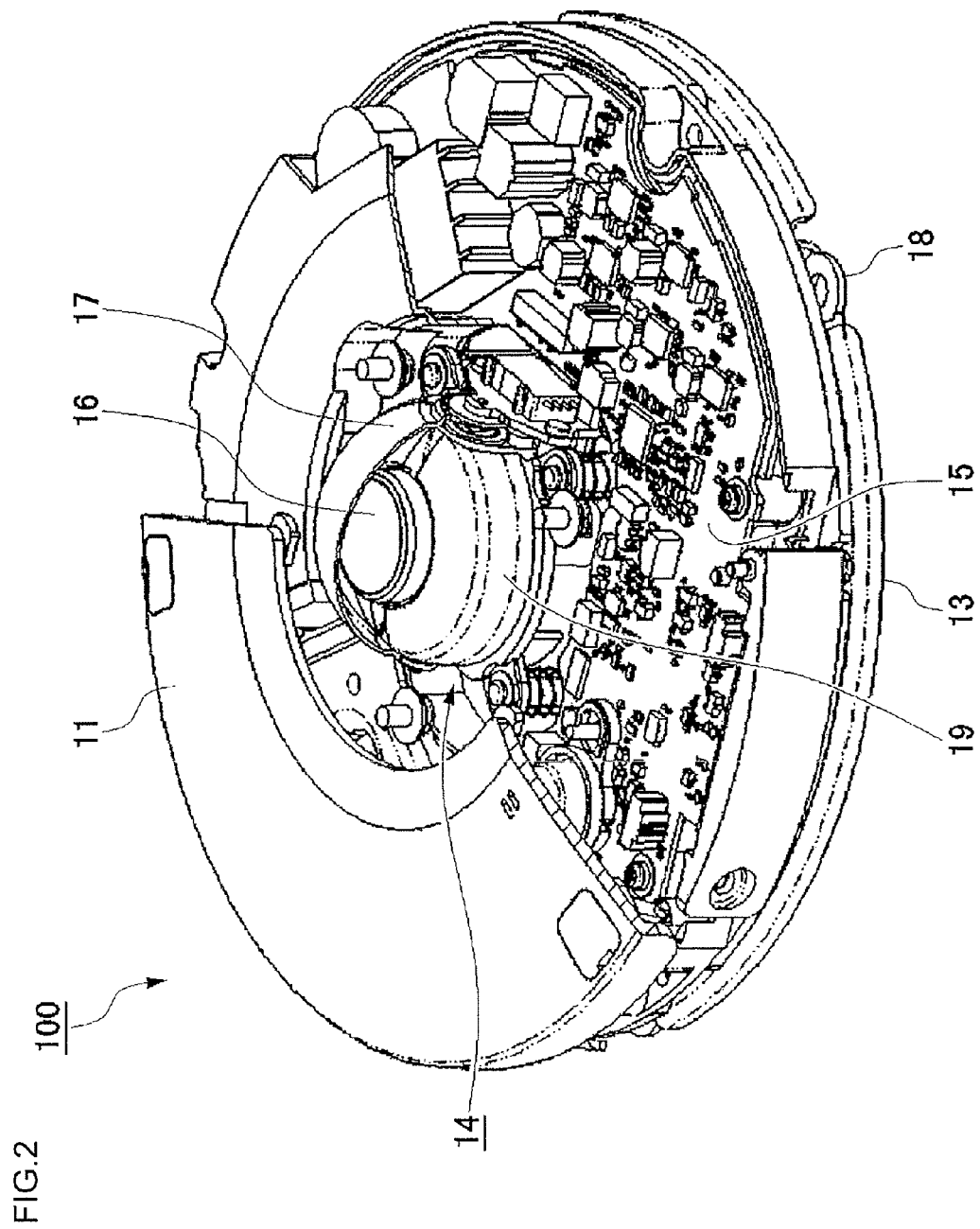
FIG. 2 is a partially cut perspective view of the camera in the first embodiment of the present technology.

First, a structure of a camera according to the present embodiment will be described. FIG. 1 is an outer appearance view of the camera in the present embodiment. FIG. 2 is a partially cut perspective view of the camera in the present embodiment. As illustrated in FIG. 1, a camera 100 has a casing 11, a dome cover 12, and a base 13. The camera 100 is used for monitoring, e.g., facilities and installed on a wall or a ceiling of the facilities. The casing 11 formed into an annular shape with synthetic resin is positioned at an outer periphery of the camera 100, and the dome cover 12 formed of transparent plastic is disposed at a center of the camera 100. An outer surface side of the base 13 is mounted to the wall or ceiling by mounting brackets 18. In this case, the dome cover 12 faces downward.

As illustrated in FIG. 2, a component housing space is formed around an optical unit 14 of the base 13, and a main board 15 for image processing and power supply is provided in the component housing space. A controller (not illustrated) provided with a CPU and a storage section is mounted on the main board 15. The optical unit 14 has a fish-eye lens 16 supported by a lens holder 19 and an openable/closable cover 17.

Figure 3:
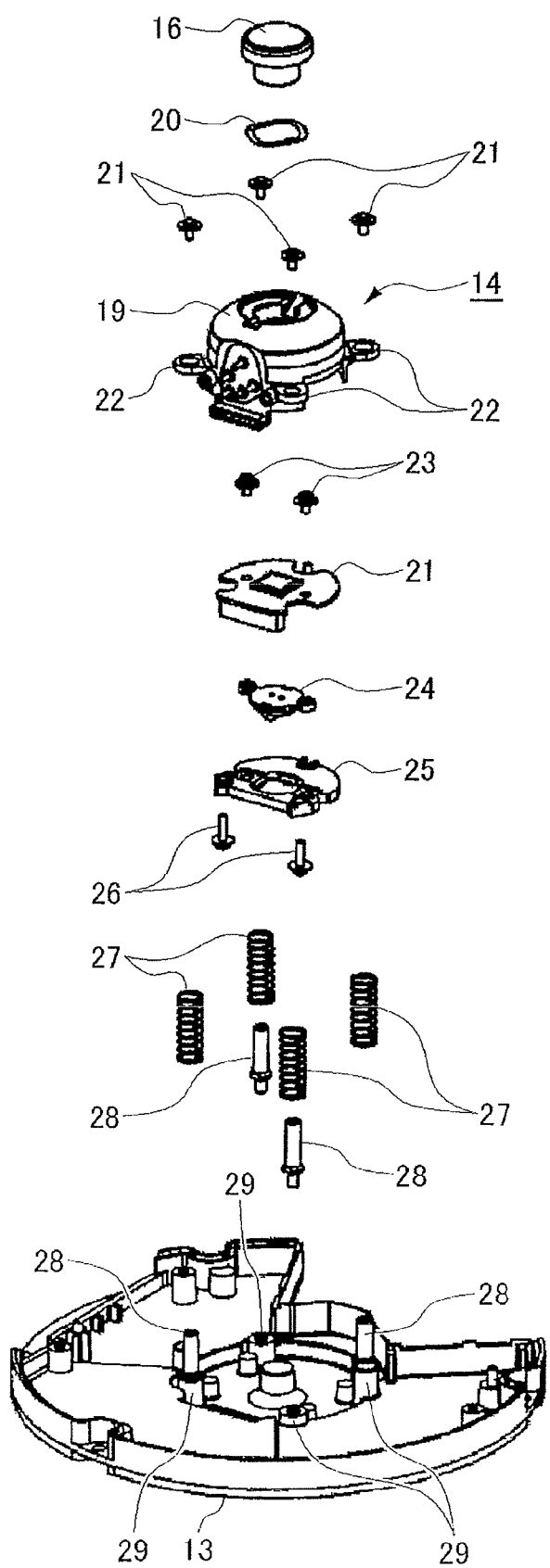
FIG. 3 is an exploded perspective view of an optical unit in the first embodiment of the present technology.

FIG. 3 is an exploded perspective view of the optical unit in the present embodiment. In FIG. 3, the fish-eye lens 16 is fitted to the lens holder 19 through a packing material 20. A MOS holder 24 is fixed to a sensor board 21 connected to the main board 15 by fixing screws 23. The sensor substrate 21 to which the MOS holder 24 is fixed to a lower surface side of the lens holder 19 by a MOS bracket 25 and fixing screws 26.

Four through holes 22 are provided at an outer periphery of the lens holder 19. Four fitting bosses 29 are provided from the base 13 and fix support posts 28, respectively. The support posts 28 each penetrates the through hole 22 of the lens holder 19 and fixed by fixing screws 21. A coil spring 27 is extrapolated between the base 13 and through holes 22 of the lens holder 19. The coil spring 27 biases upward the lens holder 19 relative to the base 13.

Figure 4:
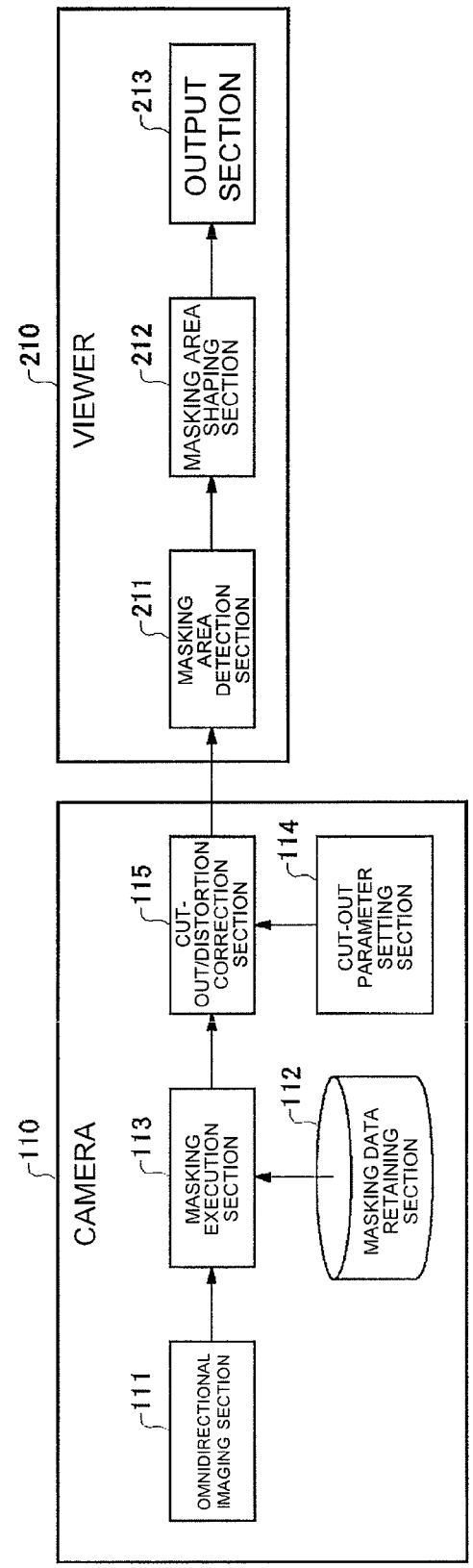
FIG. 4 is a block diagram illustrating a configuration of a shooting system according to the first embodiment of the present technology.

FIG. 4 is a block diagram illustrating a configuration of a shooting system according to the present embodiment. As illustrated in FIG. 4, a shooting system 101 according to the first embodiment includes a camera 110 and a viewer 210. The camera 110 is a monitoring camera installed at a place to be monitored. The viewer 210 is communicably connected to the camera 110 by wire or wireless. The viewer 210 is realized by, e.g., a computer having a monitor provided in a monitoring room or a mobile terminal carried by a monitoring person.

The camera 110 has an omnidirectional imaging section 111, a masking data retaining section 112, a masking execution section 113, a cut-out parameter setting section 114, and a cut-out/distortion correction section 115. The omnidirectional imaging section 111 is a well-known omnidirectional camera including a fish-eye lens, an imaging element on which light from a subject (monitoring target) traveling through the fish-eye lens, and a processing section that performs processing for image signals obtained by the imaging element to generate image data. The omnidirectional imaging section 111 outputs an omnidirectional image generated by shooting to the masking execution section 113.

The omnidirectional image is a circular or doughnut shaped image obtained by the fish-eye lens and having a horizontal view angle of about 360°. The omnidirectional image includes distortion, and a degree of the distortion increases with proximity to an outer periphery of the omnidirectional image. The viewer 210 can directly display such an omnidirectional image and, as described later, it can display an image from which the distortion is removed.

The masking data retaining section 112 retains data (hereinafter, referred to as "masking data" or "masking area") representing a masking area on the omnidirectional image. That is, the masking data retained by the masking data retaining section 112 is data indicating a shape of the masking area, a direction thereof, and a position thereof on the omnidirectional image. A user can set an arbitrary area in the omnidirectional image as the masking area. That is, the user can set a masking area having an arbitrary shape (e.g., a rectangle, an ellipse, a circle, and the like) at an arbitrary position in the omnidirectional image and store the set masking area in the masking data retaining section 112. A plurality of the masking areas may be set in the omnidirectional image.

The masking execution section 113 acquires the omnidirectional image from the omnidirectional imaging section 111 and performs masking processing for the masking area on which is set in the masking data retaining section 112. The masking processing is processing of reducing an amount of information obtained from the image and includes processing of filling the masking area with a predetermined color to reduce the information amount of the masking area to zero, processing (mosaic processing) of transforming the masking area into an image having a reduced resolution, processing of transforming the masking area into an image as if it is seen through an opaque glass, and the like. In the present embodiment, the processing of filling the masking area with one color is adopted.

The cut-out parameter setting section 114 sets a cut-out parameter indicating a cut-out range in the omnidirectional image. The cut-out parameter includes, e.g., center coordinates of the cut-out range, a zoom factor (size of the cut-out range on the omnidirectional image), and a cut-out direction. The cut-out/distortion correction section 115 cuts out the cut-out range identified by the cut-out parameter set by the cut-out parameter setting section 114 from the omnidirectional image on which the masking processing is performed for the massing area by the masking execution section 113 and performs correction so as to remove distortion to thereby generate a distortion-corrected image.

When the cut-out range is identified by the cut-out parameter setting section 114, a correction parameter for removal of the distortion from the cot-out range is uniquely determined, so that the cut-out parameter set in the cut-out parameter setting section 114 serves as the correction parameter to be used in processing by the cut-out/distortion correction section 115. The cut-out parameter set in the cut-out parameter setting section 114 may be set by user's specification. Alternatively, the cut-out parameter may be set such that the cut-out range includes an area including a predetermined subject recognized by image recognition processing that the camera 110 itself performed for the omnidirectional image.

The cut-out/distortion correction section 115 cuts out the cut-out range of the omnidirectional image on which the masking processing is performed for the masking area and performs distortion correction processing for the cut-out range to thereby generate a distortion-corrected image. The cut-out/distortion correction section 115 performs the distortion correction processing for the cut-out range of the omnidirectional image to thereby correct the masking area applied to the omnidirectional image. Upon generation of the distortion-corrected image in the cut-out/distortion correction section 115, the distortion-corrected image is transmitted to the viewer 210 through a not illustrated interface. The viewer 210 receives the distortion-corrected image.

The viewer 210 has a masking area detection section 211, a masking area shaping section 212, and an output section 213. The masking area detection section 211 acquires the distortion-corrected image transmitted from the camera 110 and detects the masking area from the distortion-corrected image. Since the masking area of the present embodiment is filled with one color, the masking area detection section 211 detects the corresponding area as the masking area. The detected masking area is output, together with the distortion-corrected image, to the masking area shaping section 212.

The masking area shaping section 212 shapes the masking area detected by the masking area detection section 211 into an easy-to-see shape by a method to be described later and then performs once again the masking processing on the distortion-corrected image. The output section 213 is a display device that displays the distortion-corrected image on which the second masking processing is performed by the masking area shaping section 212.

Figure 5:
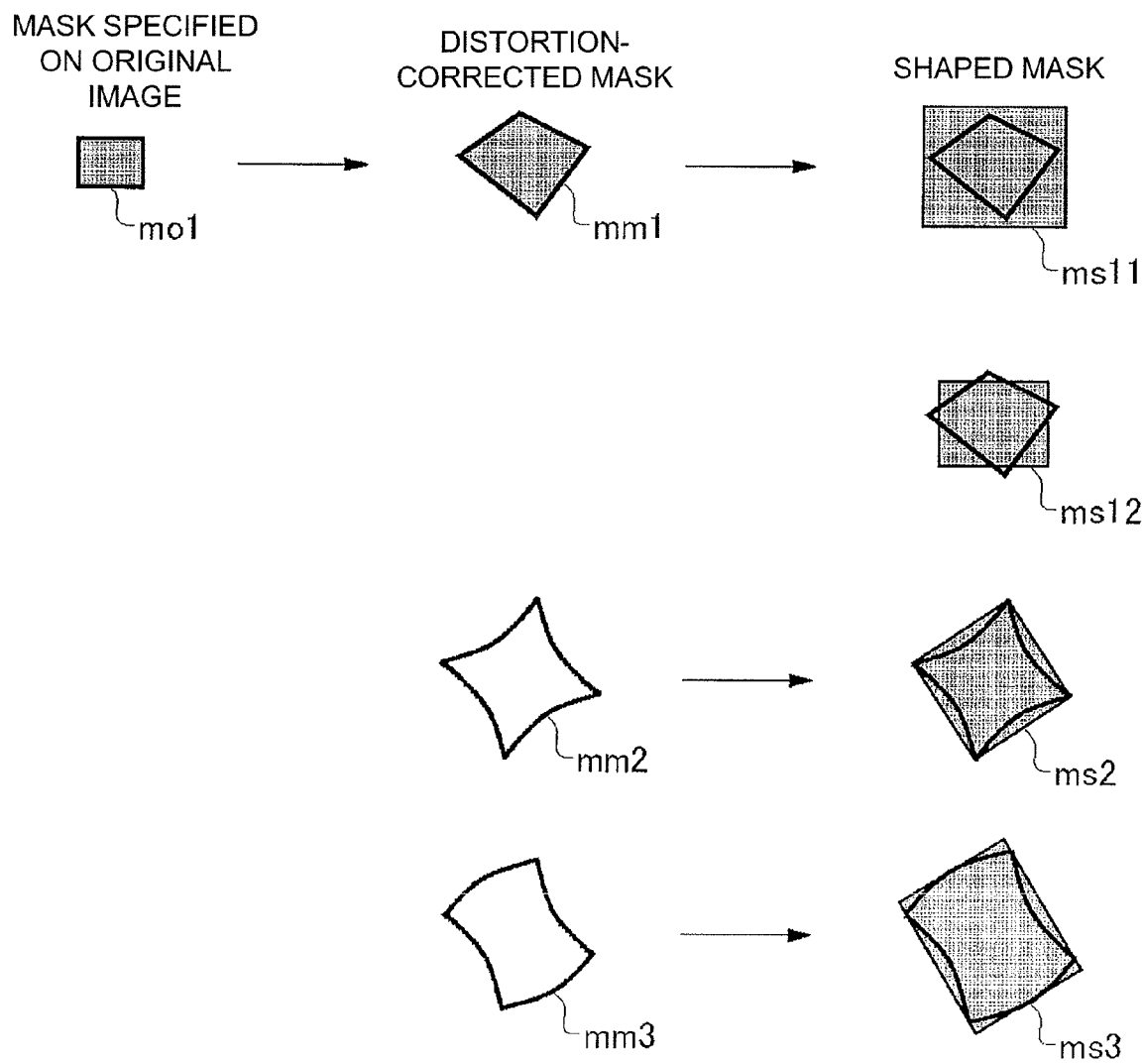
FIG. 5 is a view for explaining shaping of a masking area in the first embodiment of the present technology.

Hereinafter, the shaping of the masking area by the masking area shaping section 212 will be described. FIG. 5 is a view for explaining the shaping of the masking area by the masking area shaping section 212. In the example of FIG. 5, a rectangular masking area mo1 formed by horizontal and vertical sides included in the omnidirectional image as an original image is set in the masking data retaining section 112.

The masking area mo1 is applied to the omnidirectional image by the masking execution section 113, and the cut-out range of this omnidirectional image is corrected by the cut-out/distortion correction section 115. Then, the masking area mo1 is shaped into a masking area mm1 of FIG. 5. That is, the masking area applied to the omnidirectional image before the distortion correction processing assumes a rectangle formed by horizontal and vertical sides, i.e., a well-organized shape; however, after the distortion correction processing performed by the cut-out/distortion correction section 115, the masking area assumes a distorted quadrangle. The distortion-corrected masking area illustrated in FIG. 5 is just an example and, actually, the masking area assumes a shape determined by a distortion correction parameter determined by lens distortion, and the like, and may assume not only the quadrangle but also a shape including a curve.

The masking area shaping section 212 shapes the masking area assuming such a distorted quadrangle into a rectangle formed by horizontal and vertical sides including all or a part of the masking area. In FIG. 5, a shaped masking area ms11 assumes a rectangle formed by horizontal and vertical sides completely including the distorted quadrangle obtained as a result of the distortion correction processing, that is, having an area larger than the distorted quadrangle, a shaped masking area ms12 assumes a rectangle formed by horizontal and vertical sides including a part of the distorted quadrangle obtained as a result of the distortion correction processing. The masking area shaping section 212 performs once again the masking processing for the area of the rectangle ms11 or ms12.

In FIG. 5, a distortion-corrected masking area mm2 assumes a shape in which four sides are concave curves as a result of the distortion correction processing. The masking area shaping section 212 shapes the masking area mm2 such that the concave curves thereof each become a straight line. Further, in FIG. 5, a distortion-corrected masking area mm3 assumes a shape in which two opposing sides are concave curves and other two opposing sides are convex curves. The masking area shaping section 212 shapes the masking area mm3 such that the concave curves thereof each become a straight line and convex curves thereof each become a straight line.

Figure 6:
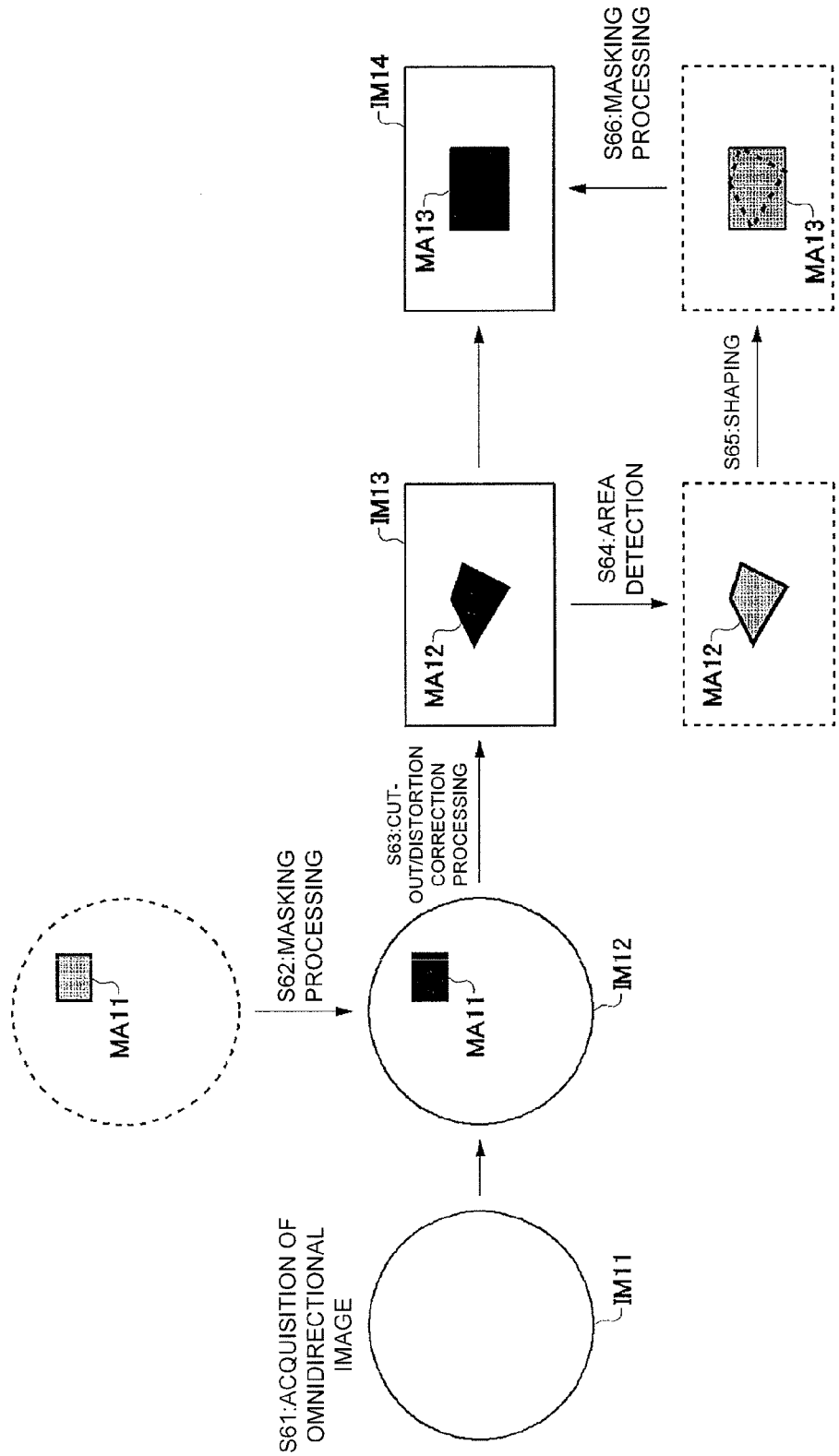
FIG. 6 is a view for explaining a flow of processing performed in the shooting system in the first embodiment of the present technology.

A flow of processing in the shooting system 101 having the above configuration will be described together with images and masking areas. FIG. 6 is a view for explaining the processing flow in the shooting system 101. The omnidirectional imaging section 111 shoots a place to be monitored to acquire an omnidirectional image IM11 (step S61). As illustrated in FIG. 6, the omnidirectional image IM11 is an image formed into a circle, in which a degree of the distortion increases with proximity to an outer periphery thereof. The masking execution section 113 performs, on the omnidirectional image IM11, the masking processing for a masking area MA11 read out from the masking data retaining section 112 (step S62). As a result, the omnidirectional image IM11 becomes an image IM12 on which the masking processing is performed for the masking area MA11.

The cut-out parameter (i.e., correction parameter) set by the masking data retaining section 112 is used to cut out the cut-out range from the image IM12 that is partially subjected to the masking processing as described above, and the distortion correction processing is performed for the cut-out range (step S63). As a result, the cut-out range that is subjected to the distortion correction processing is cut out from the omnidirectional image IM12 on which the masking processing is performed to obtain a distortion-corrected image IM13. The distortion-corrected image IM13 includes a masking area MA12. The masking area MA12 is an area resulting from the cut-out/distortion correction processing that the cut-out distortion correction section 115 performs for the original masking area MA11 and thus assumes a distorted shape.

The distortion-corrected image IM13 thus generated is transmitted from the camera 110 to the viewer 210 and then supplied to the masking area detection section 211 of the viewer 210. The masking area detection section 211 detects the masking area from the distortion-corrected image IM13 (step S64). When the masking area MA12 is detected, the masking area shaping section 212 shapes the masking area to obtain a shaped masking area MA13 (step S65). In the example of FIG. 6, the shaped masking area MA13 assumes a rectangle formed by horizontal and vertical sides surrounding the former distorted masking area MA12.

The masking area shaping section 212 performs the masking processing for the shaped masking area MA13 on the distortion-corrected image IM13 (step S66). The masking area shaping section 212 thus performs the masking processing for the rectangular masking area MA13 formed by horizontal and vertical sides to thereby obtain a distortion-corrected image IM14.

As described above, according to the first embodiment of the present technology, the masking processing is performed on the omnidirectional image having distortion with a desired area being set as the masking area, and then the distortion correction processing is performed for the resultant image. By the distortion correction processing, the distortion of an image other than the masking area is eliminated; however, the masking area assumes a distorted shape. Then, the masking area detection section 211 detects the masking area from the distortion-corrected image, and masking area shaping section 212 shapes the detected masking area into a shape with improved appearance, followed by the second masking processing. Thus, in the final distortion-corrected image, the masking area assumes a shape with improved appearance.

In the above-described first embodiment, the masking data retaining section 112, masking execution section 113, cut-out parameter setting section 114, and cut-out/distortion correction section 115 are provided in the camera 110, and the masking area detection section 211 and masking area shaping section 212 are provided in the viewer 210; however, each of the above constituent elements may be provided in any one of the camera 110 and viewer 210.

Figure 7:
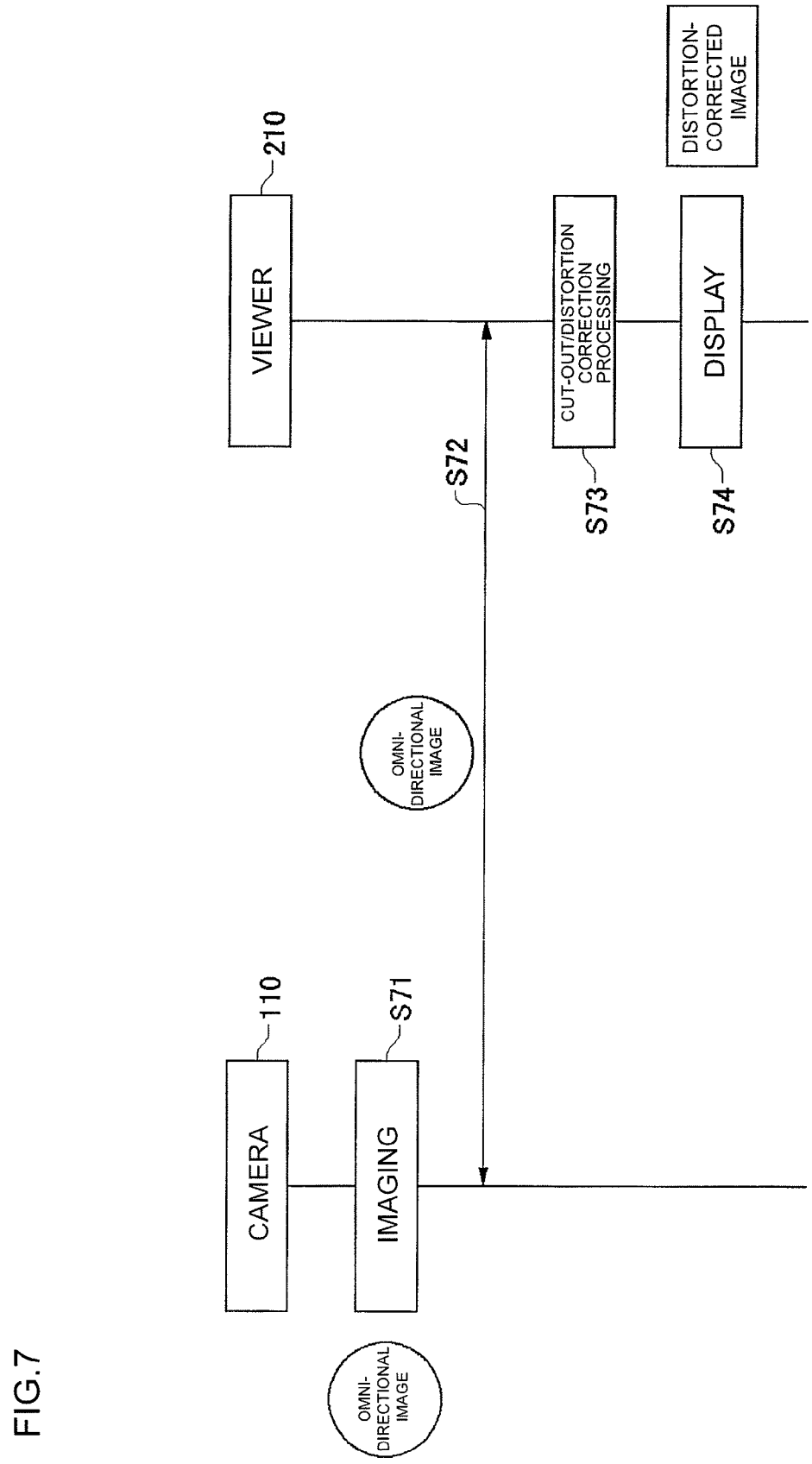
FIG. 7 is a view illustrating processing performed in a camera and a viewer and data exchange therebetween in a modification of the first embodiment of the present technology.

For example, the camera 110 may be provided with only the omnidirectional imaging section 111 and the viewer 210 may be provided with all the constituent elements other than the omnidirectional imaging section 111. FIG. 7 is a view illustrating processing performed in the camera 110 and viewer 210 and data exchange therebetween in this case. In this case, the omnidirectional imaging section 111 of the camera 110 performs imaging (step S71) to obtain an omnidirectional image and transmits the obtained omnidirectional image to the viewer 210 (step S72). In the viewer 210, the cut-out/distortion correction section 115 performs cut-out and correction processing of cutting out the cut-out range from the omnidirectional image and performing the distortion correction processing (step S73), and the output section 213 displays the distortion-corrected image (step S74). In FIG. 7, descriptions of the masking processing are omitted.

Figure 8:
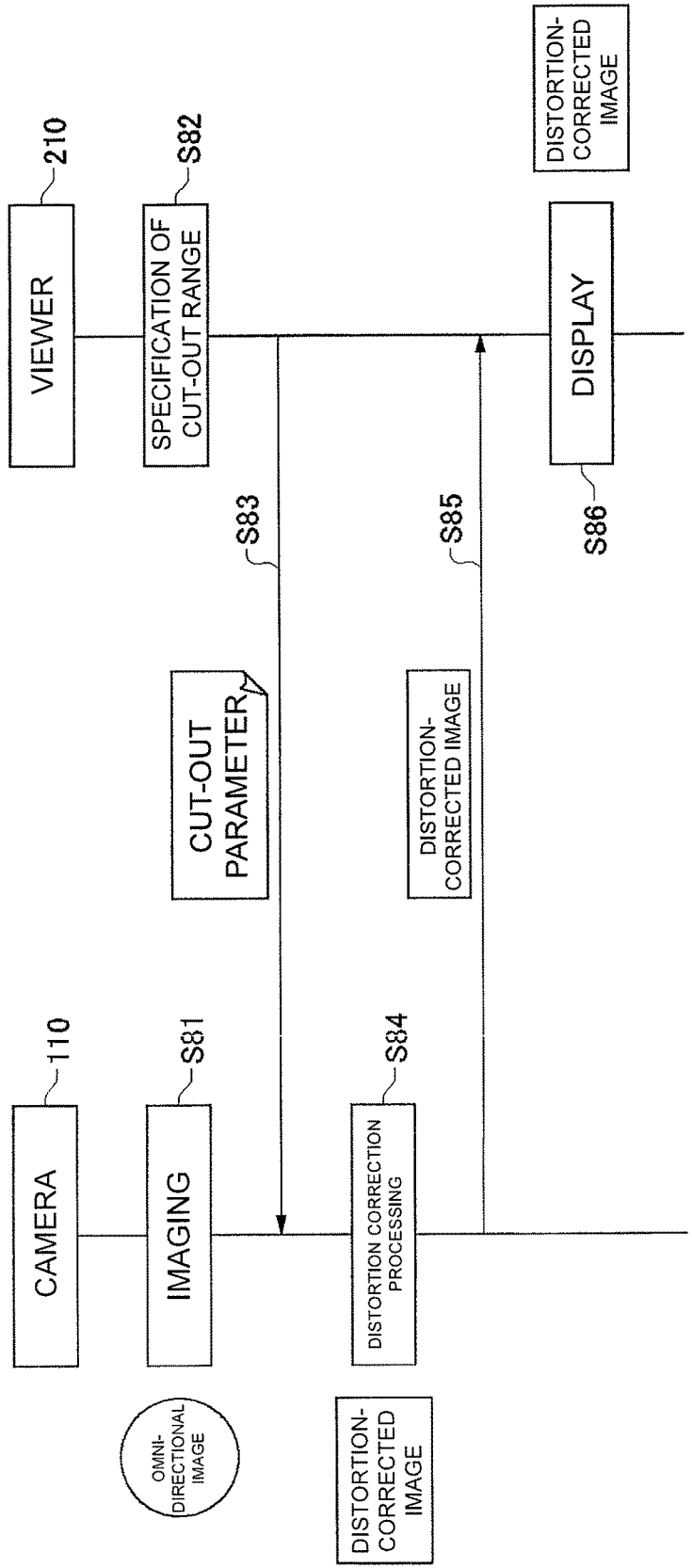
FIG. 8 is a view illustrating processing performed in the camera and viewer and data exchange therebetween in another modification of the first embodiment of the present technology.

FIG. 8 is a view illustrating processing performed in the camera 110 and viewer 210 and data exchange therebetween in a case where the shooting system 101 having the configuration illustrated in FIG. 4 is modified such that the cut-out parameter setting section 114 is provided in the viewer 210. In this case, the omnidirectional imaging section 111 of the camera 110 performs imaging (step S81), and the cut-out parameter setting section 114 of the viewer 210 specifies the cut-out range (step S82). Then, the cut-out parameter identifying the cut-out range is transmitted from the viewer 210 to the camera 110 (step S83).

The cut-out/distortion correction section 115 of the camera 110 uses the cut-out parameter as the correction parameter to perform the distortion correction processing for the omnidirectional image (step S84) to thereby obtain the distortion-corrected image. The obtained distortion-corrected image is transmitted from the camera 110 to the viewer 210 (step S85) and displayed on the output section 213 (step S86).

1-2. Second Embodiment

Figure 9:
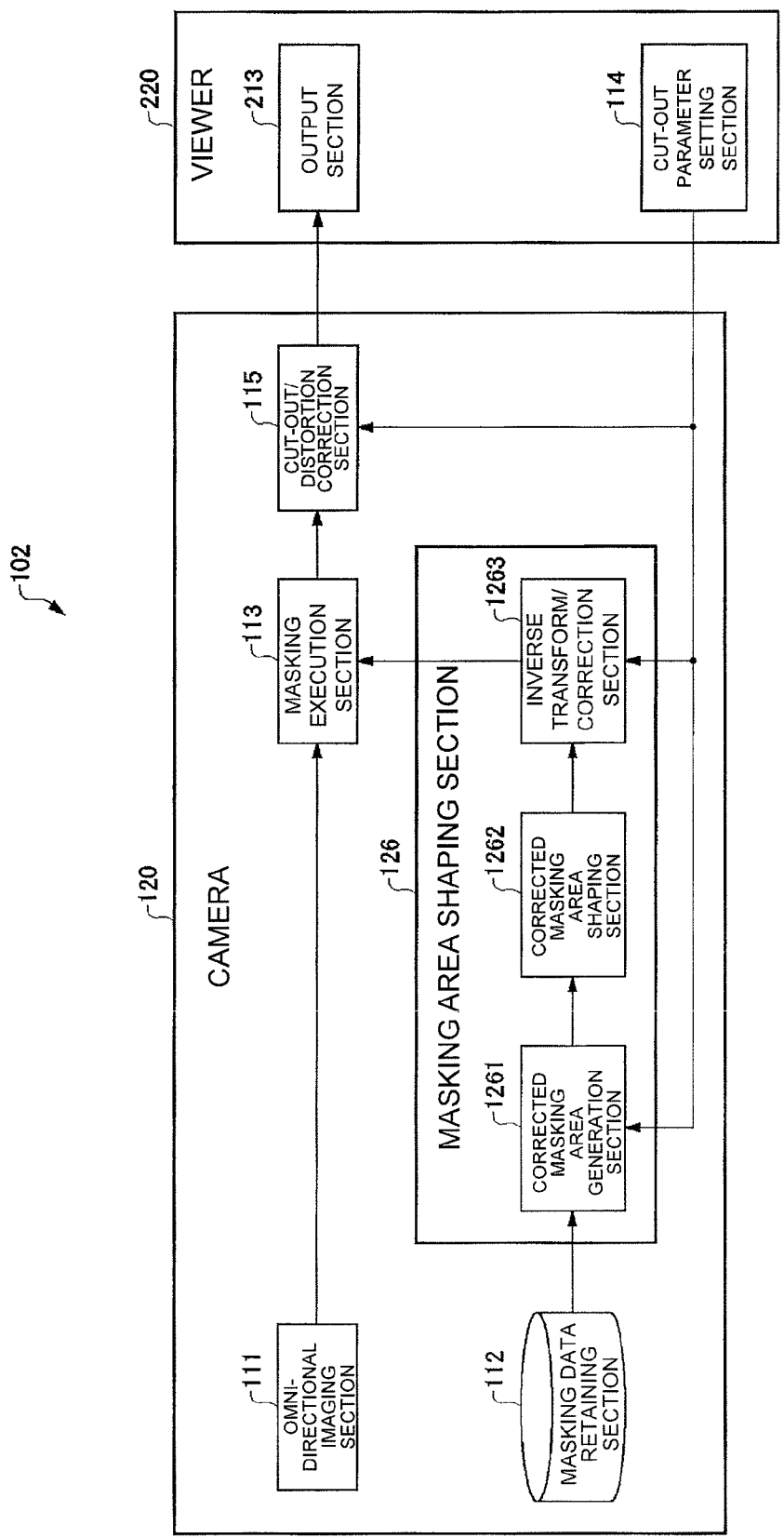
FIG. 9 is a block diagram illustrating a configuration of a shooting system according to a second embodiment of the present technology.

The following describes a second embodiment of the present technology. FIG. 9 is a block diagram illustrating a configuration of a shooting system according to a second embodiment of the present technology. As illustrated in FIG. 9, a shooting system 102 according to the second embodiment includes a camera 120 and a viewer 220. The same reference numerals are given to the same constituent elements of the camera 120 and viewer 220 as those of the camera 110 and viewer 210 of the first embodiment, and detailed descriptions thereof will be omitted.

The camera 120 has an omnidirectional imaging section 111, a masking data retaining section 112, a masking execution section 113, a cut-out/distortion correction section 115, and a masking area shaping section 126. In the present embodiment, the masking area shaping section 126 shapes the masking area read out from the masking data retaining section 112 such that the masking area assumes a shape with improved appearance as a result of the distortion correction processing that the cut-out/distortion correction section 115 performs therefor and supplies the resultant masking area to the masking execution section 113. Then, the masking execution section 113 performs, on the omnidirectional image, the masking processing for the previously shaped masking area, and the cut-out/distortion correction section 115 performs cut-out/distortion correction processing for the omnidirectional image on which the masking processing is performed for the masking area.

To this end, the camera 120 has the masking area shaping section 126 between the masking data retaining section 112 and masking execution section 113. The masking area shaping section 126 includes a corrected masking area generation section 1261, a corrected masking area shaping section 1262, and an inverse transform/correction section 1263. The cut-out parameter set by the cut-out parameter setting section 114 of the viewer 220 is transmitted from the viewer 220 to the camera 120 and supplied to the corrected masking area generation section 1261, inverse transform/correction section 1263, and cut-out/distortion correction section 115 of the camera 120.

The corrected masking area generation section 1261 reads out the masking area from the masking data retaining section 112 and uses the cut-out parameter as the correction parameter to correct the read out masking area to thereby generate a corrected masking area. The correction applied to the masking area is performed according the same method as that used in the distortion correction processing that the cut-out/distortion correction section 115 performs using the same cut-out parameter. As described above, the masking data retaining section 112 retains the rectangular masking area formed by horizontal and vertical sides. This rectangular masking area is subjected to the above-described correction that the corrected masking area generation section 1261 performs using the cut-out parameter, with the result that the corrected masking area assumes a distorted shape. The corrected masking area is supplied to the corrected masking area shaping section 1262.

The corrected masking area shaping section 1262 shapes the corrected masking area into a shape having improved appearance. A specific method for the shaping is as described above. The shaped masking area is supplied to the inverse transform/correction section 1263. The inverse transform/correction section 1263 uses the cut-out parameter to perform correction inverse to the correction performed by the corrected masking area generation section 1261 and cut-out/distortion correction section 115. As a result, the masking area having improved appearance obtained by the shaping in the corrected masking area generation section 1261 assumes once again a distorted shape. This distorted shape is a shape that will be made to return, by application of the distortion correction processing using the cut-out parameter, to the improved appearance shape that is previously obtained by the shaping in the corrected masking area generation section 1261.

The masking area that is subjected to the inverse transform by the inverse transform/correction section 1263 is supplied to the masking execution section 113, and the masking execution section 113 performs the masking processing for the supplied masking area on the omnidirectional image. The cut-out/distortion correction section 115 performs the cut-out/distortion correction processing using the cut-out parameter for the thus obtained omnidirectional image on which the masking processing is performed for the masking area. As is clear from FIG. 9, the cut-out parameter to be used as the correction parameter in the cut-out/distortion correction section 115 is the same parameter as the cut-out parameter used for the correction of the masking area in the corrected masking area generation section 1261 and the cut-out parameter used for the inverse transform in the inverse transform/correction section 1263.

By the cut-out/distortion correction processing performed by the cut-out/distortion correction section 115, the masking area is made to assume a shape having improved appearance, and distortion of the area other than the masking area is eliminated. The thus obtained distortion-corrected image on which the masking processing is performed is transmitted from the camera 120 to the viewer 220, and the viewer 220 displays the distortion-corrected image on the output section 213.

Figure 10:
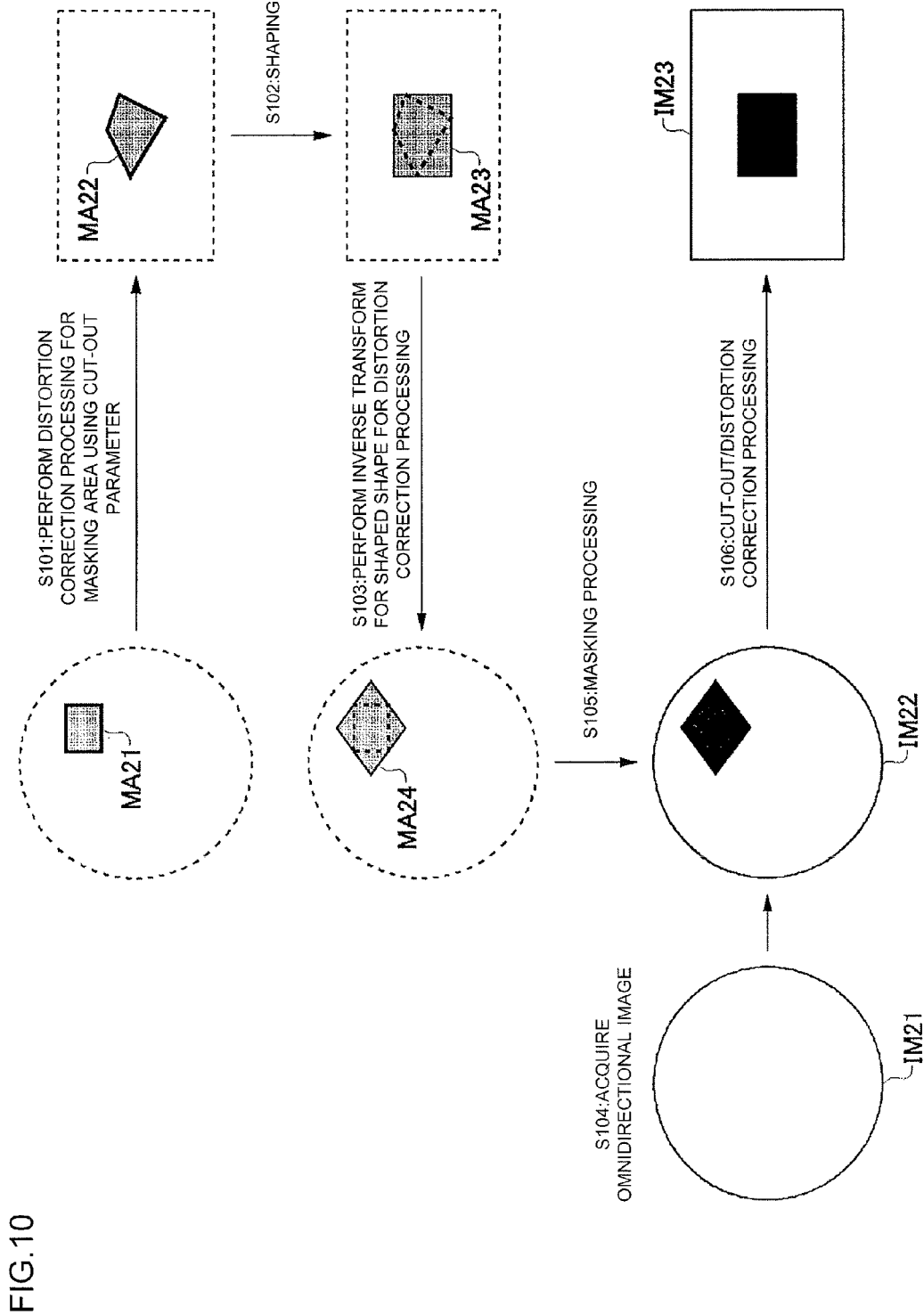
FIG. 10 is a view for explaining a flow of processing performed in the shooting system in the second embodiment of the present technology.

A flow of processing in the shooting system 102 having the above configuration will be described together with images and masking areas. FIG. 10 is a view for explaining the processing flow in the shooting system 102. The corrected masking area generation section 1261 acquires a masking area MA21 from the masking data retaining section 112 and acquires the cut-out parameter from the cut-out parameter setting section 114. Then, the corrected masking area generation section 1261 performs the distortion correction processing for the masking area MA21 using the cut-out parameter as the correction parameter to thereby generate a corrected masking area MA22 (step S101).

The corrected masking area shaping section 1262 shapes the corrected masking area MA22 into a corrected masking area MA23 (step S102). Then, the inverse transform/correction section 1263 acquires the cut-out parameter from the cut-out parameter setting section 14 and uses the cut-out parameter as the correction parameter to perform, for the corrected masking area MA23, transform inverse to the correction performed in step S102 (step S103) to thereby obtain an inverse transformed/corrected masking area MA24. The omnidirectional imaging section 111 shoots a place to be monitored to acquire an omnidirectional image IM21 (step S104), and the masking execution section 113 uses the inverse transformed/corrected masking area MA24 obtained by the inverse transform/correction section 1263 to perform the masking processing on the omnidirectional image IM21 (step S105), to thereby an image IM22 on which the masking processing is performed.

The cut-out/distortion correction section 115 performs, for the image IM22 on which the masking processing is performed, the cut-out/distortion correction processing of the cut-out range using the cut-out parameter set by the cut-out parameter setting section 114 (step S106) to thereby obtain a distortion-corrected image IM23. As described above, in the distortion-corrected image IM23, the masking processing is performed for the masking area having improved appearance obtained by the shaping of the corrected masking area shaping section 1262.

As described above, according to the second embodiment of the present technology, correction using the same correction parameter as that used in the cut-out/distortion correction processing performed for the omnidirectional image is performed for the masking area, with the result that the masking area assumes a distorted shape. Then, the distorted masking area is shaped into a shape with improved appearance, which is once inverse transformed by the correction parameter. Then, the masking processing is performed on the omnidirectional image having distortion with the area after the inversion transform used as the masking area. Finally, the cut-out/distortion correction section 115 uses the same correction parameter once again to perform the distortion correction processing. As a result, in the thus obtained distortion-corrected image, the masking area assumes a shape with improved appearance which is once obtained by the shaping performed by the corrected masking area shaping section 1262.

In the second embodiment, as illustrated in FIG. 9, the viewer 220 according to the present technology needs to include only the cut-out parameter setting section 114 and output section 213. Since processing loads of the cut-out parameter setting section 114 and output section 213 are not so large, the viewer 220 can be realized even in a device with limited processing power. For example, the present embodiment is effective for a case where the viewer 220 is realized by a mobile terminal.

1-3. Third Embodiment

Figure 11:
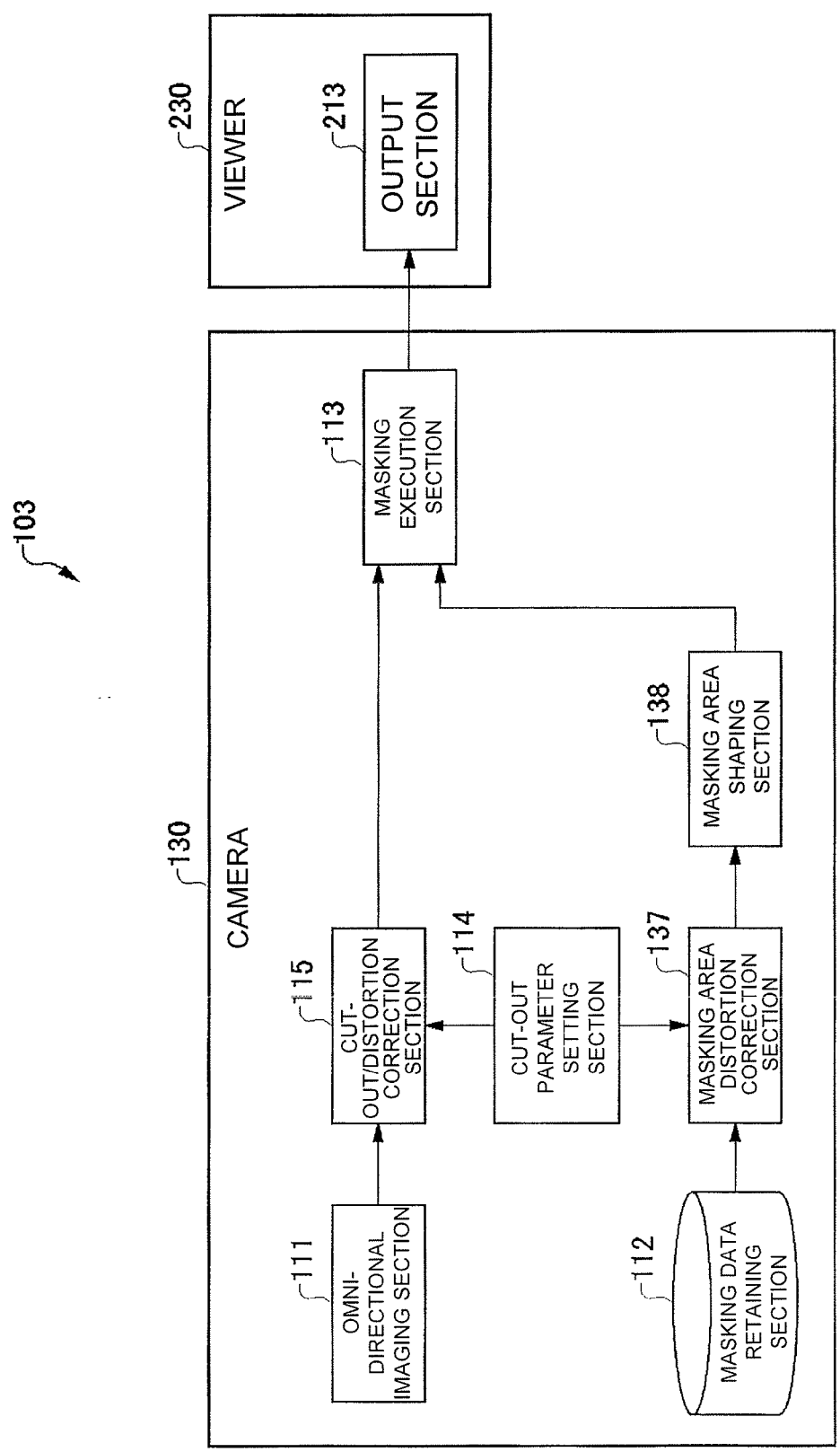
FIG. 11 is a block diagram illustrating a configuration of a shooting system according to a third embodiment of the present technology.

The following describes a third embodiment of the present technology. FIG. 11 is a block diagram illustrating a configuration of a shooting system according to a third embodiment of the present technology. As illustrated in FIG. 11, a shooting system 103 according to the third embodiment includes a camera 130 and a viewer 230. The same reference numerals are given to the same constituent elements of the camera 130 and viewer 230 as those of the camera 110 and viewer 210 of the first embodiment, and detailed descriptions thereof will be omitted.

The camera 130 has an omnidirectional imaging section 111, a masking data retaining section 112, a masking execution section 113, a cut-out/distortion correction section 115, a masking area distortion correction section 137, and a masking area shaping section 138.

The masking area distortion correction section 137 uses the cut-out parameter acquired from the cut-out parameter setting section 114 as the correction parameter to perform cut-out/distortion correction processing of the cut-out range for the masking area retained in the masking data retaining section 112 to thereby generate a distortion-corrected masking area on the omnidirectional image. The distortion-corrected masking area is a masking area on the cut-out range and has a distorted shape. The distortion-corrected masking area is output to the masking area shaping section 138.

The masking area shaping section 138 shapes the distortion-corrected masking area on the cut-out range generated by the masking area distortion correction section 137 into a shape having improved appearance. A specific method for the shaping is as described above.

The cut-out/distortion correction section 115 performs the cut-out/distortion correction processing of the cut-out range for the omnidirectional image acquired by the omnidirectional imaging section 111 using the cut-out parameter read out from the cut-out parameter setting section 114 as the correction parameter to thereby generate a distortion-corrected image. The masking execution section 113 inputs the distortion-corrected image generated by the cut-out/distortion correction section 115 and the masking area shaped by the masking area shaping section 138 and performs the masking processing for the shaped masking area on the distortion-corrected image.

The distortion-corrected image on which the masking processing is performed by the masking execution section 113 is transmitted from the camera 130 to the viewer 230. The output section 213 of the viewer 230 displays the distortion-corrected image transmitted from the camera 130.

Figure 12:
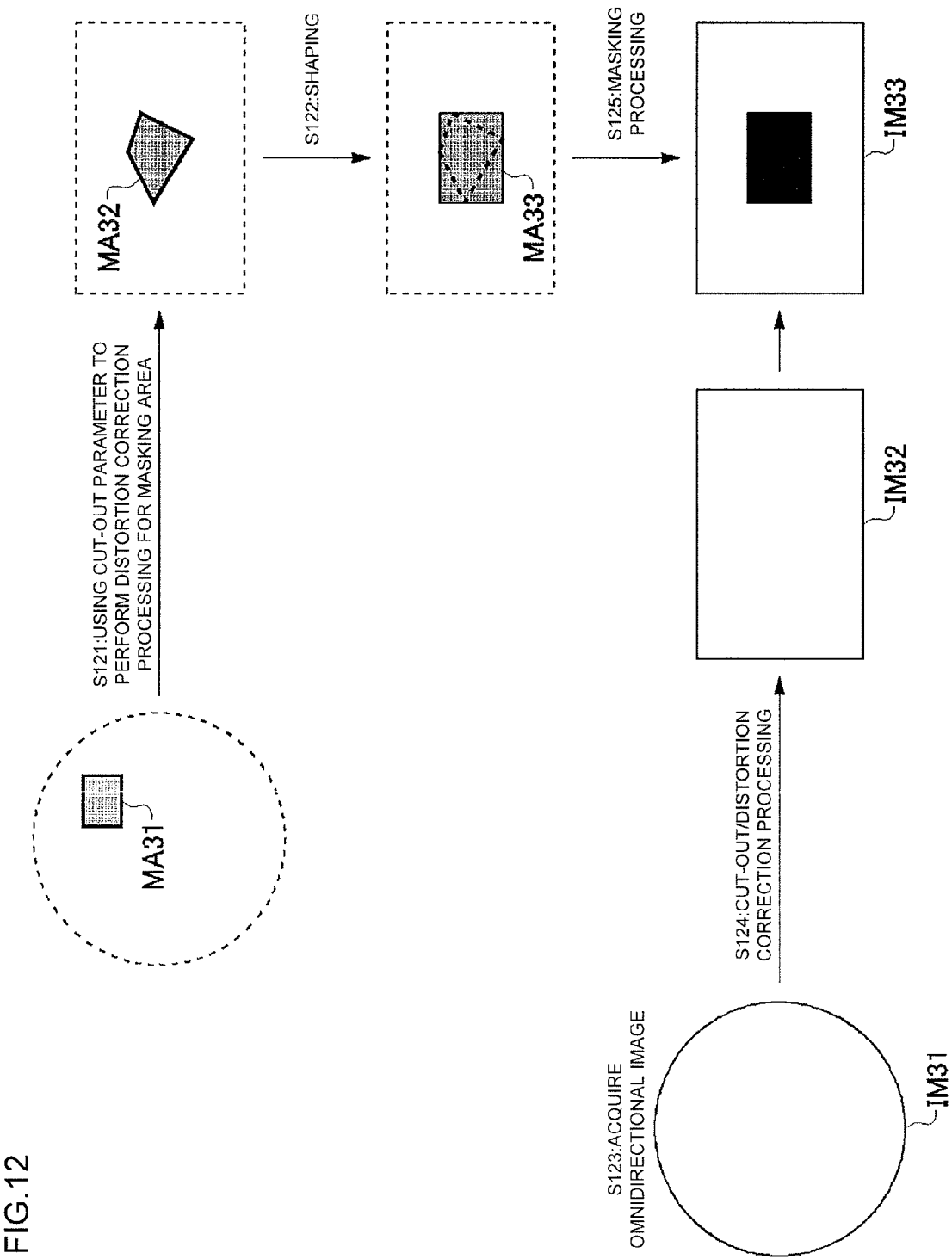
FIG. 12 is a view for explaining a flow of processing performed in the shooting system in the third embodiment of the present technology.

A flow of processing in the shooting system 103 having the above configuration will be described together with images and masking areas. FIG. 12 is a view for explaining the processing flow in the shooting system 103. The masking area distortion correction section 137 reads out the cut-out parameter from the cut-out parameter setting section 114 and uses the read out cut-out parameter as the correction parameter to correct a masking area MA31 read out from the masking data retaining section 112 (step S121) to thereby generate a corrected masking area MA32. Here, the masking area distortion correction section 137 uses the cut-out parameter to cut the cut-out range from the omnidirectional image and then performs the distortion correction processing for the masking area MA31. Thereafter, the masking area shaping section 138 shapes the masking area corrected by the masking area distortion correction section 137 into a shape having improved appearance (step S122) to thereby generate a shaped masking area MA33.

The omnidirectional imaging section 111 shoots a monitoring target to acquire an omnidirectional image IM31 (step S123), and the cut-out/distortion correction section 115 uses the cut-out parameter set by the cut-out parameter setting section 114 to cut out the cut-out range from the omnidirectional image IM31 and performs the distortion correction processing for the cut-out range (step S124) to thereby generate a distortion-corrected image IM32. The masking execution section 113 inputs the distortion-corrected image IM32 and the shaped masking area MA33 generated by the masking area shaping section 138. The masking execution section 113 then performs the masking processing for the shaped masking area MA33 on the distortion-corrected image IM32 (step S125) to thereby generate a distortion-corrected image IM33 on which the masking processing is performed for the masking area MA33.

As described above, according to the third embodiment of the present technology, the same parameter is used to perform cut-out/distortion correction processing for the masking area and omnidirectional image. The masking area thus corrected is shaped and then applied to the omnidirectional image (distortion-corrected image) that is subjected to the cut-out/distortion correction processing.

Further, in the shooting system 103 according to the third embodiment, the viewer 230 includes only the output section 213, and therefore the viewer 230 can be realized even in a device with limited processing power.

Also in the second and third embodiments, as long as the camera 120 or 130 includes at least the omnidirectional imaging section 111 and the viewer 220 or 230 includes at least the output section 213, other constituent elements may be provided in any one of the camera 120 or 130 and viewer 220 or 230. For example, in the shooting system 103 according to the third embodiment, the cut-out parameter setting section 114 may be provided in the viewer 230 as in the shooting system 102 according to the second embodiment so as to allow the cut-out range to be specified on the viewer 230 side.

Further, in the shooting system according to the first to third embodiments, some or all of the constituent elements other than the omnidirectional imaging section 111 and output section may be provided in a device provided separately from the camera and viewer and communicably located therebetween.

The following describes modifications of shaping of the masking area described in the first to third embodiments.

1-4. Modifications of Shaping of Masking Area 1-4-1. First Modification

Figure 13A:
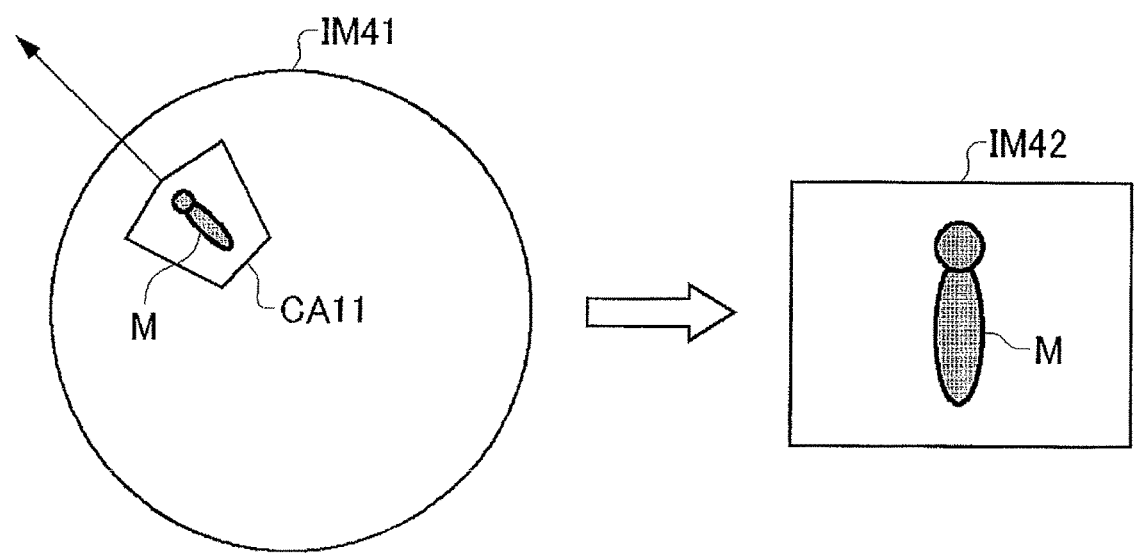
FIG. 13A is a view for explaining a cut-out direction (radial direction) in a first modification of the shaping of the masking area according to the embodiments of the present technology.
Figure 13B:
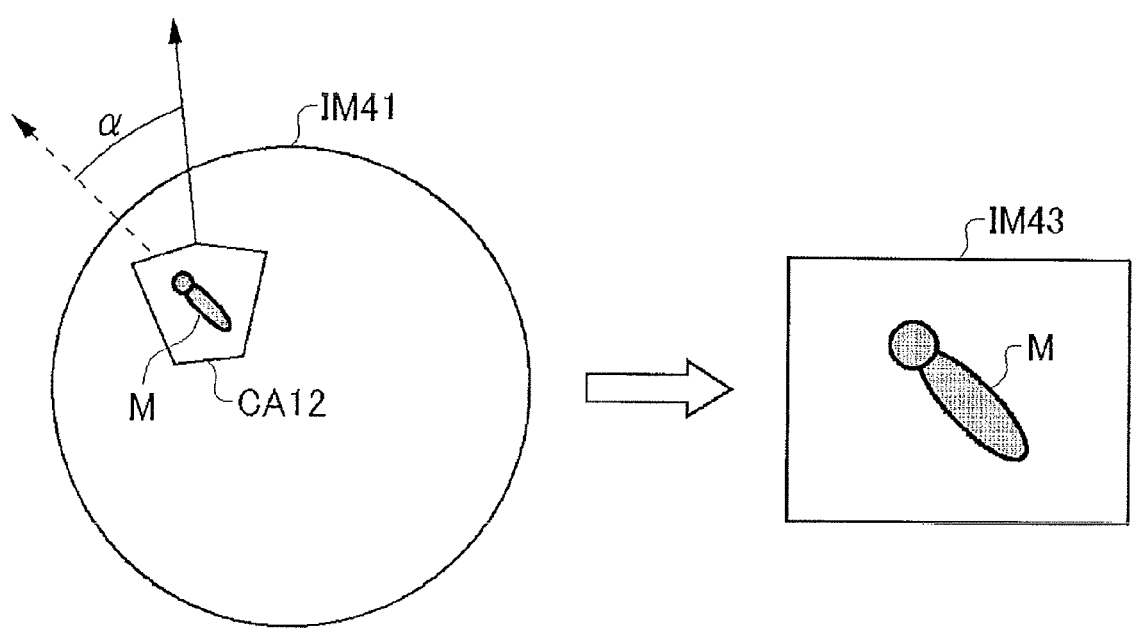
FIG. 13B is a view for explaining a cut-out direction (non-radial direction) in the first modification of the shaping of the masking area according to the embodiments of the present technology.

FIGS. 13A and 13B are views each explaining a cut-out direction of the cut-out processing performed by the cut-out/distortion correction section 115 which is described in the first to third embodiment. FIG. 13A illustrates a case where the cut-out range is cut-out in a radial direction of a circular omnidirectional image, and FIG. 13B illustrates a case where the cut-out range is cut-out in a direction different from the radial direction of the circular omnidirectional image (a direction forming an angle α with cut-out direction of FIG. 13A). To cut out the cut-out range in the cut-out/distortion correction processing in a given direction means that the cut-out processing is performed such that the given direction faces upward in a rectangular image obtained by cutting out the cut-out range and performing distortion correction processing for the cut-out range.

In a case of FIG. 13A, as a result of generation of a distortion-corrected image by cut-out processing in the radial direction, an upright direction of a subject including a person M seen in a cut-out range CA11 coincides with a vertical direction in a distortion-corrected image IM42. On the other hand, in a case of FIG. 13B, as a result of generation of a distortion-corrected image by cut-out processing in a direction forming an angle α with the radial direction, an upright direction of a subject including a person M seen in a cut-out range CA12 is inclined by the angle α with respect to the vertical direction in a distortion-corrected image IM43.

Figure 14:
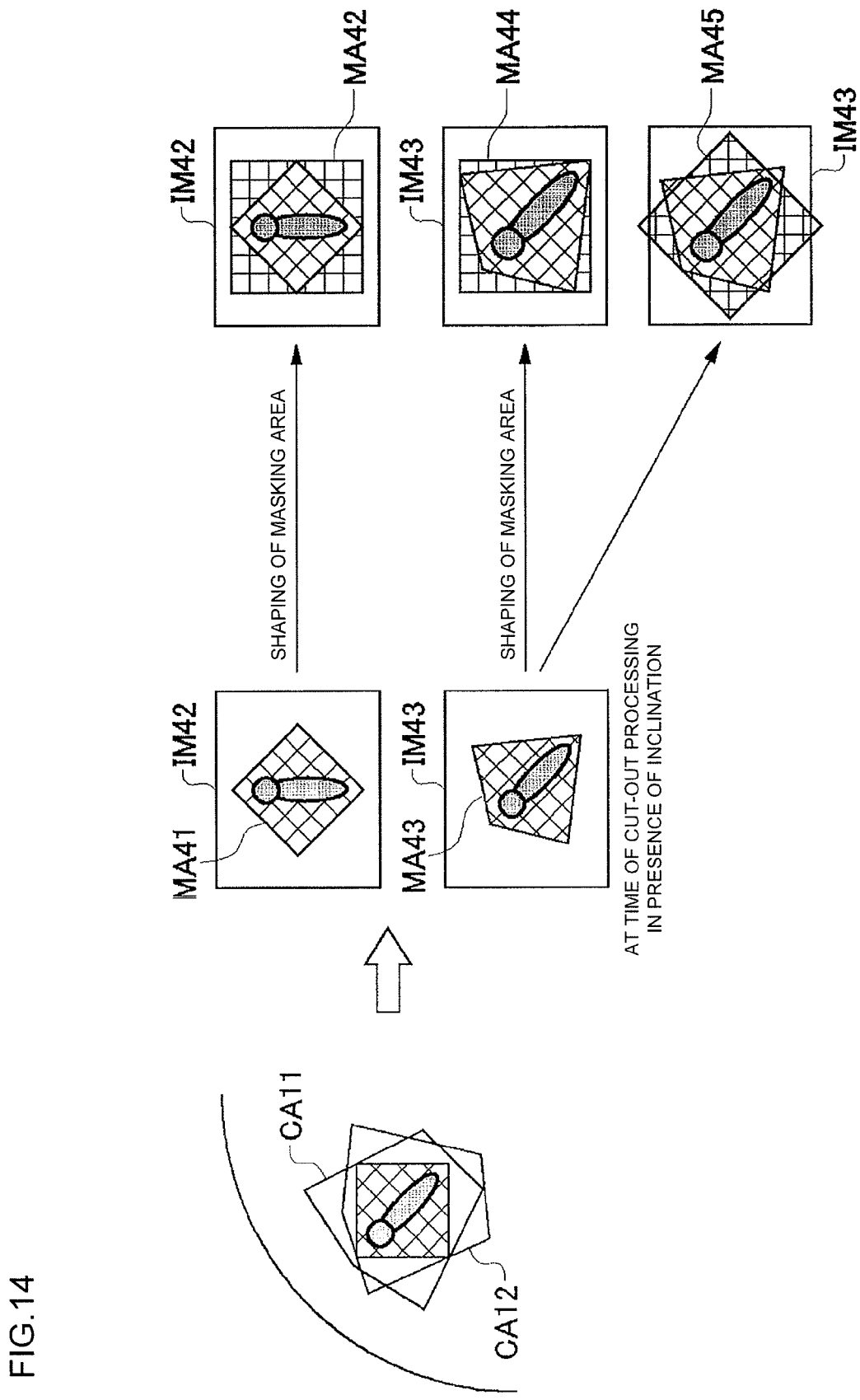
FIG. 14 is a view for explaining the shaping of the masking areas in the first modification of the shaping of the masking area according to the embodiments of the present technology.

FIG. 14 is a view for explaining the shaping of the masking areas described in FIGS. 13A and 13B, respectively. In a case where the cut-out range CA11 is cut out in the radial direction, and where the upright direction of the subject in the distortion-corrected image IM42 coincides with the vertical direction of the distortion-corrected image IM42, a masking area MA41 assuming a distorted shape as a result of the distortion correction processing is shaped into a masking area MA42 having an upright rectangular shape including the masking area MA41, whereby the masking area can be made easy to see for the user.

However, in a case where the cut-out range CA12 is cut out in a direction inclined with respect to the radial direction, and where the upright direction of the subject in the distortion-corrected image IM43 is inclined with respect to the vertical direction of the distortion-corrected image IM43, when a masking area MA43 assuming a distorted shape as a result of the distortion correction processing is shaped into a masking area MA44 having an upright rectangular shape including the masking area MA43, the masking area MA44 is upright, whereas the subject is inclined, which causes strange feeling.

In order to cope with this problem, in the present modification, in the case where the upright direction of the subject in the distortion-corrected image IM43 is inclined with respect to the vertical direction of the distortion-corrected image IM43 due to the inclination of the cut-out direction, the masking area MA43 assuming a distorted shape as a result of the distortion correction processing is shaped with the inclination taken into consideration. Specifically, the masking area MA43 is shaped into a masking area MA45 whose upright direction is inclined at the same angle as the inclination angle of the cut-out direction with respect to the radial direction.

According to the present modification, in the distortion-corrected image on which the masking processing is performed for the masking area, the upright direction of the subject and upright direction of the shaped masking area coincide with each other, whereby a distortion-corrected image having no strange feeling can be obtained as a result of natural masking processing.

1-4-2. Second Modification

Figure 15:
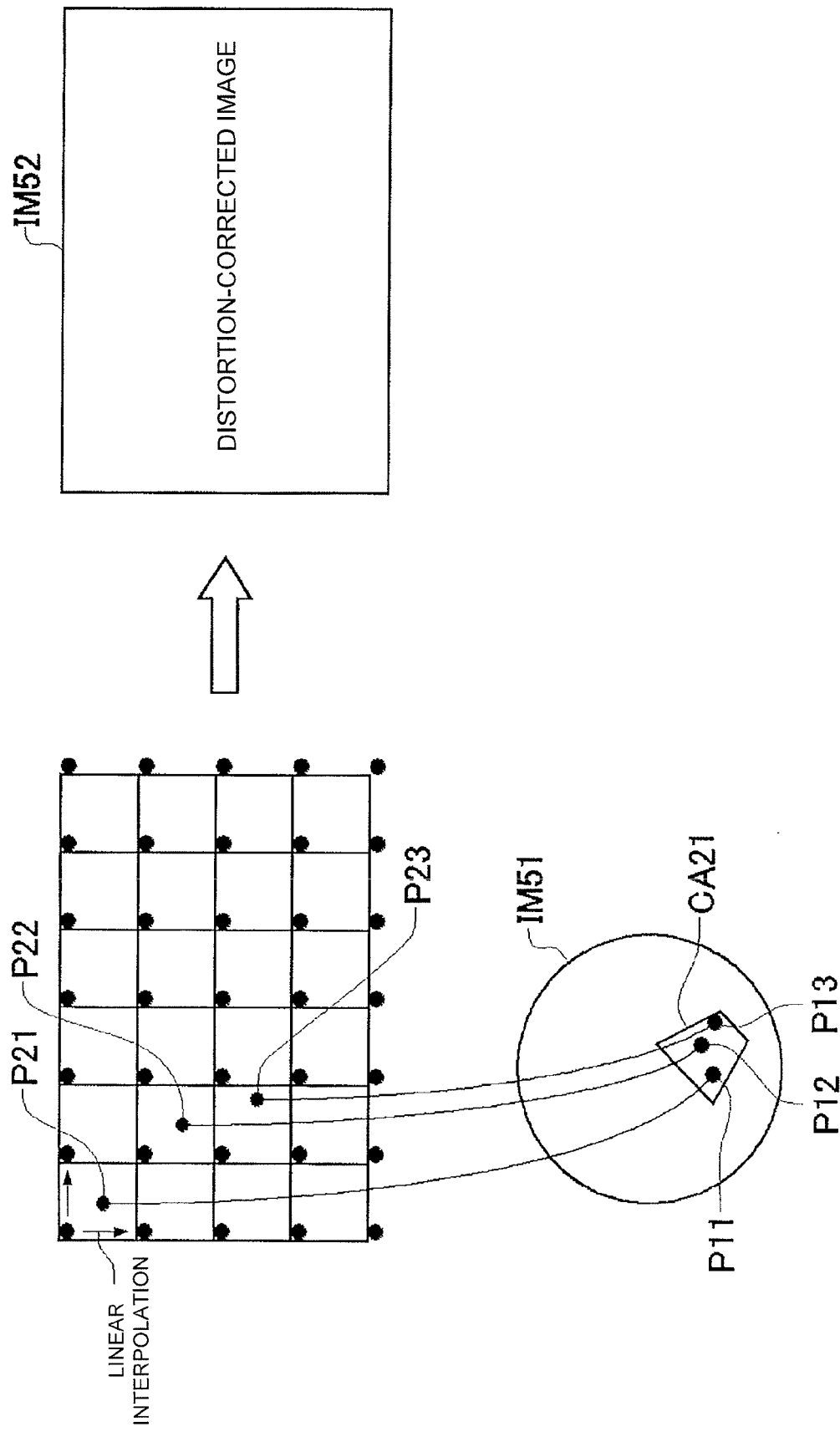
FIG. 15 is a view for explaining the shaping of the masking areas in a second modification of the shaping of the masking area according to the embodiments of the present technology.
Figure 16:
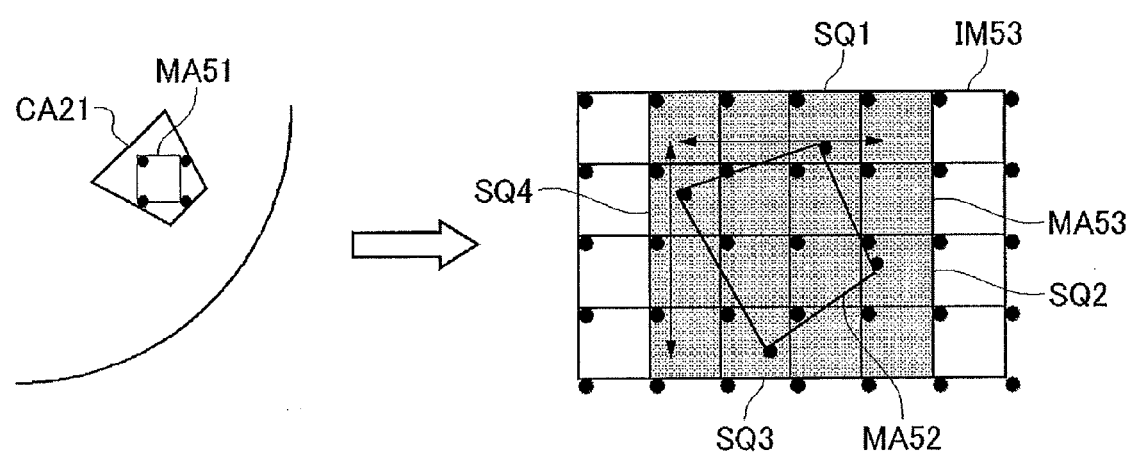
FIG. 16 is a view for explaining the shaping of the masking areas in the second modification of the shaping of the masking area according to the embodiments of the present technology.
Figure 17:
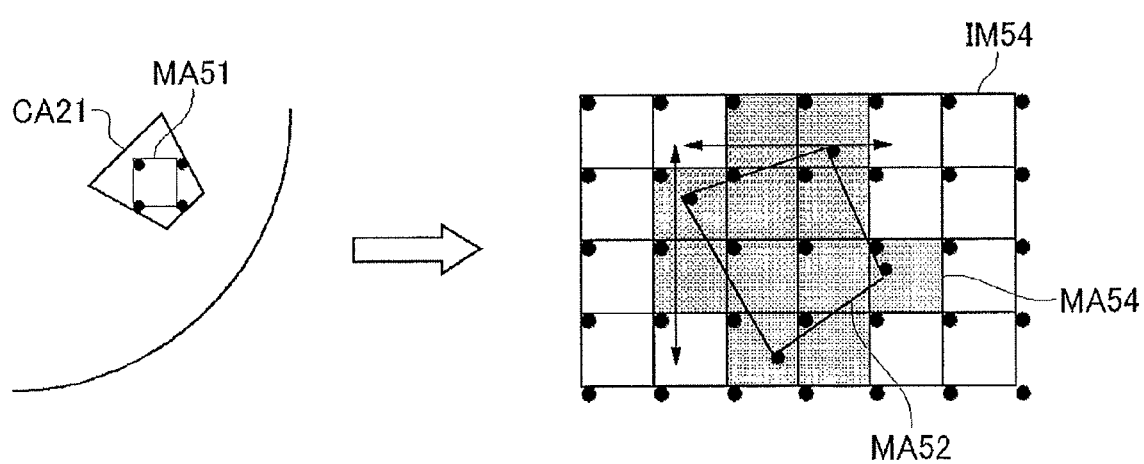
FIG. 17 is a view for explaining the shaping of the masking areas in the second modification of the shaping of the masking area according to the embodiments of the present technology.
Figure 18:
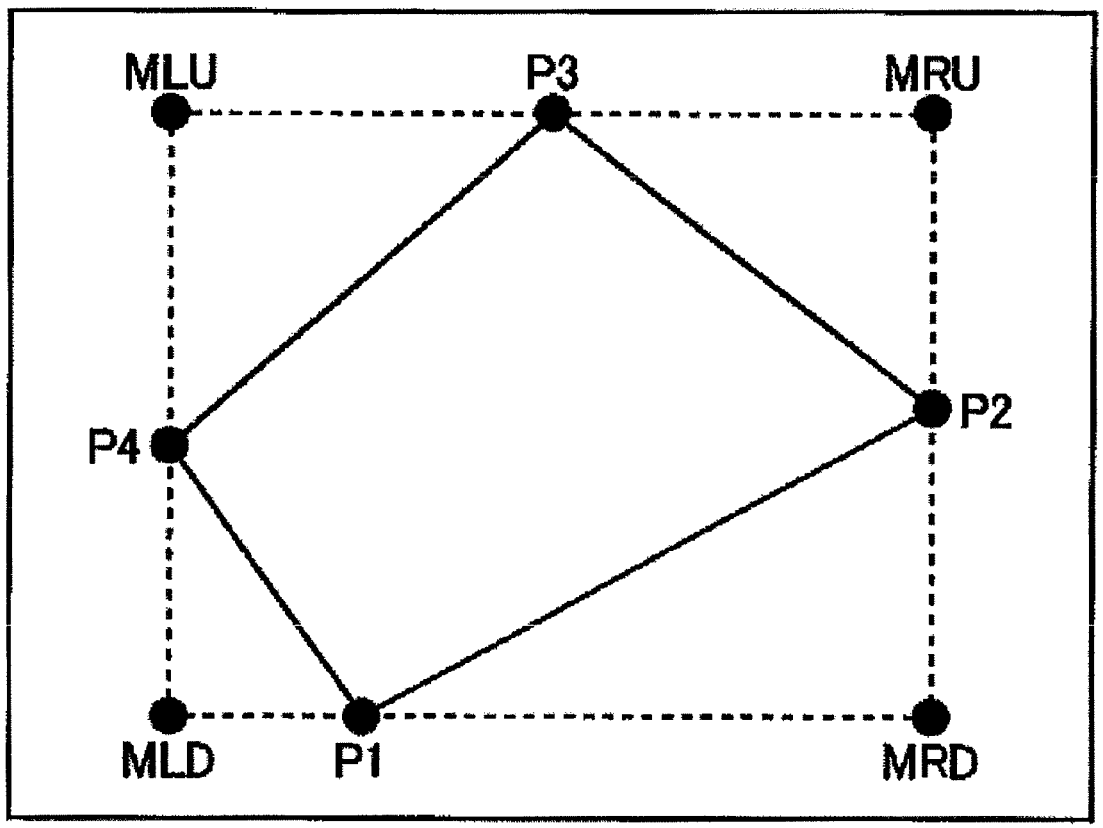
FIG. 18 is a view for explaining processing to be performed for a masked area in a conventional approach.

FIGS. 15 to 17 are views for explaining a second modification of the shaping of the masking area. First, with reference to FIG. 15, processing of cutting out the cut-out range from the omnidirectional image and performing the distortion correction processing for the cut-out range so as to generate a distortion-corrected image will be described. In the present modification, in a case where the cut-out/distortion correction processing is performed for a cut-out range CA21, pixels in the cut-out range CA21 in an omnidirectional image IM51 are coordinate-transformed to be projected to the distortion-corrected image. For example, pixels P11, P12, and P13 in the omnidirectional image IM51 become pixels P21, P22, and P23 on the distortion-corrected image, respectively. A deficiency of pixels in the distortion-corrected image is filled in by linearly interpolating the source coordinates for each square of 16 pixels×16 pixels and, finally, a distortion-corrected image IM52 is generated.

In the present modification, the above squares are used to shape the masking area. That is, the shaping of the masking area is performed on a per square basis. FIG. 16 is a view illustrating a first method of the present modification. In this example, when the cut-out/distortion correction processing is performed for the cut-out range CA21 on the omnidirectional image IM51 to generate a distortion-corrected image IM53, a masking area MA51 set in the omnidirectional image IM51 becomes a masking area MA52 having a distorted shape. The masking area 52 is then shaped into a masking area MA53 including a plurality of squares that covers the masking area MA52 and have a rectangular shape as a whole.

Specifically, squares in a row including a square SQ1 including the uppermost point of the masking area MA52 assuming a distorted shape as a result of the distortion correction processing are set as squares constituting the uppermost row of a shaped masking area, squares in a column including a square SQ2 including the rightmost point of the masking area MA52 are set as squares constituting the rightmost column of the shaped masking area, squares in a row including a square SQ3 including the lowermost point of the masking area MA52 are set as squares constituting the lowermost row of the shaped masking area, and squares in a column including a square SQ4 including the leftmost point of the masking area MA52 are set as squares constituting the leftmost column of the shaped masking area, and a rectangular area surrounded by the above uppermost row, rightmost column, lowermost row, and leftmost column is set as the shaped masking area MA53.

FIG. 17 is a view illustrating a second method of the present modification. In the second method, (only) squares that include the masking area MA52 assuming a distorted shape as a result of the distortion correction processing are set as a shaped masking area MA54. The shaped masking area MA54 is an area formed by only horizontal and vertical lines. That is, unlike the masking area MA52 before shaping, the masking area MA54 does not include a diagonal line, resulting in improved appearance.

Although the first to third embodiments of the present technology have been described taking a case where the cut-out range is cut out from the omnidirectional image and the distortion correction processing is performed for the cut-out range, the present technology can be applied to a case where the distortion correction is performed for the omnidirectional image to generate a panoramic image and then the masking processing is performed for a partial area of the panoramic image. Further, although the omnidirectional image is shot as the image having distortion in the above embodiments, the image having distortion is not limited to the omnidirectional image (having horizontal view angle of about 360°). The present technology is effectively applied to a shooting system that sets the masking area in the image having distortion and performs the distortion correction therefor.

2. Fourth to Sixth Embodiments

The following describes fourth to sixth embodiments of the present technology. In any of the fourth to sixth embodiments, a shooting system in which a camera using a fish-eye lens is used to image the omnidirectional image as the image having distortion is employed. However, the image having distortion in the present technology is not limited to the omnidirectional image but may be an image having distortion due to imaging using a wide-angle lens.

2-1. Fourth Embodiment

Figure 20:
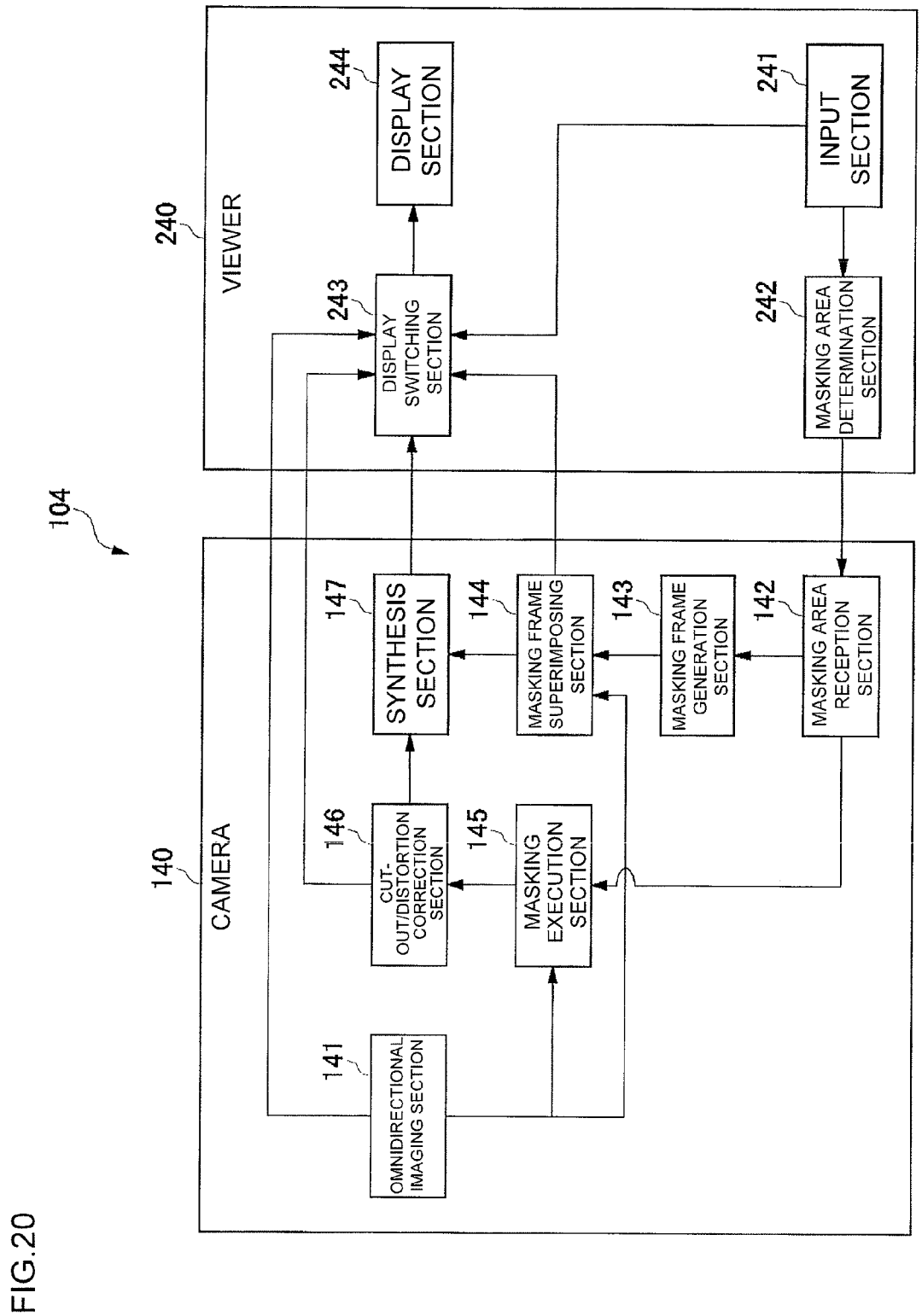
FIG. 20 is a block diagram illustrating a shooting system according to a fourth embodiment of the present technology.

FIG. 20 is a block diagram illustrating an image display system according to an embodiment of the present technology. As illustrated in FIG. 20, a shooting system 104 includes a camera 140 and a viewer 240 connected to each other. In a case where the camera 140 is a monitoring camera, the camera 140 is installed so as to be able to image a place to be monitored, and the viewer 240 is a device for a user to view an image imaged by the camera 140 and subjected to image processing. The viewer 240 may be, e.g., a personal computer or a mobile terminal. The camera 140 is so-called a network camera and may be connected to the viewer 240 by wire or wireless. Further, some or all of the constituent elements other than an omnidirectional imaging section 141 of the camera 140 may be provided in the viewer 240.

The camera 140 includes an omnidirectional imaging section 141, a masking area reception section 142, a masking frame generation section 143, a masking frame superimposing section 144, a masking execution section 145, a cut-out/distortion correction section 146, and a synthesis section 147. The viewer 240 includes an input section 241, a masking area determination section 242, a display switching section 243, and a display section 244.

The omnidirectional imaging section 141 of the camera 140 is an imaging system having a fish-eye lens which is a kind of a wide-angle lens. The omnidirectional imaging section 141 is used to image a circular omnidirectional image. The omnidirectional image is the image having distortion in which a degree of the distortion increases with proximity to an outer periphery thereof. The omnidirectional imaging section 141 outputs the omnidirectional image obtained by imaging to the masking frame superimposing section 144 and masking execution section 145, as well as, to the viewer 240. The image taken and output by the omnidirectional imaging section 141 may be a still image or a moving image. In the latter case, the following processing is performed for each frame of the moving image.

The input section 241 of the viewer 240 inputs various instructions from the user. The instruction includes a display switching instruction, a masking area specification instruction, a masking area cancel/determination instruction, and the like. The display switching instruction is input to the display switching section 243, and the masking area specification instruction and masking area cancel/determination instruction are input to the masking area determination section 242. The input section 241 includes, e.g., a mouse and a keyboard or a touch sensor formed integrally with the display section 244.

The masking area determination section 242 calculates the masking area from input data input to the input section 241. Specifically, a rectangle (oblong) formed by horizontal and vertical sides extending from a vertex on the omnidirectional image clicked by a mouse and a currently-pointed vertex at a diagonal position with respect to the vertex is calculated. Information concerning a position and a shape (length in a vertical direction and a width in a horizontal direction) of the omnidirectional image is transmitted to the camera 140 as information specifying the masking area.

The masking area reception section 142 receives the information specifying the masking area determined by the masking area determination section 242 and output the received information to the masking frame generation section 143 and masking execution section 145. The masking frame generation section 143 generates a masking frame representing an outer edge of the masking area based on the masking area specification information acquired from the masking area reception section 142. The masking frame includes information indicating a position of the masking frame in the omnidirectional image.

The masking frame superimposing section 144 acquires the omnidirectional image from the omnidirectional imaging section 141, as well as, acquires the masking frame from the masking frame generation section 143 and superimposes a shape of the masking frame on the omnidirectional image. The masking frame superimposing section 144 then outputs the omnidirectional image on which the masking frame is superimposed to the synthesis section 147 and display switching section 243.

The masking execution section 145 acquires the omnidirectional image from the omnidirectional imaging section 141, as well as, acquires the masking area specification information from the masking area reception section 142 and then performs the masking processing for the masking area included in the omnidirectional image and corresponding to the specification information. The masking processing performed by the masking execution section 145 is processing of blacking out the masking area. However, the masking processing is not limited to this, but may be another processing, such as mosaic processing, that reduces an information amount of an image corresponding to the masking area. The masking execution section 145 outputs, to the cut-out/distortion correction section 146, the omnidirectional image on which the masking processing is performed for the masking area.

The cut-out/distortion correction section 146 cuts out the cut-out range from the omnidirectional image on which the masking processing is performed for the masking area and performs the distortion correction for the cut-out range to thereby generate a cut-out/distortion-corrected image. In the present embodiment, the cut-out range is previously determined. A frame representing the cut-out range may be displayed in a superimposed manner on the omnidirectional image. The cut-out/distortion correction section 146 outputs the cut-out/distortion-corrected image to the synthesis section 147, as well as transmits the same to the viewer 240.

The synthesis section 147 acquires the omnidirectional image on which the masking frame is superimposed from the masking frame superimposing section 144 and acquires the cut-out/distortion-corrected image on which the masking processing is already performed for the masking area from the cut-out/distortion correction section 146 and then synthesizes them to thereby generate a preview image displaying the both images simultaneously. The synthesis section 147 transmits the generated preview image to the viewer 240.

The display switching section 243 receives the omnidirectional image from the omnidirectional imaging section 141, receives the omnidirectional image on which the masking frame is superimposed from the masking frame superimposing section 144, receives the cut-out/distortion-corrected image on which the masking processing is performed for the masking area from the cut-out/distortion correction section 146, and receives the preview image from the synthesis section 147.

Hereinafter, a display mode of the shooting system 104 will be described. The shooting system 104 switches between a masking area specifying mode for determining the masking area and a normal mode for displaying the cut-out/distortion-corrected image on which the masking processing is performed for the masking area. These display modes are switched based on an input from the input section 241. The display switching section 243 switches the display mode by acquiring mode switching information from the input section 241.

In the masking area specifying mode, the display switching section 243 outputs first the omnidirectional image acquired from the omnidirectional imaging section 141 to the display section 244. When acquiring the omnidirectional image on which the masking frame is superimposed from the masking frame superimposing section 144 in the masking area specifying mode, the display switching section 243 outputs the omnidirectional image on which the masking frame is superimposed to the display section 244. When acquiring the preview image from the synthesis section 147 in the masking area specifying mode, the display switching section 243 outputs the preview image to the display section 244. Further, in the normal mode, the display switching section 243 outputs, to the display section 244, one of the omnidirectional image acquired from the omnidirectional imaging section 141 and cut-out/distortion-corrected image on which the masking processing is performed for the masking area acquired from the cut-out/distortion correction section 146. Which one of the omnidirectional image and cut-out/distortion-corrected image on which the masking processing is performed for the masking area is output is determined according to an instruction from the input section 241.

The display section 244 displays the image acquired from the display switching section 243. The display section 244 is, e.g., a liquid crystal display device provided with a liquid crystal display panel. When the input section 241 is configured as a touch sensor, the display section 244 is configured as a touch panel formed integrally with the touch sensor.

Figure 21:
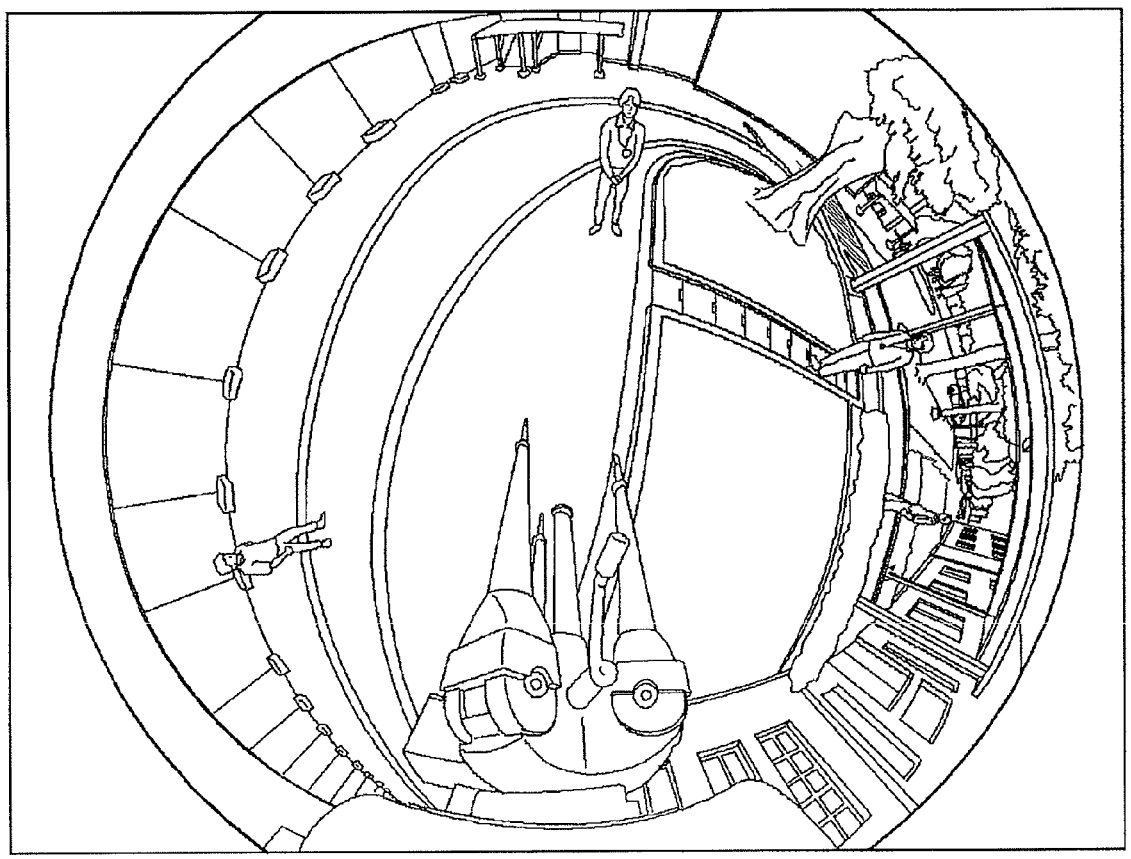
FIG. 21 is a view illustrating an example of an omnidirectional image according to the fourth embodiment of the present technology.

FIG. 19 and FIGS. 21 to 24 each illustrate a display example on the display section 244. FIG. 21 is a view illustrating an example of the omnidirectional image according to the present embodiment. A horizontal view angle of the omnidirectional imaging section 141 is 360° and, thus, the omnidirectional image has a circular shape as illustrated in FIG. 21. The circular omnidirectional image includes distortion, and a degree of the distortion is not uniform over the entire image area but increases with proximity to an outer periphery of the circle. The omnidirectional image illustrated in FIG. 21 is displayed when display of the omnidirectional image is selected in the normal mode or when the masking area is specified in the masking area specifying mode.

Figure 22:
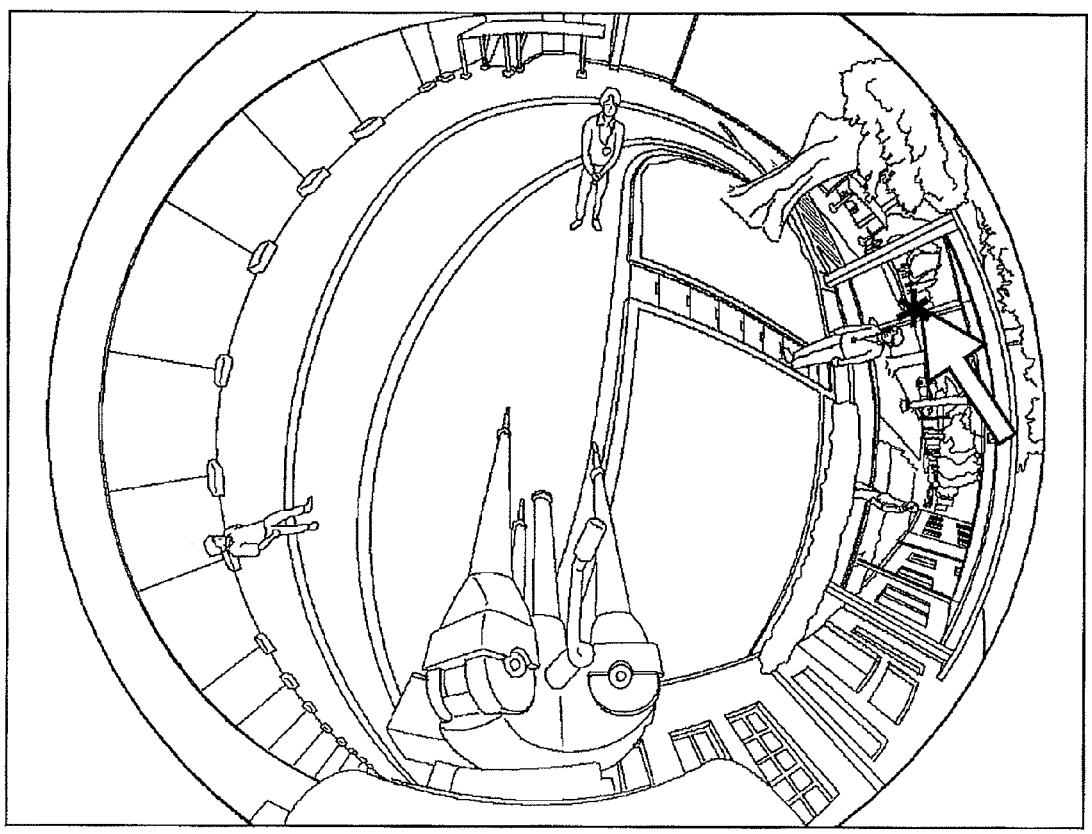
FIG. 22 is a view illustrating an example of masking area specification according to the fourth embodiment of the present technology.

FIG. 22 is a view illustrating an example of the masking area specification according to the embodiment of the present technology. In the present embodiment, the masking area is specified on the omnidirectional image. As illustrated in FIG. 22, a pointer moving according to operation of a mouse as the input section 241 is displayed on the omnidirectional image, and a start point of the masking area is specified by mouse click. When the pointer is moved after the start point is specified, the masking area determination section 242 calculates a rectangle formed by two sides parallel to the vertical direction of a screen and two sides parallel to the horizontal direction of the screen and having diagonal points of the start point and a pointer position. The masking frame superimposing section 144 uses information of the rectangle (specification information of the masking area) to generate the omnidirectional image on which the masking frame is superimposed, and the display section 244 displays the omnidirectional image.

Figure 23:
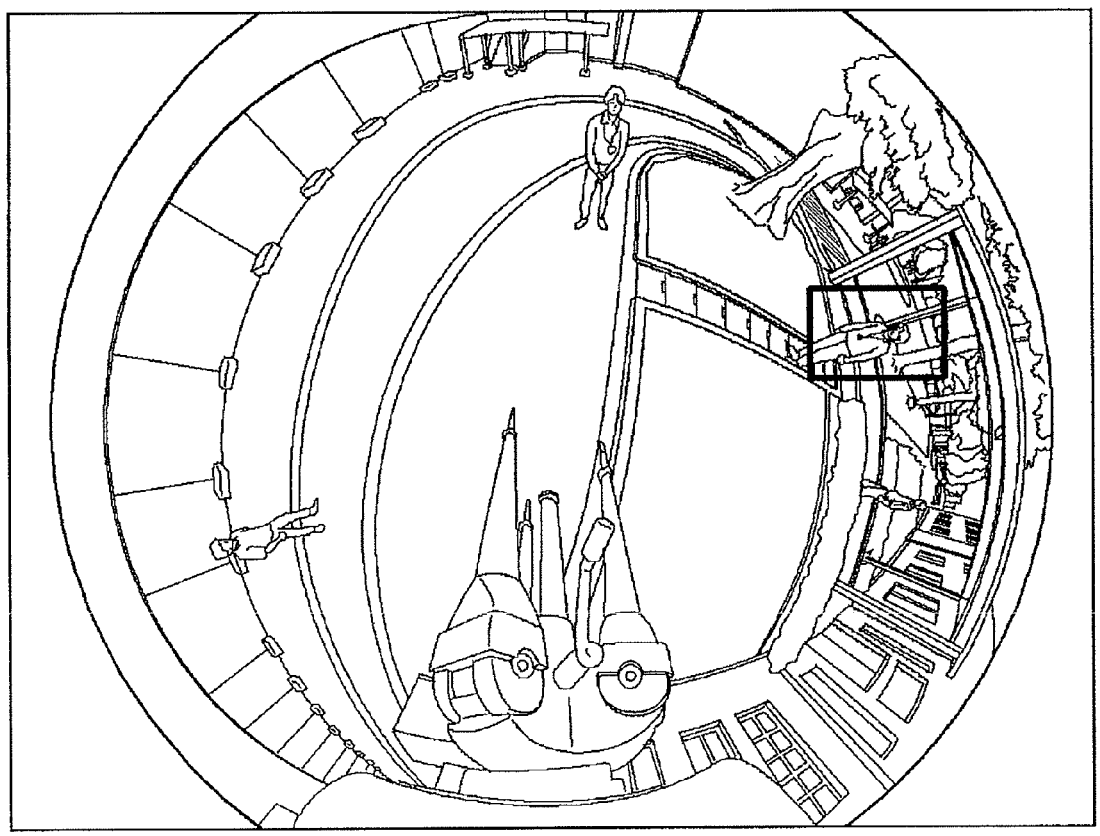
FIG. 23 is a view illustrating an example of masking area specification according to the fourth embodiment of the present technology.

FIG. 23 is a view illustrating an example of the masking area specification according to the embodiment of the present technology. A frame of the calculated rectangular is displayed in a superimposed manner on the omnidirectional image. When the pointer is moved to form a frame representing a desired masking area, the mouse is clicked once again at this position. Then, the preview image is generated by using the masking area specification information at this time and displayed on the display section 244.

Figure 19:
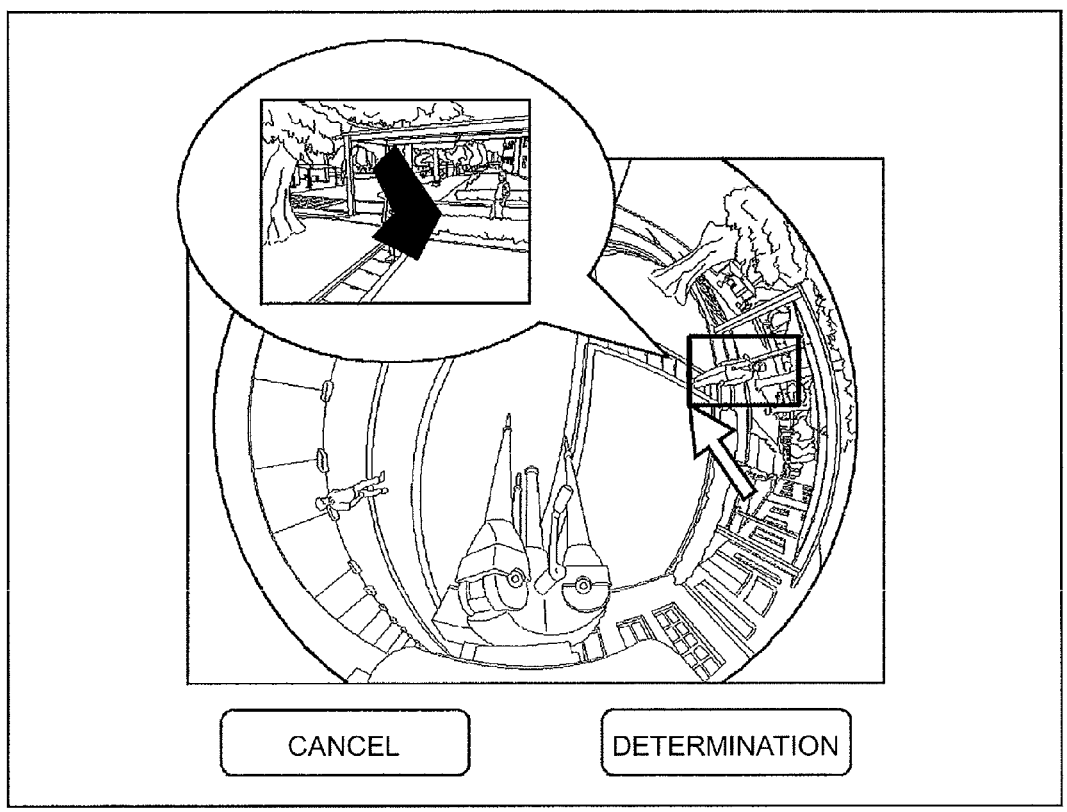
FIG. 19 is a view illustrating an example of a preview image according to a fourth embodiment of the present technology.

FIG. 19 is a view illustrating an example of the preview image according to the embodiment of the present technology. In the preview image, the cut-out/distortion-corrected image on which the masking processing is performed for the masking area is displayed in a superimposed manner on the omnidirectional image on which the masking frame is superimposed. At this time, the cut-out/distortion-corrected image is disposed in a balloon popped up from the masking frame superimposed on the omnidirectional image.

A "cancel" button and a "determination" button are displayed together with the preview image. A user confirms the cut-out/distortion-corrected image in the balloon. When the user is dissatisfied with the masking area, the user can cancel this masking area by clicking the "cancel" button. When the masking area is canceled, the display switching section 243 switches the display mode to the masking area specifying mode illustrated in FIG. 22. The user confirms the cut-out/distortion-corrected image in the balloon. When the user is satisfied with the masking area in the cut-out/distortion-corrected image, the user clicks the "determination" button to decide this masking area.

Figure 24:
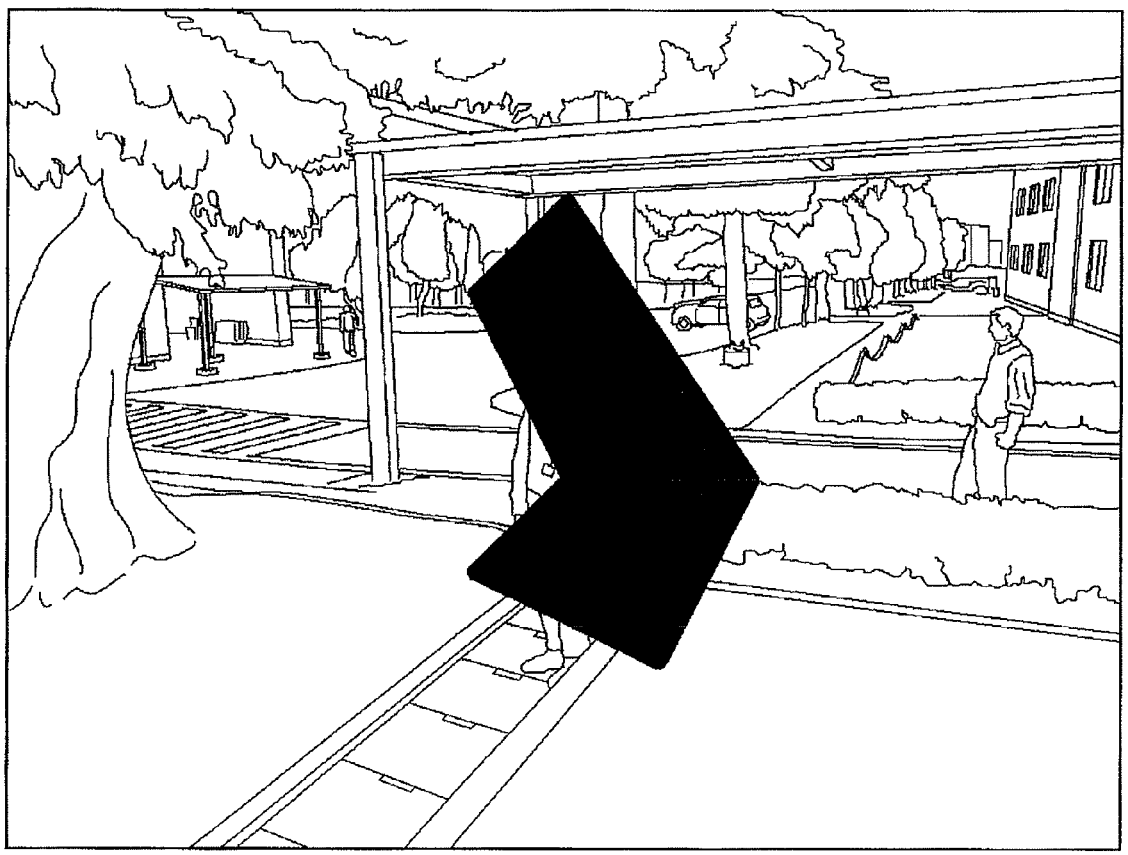
FIG. 24 is a view illustrating a cut-out/distortion-corrected image according to the fourth embodiment of the present technology.

FIG. 24 is a view illustrating the cut-out/distortion-corrected image according to the embodiment of the present technology. The cut-out/distortion-corrected image is displayed when display of the cut-out/distortion-corrected image is selected in the normal mode. In the cut-out/distortion-corrected image, the masking processing is performed for the decided masking area. However, this masking area is specified and decided as a rectangular area on the omnidirectional image, so that the masking area on this cut-out/distortion-corrected image assumes a distorted shape as a result of the distortion correction performed when the cut-out/distortion-corrected image is generated from the omnidirectional image.

Figure 25:
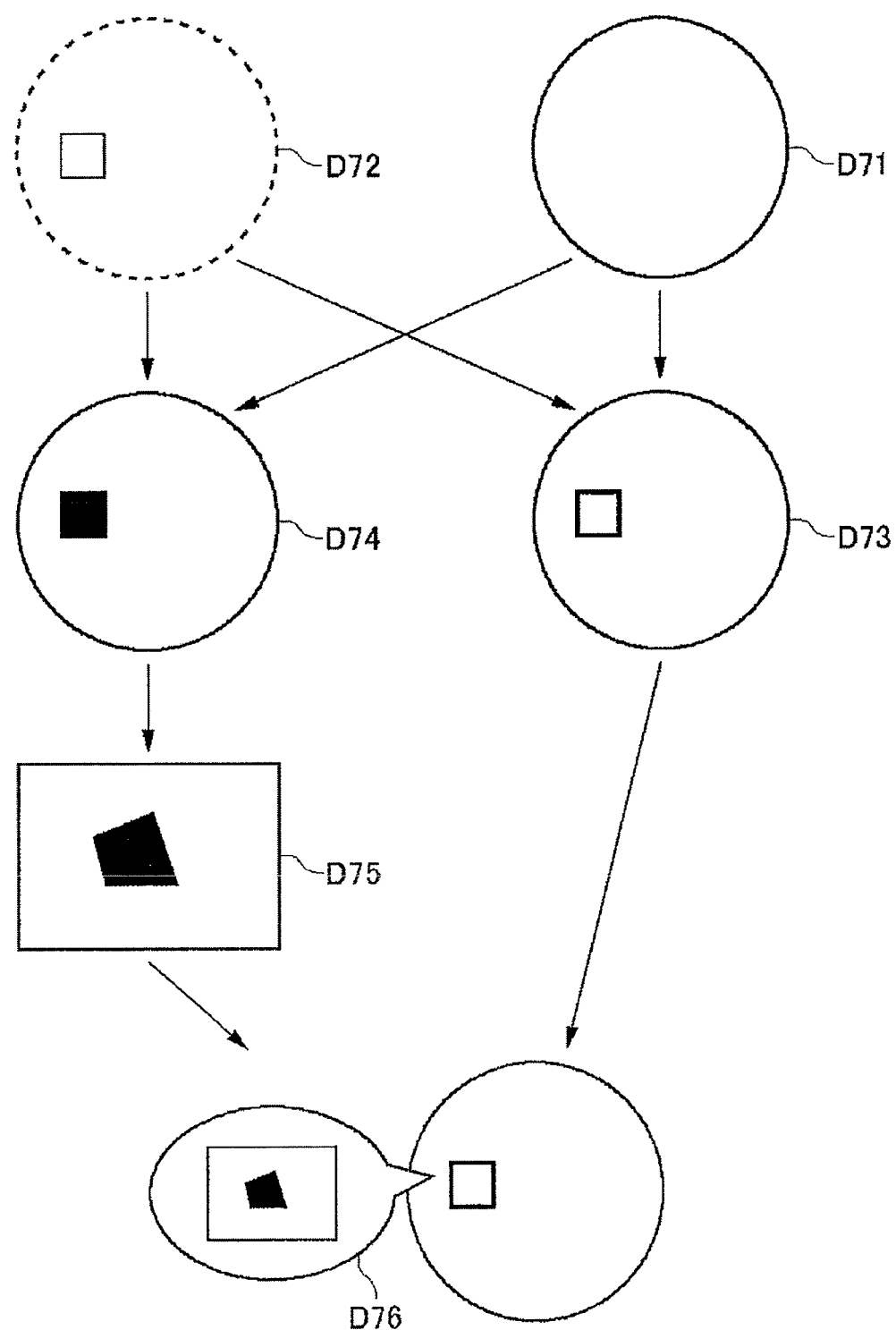
FIG. 25 is a flow diagram for explaining a procedure of generating the preview image in the fourth embodiment of the present technology.

FIG. 25 is a flow diagram for explaining a procedure of generating the preview image in the fourth embodiment of the present technology. With reference to FIG. 25, a procedure of generating the preview image in the present embodiment will be described. The omnidirectional imaging section 141 images an omnidirectional image D71. Then, a masking area D72 is specified on the omnidirectional image. The masking frame superimposing section 144 superimposes a masking frame generated using the masking area D72 on the omnidirectional image D71 to generate an omnidirectional image D73 in which the masking frame is superimposed. The masking execution section 145 performs the masking processing for the masking area D72 on the omnidirectional image D71 to generate an omnidirectional image D74 on which the masking processing is performed for the masking area.

Then, the cut-out/distortion correction section 146 cuts out the cut-out range from the omnidirectional image D74 on which the masking processing is performed for the masking area and performs the distortion correction processing for the cut-out range to thereby generate a cut-out/distortion-corrected image D75 on which the masking processing is performed for the masking area. Finally, the synthesis section 147 superimposes a balloon including therein the cut-out/distortion-corrected image D75 on which the masking processing is performed for the masking area on the omnidirectional image D73 in which the masking frame is superimposed on the masking area to thereby generate a preview image D76.

Figure 26:
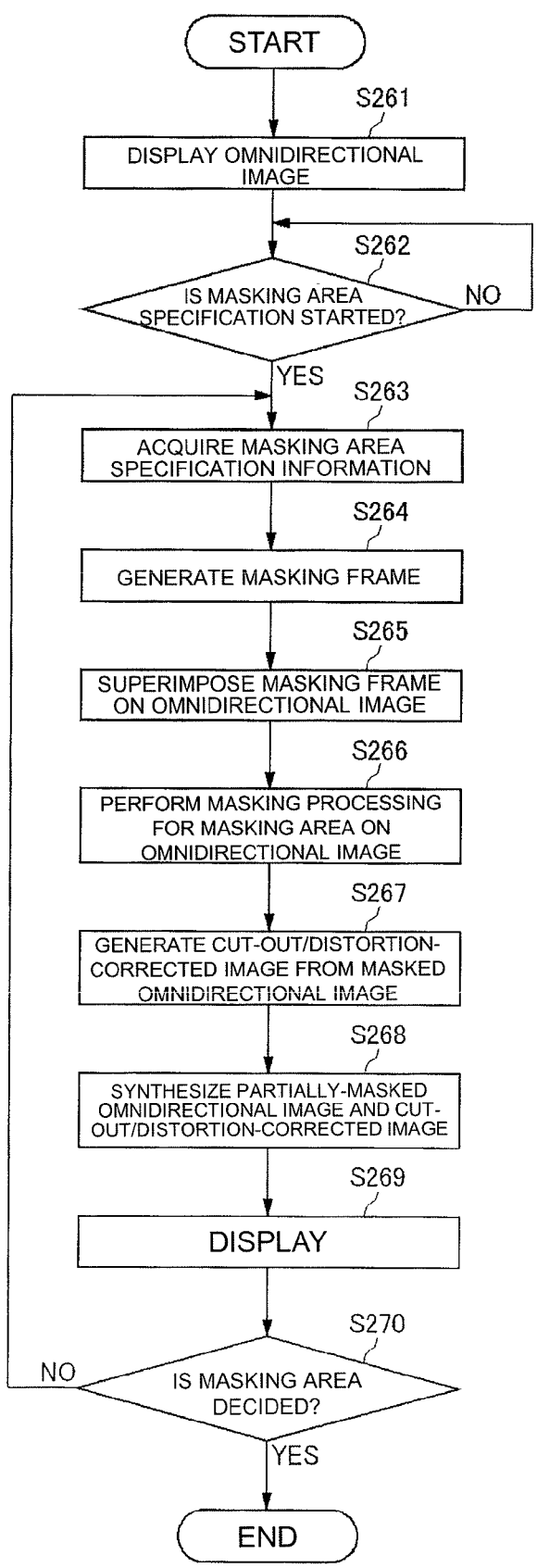
FIG. 26 is an operational flow diagram of the shooting system according to the fourth embodiment of the present technology.

FIG. 26 is an operational flow diagram of the shooting system according to the fourth embodiment of the present technology. The flow of FIG. 26 illustrates operation of the shooting system 104 in the masking area specifying mode. With reference to FIG. 26, operation of the shooting system 104 according to the fourth embodiment will be described.

The omnidirectional imaging section 141 images an omnidirectional image, and the display section 244 displays the omnidirectional image (step S261). Then, it is determined whether or not the masking area specification is started (step S262) by the input section 241. Specifically, it is determined that the masking area specification is started by detecting that a start point of the masking area is clicked by operation of the input section 241. When the masking area specification is not started (NO in step S262), operation stands by until start of the masking area specification while displaying the omnidirectional image.

When the masking area specification is started, that is, when the start point of the masking area is clicked on the omnidirectional image (YES in step S262), the masking area determination section 242 calculates the masking area according to movement of the mouse pointer and transmits the specification information of the calculated masking area to the camera 140, and the masking area reception section 142 acquires the masking area specification information (step S263). Then, the masking frame generation section 143 generates the masking frame based on the masking area specification information (step S264), and the masking frame superimposing section 144 superimposes the masking frame on the omnidirectional image (step S265). The generation of the masking frame and superimposition thereof on the omnidirectional image are performed according to a position of the pointer while the pointer is being moved after start point is clicked.

Then, when an end point of the masking area is clicked, the masking area is temporarily decided, and the masking execution section 145 performs the masking processing for the temporarily decided masking area (hereinafter, referred to as simply "masking area") on the omnidirectional image (step S266). Then, the cut-out/distortion correction section 146 cuts out the cut-out range from the omnidirectional image on which the masking processing is performed for the masking area and performs the distortion correction processing for the cut-out range to thereby generate the cut-out/distortion-corrected image (step S267). In the generated cut-out/distortion-corrected image, the masking processing is performed for the masking area. The synthesis section 147 synthesizes the omnidirectional image on which the masking frame is superimposed and cut-out/distortion-corrected image on which the masking processing is performed for the masking area to thereby generate the preview image (step S268) and transmits the generated preview image to the viewer 240.

When receiving the preview image, the display switching section 243 of the viewer 240 outputs the preview image to the display section 244, and the display section 244 displays the preview image (step S269). It is determined whether or not the user decides the masking area displayed in the preview image through the input section 241 (step S270). When the masking area displayed in the preview image is decided (YES in step S270), this processing terminates. When the user cancels the masking area displayed in the preview image through the input section 241 (NO in step S270), the display switching section 243 switches the image to be output to the display section 244 to the omnidirectional image, and the flow returns to step S263 of acquiring the masking area specification information again.

As described above, according to the shooting system 104 of the present embodiment and an image display method executed thereby, the masking area is specified on the omnidirectional image, and the specified masking area is displayed in the preview image so as to be recognizable on the omnidirectional image. In the preview image, the cut-out/distortion-corrected image on which the entire image area including the masking area is subjected to the distortion correction and in which the masking area is included in a recognizable manner is displayed simultaneously. Thus, it can be confirmed what position and shape the masking area specified on the omnidirectional image assumes. When the user is satisfied with the displayed masking area as a result of the conformation, he or she instructs the "determination" for the preview image to decide the masking area.

2-2. Fifth Embodiment

Figure 27:
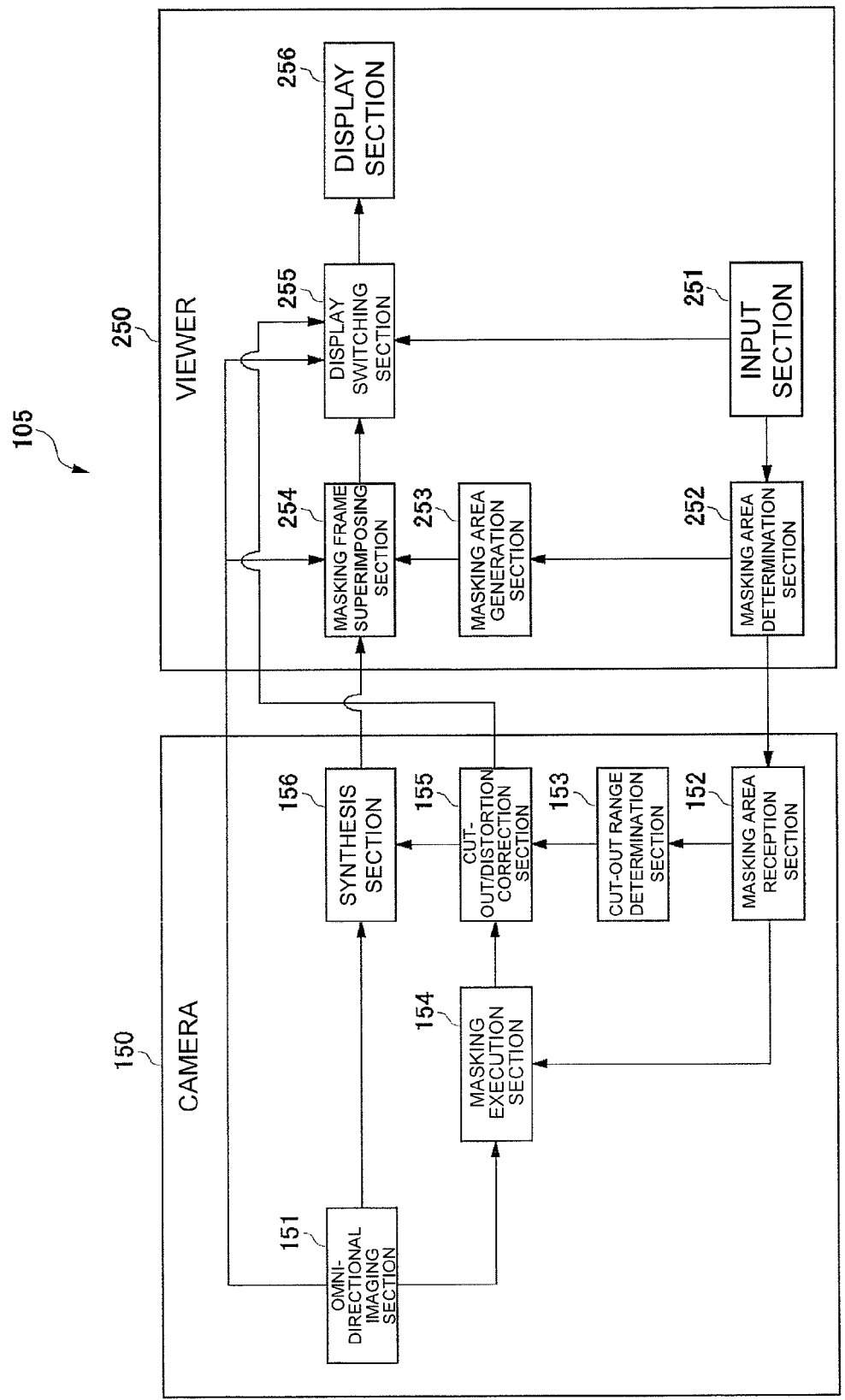
FIG. 27 is a block diagram of a shooting system according to a fifth embodiment of the present technology.

The following describes a fifth embodiment of the present technology. FIG. 27 is a block diagram of a shooting system according to the fifth embodiment of the present technology. As illustrated in FIG. 27, a shooting system 105 includes a camera 150 and a viewer 250 connected to each other. In a case where the camera 150 is a monitoring camera, the camera 150 is installed so as to be able to image a place to be monitored, and the viewer 250 is a device for a user to view an image taken by the camera 140 and subjected to image processing. The viewer 250 may be, e.g., a personal computer or a mobile terminal. The camera 150 is so-called a network camera and may be connected to the viewer 250 by wire or wireless. Further, some or all of the constituent elements other than an omnidirectional imaging section 151 of the camera 150 may be provided in the viewer 250.

The camera 150 includes an omnidirectional imaging section 151, a masking area reception section 152, a cut-out range determination section 153, a masking execution section 154, cut-out/distortion correction section 155, and a synthesis section 156. The viewer 250 includes an input section 251, a masking area determination section 252, a masking frame generation section 253, a masking frame superimposing section 254, a display switching section 255, and a display section 256.

Hereinafter, descriptions of the same configurations as those of the fourth embodiment will be omitted. The present embodiment differs from the fourth embodiment mainly in the following two points. The first difference is a difference in the procedure of generating the preview image and distribution of roles between the camera 150 and viewer 250 for the preview image generation. That is, in the fourth embodiment, in the camera 140, the masking execution section 145 performs the masking processing on the omnidirectional image, and then the cut-out/distortion correction section 146 generates the cut-out/distortion-corrected image on which the masking processing is performed for the masking area, while the masking frame superimposing section 144 superimposes the frame of the masking area on the omnidirectional image to generate the omnidirectional image on which the masking frame is superimposed, and the synthesis section 147 synthesizes the cut-out/distortion-corrected image on which the masking processing is performed for the masking area and omnidirectional image on which the masking frame is superimposed to generate the preview image illustrated in FIG. 19. On the other hand, in the present embodiment, in the camera 150, the masking processing is performed on the omnidirectional image, followed by the cut-out/distortion correction processing, to generate the cut-out/distortion-corrected image, as in the case of the fourth embodiment; however, the generated cut-out/distortion-corrected image is first synthesized with the omnidirectional image, and resultant synthetic image is transmitted to the viewer 250. The viewer 250 superimposes the masking frame on the synthetic image to thereby generate the preview image as illustrated in FIG. 19.

The second difference is that while the cut-out range in the cut-out/distortion correction section 146 is fixed in the fourth embodiment, the cut-out range is determined based on the masking area specification information in the present embodiment. A more specific description will be made below on this point.

When receiving input data from the input section 251, the masking area determination section 252 calculates the masking area and outputs the specification information representing the masking area to the masking frame generation section 253, as well as, to the camera 150. The masking area reception section 152 acquires the masking area specification information and outputs the acquired masking area specification information to the cut-out range determination section 153 and masking execution section 154. The cut-out range determination section 153 determines the cut-out range based on the masking area specification information acquired from the masking area reception section 152. The cut-out range determination section 153 stores a relationship between the masking area represented by the specification information and cut-out range. When receiving the masking area specification information, the cut-out range determination section 153 calculates the cut-out range corresponding to the masking area specification information.

Various relationships between the masking area represented by the specification information and cut-out range can be considered. In the present embodiment, the cut-out range determination section 153 determines, as the cut-out range, a rectangular area having the same center and orientation as those of the masking area and having a size 10/7 that the masking area.

The masking execution section 154 performs, on the omnidirectional image acquired from the omnidirectional imaging section 151, the masking processing for the masking area acquired from the masking area reception section 152. The cut-out/distortion correction section 155 cuts out the cut-out range determined by the cut-out range determination section 153 from the omnidirectional image on which the masking processing is performed for the masking area to thereby generate the cut-out/distortion-corrected image on which the masking processing is performed for the masking area. The generated cut-out/distortion-corrected image is output to the synthesis section 156.

In the present embodiment, the omnidirectional image taken by the omnidirectional imaging section 151 is directly output to the synthesis section 156 and transmitted to the viewer 250. The synthesis section 156 synthesizes the omnidirectional image and cut-out/distortion-corrected image generated by the cut-out/distortion correction section 155 to thereby generate a synthetic image. As illustrated in FIG. 19, in the synthetic image, the balloon including the cut-out/distortion-corrected image is superimposed on the omnidirectional image. However, in this synthetic image, the masking frame representing the masking area specified by the user is not superimposed on the omnidirectional image. The synthesis section 156 transmits the generated synthetic image to the viewer 250.

The masking frame superimposing section 254 of the viewer 250 receives the synthetic image. On the other hand, the masking frame generation section 253 generates a masking frame based on the masking area specification information acquired from the masking area determination section 252 and outputs the generated masking frame to the masking frame superimposing section 254. The masking frame superimposing section 254 superimposes the masking frame acquired from the masking frame generation section 253 on the synthetic image acquired from the camera 150 to thereby generate the preview image as illustrated in FIG. 19 and outputs the preview image to the display switching section 255.

When directly receiving the omnidirectional image from the omnidirectional imaging section 151, the masking frame superimposing section 254 superimposes the masking frame generated by the masking frame generation section 253 on the omnidirectional image and outputs the resultant image to the display switching section 255. The masking frame superimposing section 254 superimposes, according to a pointer position, a rectangular masking frame defined by a start point of the masking area and an endpoint corresponding to the pointer position during a time between specification of the start point of the masking area and end point thereof on the omnidirectional image. At this time, the masking frame superimposing section 254 superimposes the masking frame on the omnidirectional image acquired from the omnidirectional imaging section 151. After the masking area is temporarily decided, the cut-out/distortion correction section 155 generates the cut-out/distortion-corrected image on which the masking processing is performed for the temporality decided masking area, and then the synthesis section 156 generates the synthetic image on which the cut-out/distortion-corrected image is included in the balloon and transmits the synthetic image to the viewer 250. When receiving the synthetic image, the masking frame superimposing section 254 superimposes the masking frame not on the omnidirectional image acquired from the omnidirectional imaging section 151 but on the received synthetic image to generate the preview image and outputs the preview image to the display switching section 255.

The display switching section 255 acquires the omnidirectional image from the omnidirectional imaging section 151, acquires the preview image or omnidirectional image on which the masking frame is superimposed from the masking frame superimposing section 254, and acquires the cut-out/distortion-corrected image on which the masking processing is performed for the masking area from the cut-out/distortion correction section 155. The display switching section 255 acquires display mode switching information from the input section 251 and performs switching of the display mode.

In the masking area specifying mode, the display switching section 255 outputs the omnidirectional image acquired from the omnidirectional imaging section 151 to the display section 256. When acquiring the omnidirectional image on which the masking frame is superimposed from the masking frame superimposing section 254 in the masking area specifying mode, the display switching section 255 outputs the omnidirectional image on which the masking frame is superimposed to the display section 256, while acquiring the preview image from the masking frame superimposing section 254, the display switching section 255 outputs the preview image to the display section 256. In the normal mode, the display switching section 255 outputs, to the display section 256, one of the omnidirectional image acquired from the omnidirectional imaging section 151 and cut-out/distortion-corrected image on which the masking processing is performed for the masking area acquired from the cut-out/distortion correction section 155. Which one of the omnidirectional image and cut-out/distortion-corrected image on which the masking processing is performed for the masking area is to be output is determined according to an instruction from the input section 251.

Figure 28:
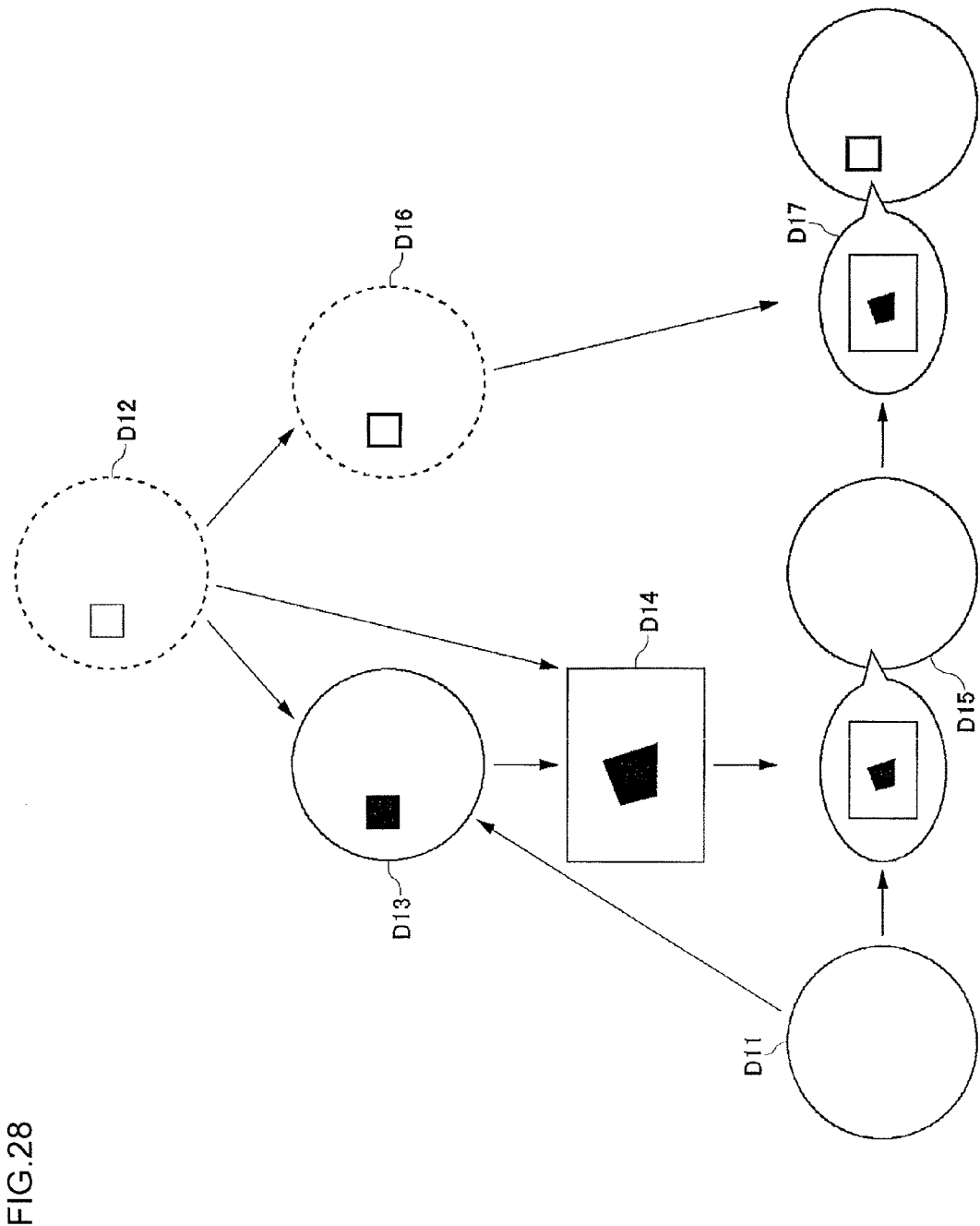
FIG. 28 is a flow diagram for explaining a procedure of generating the preview image in the fifth embodiment of the present technology.

FIG. 28 is a flow diagram for explaining a procedure of generating the preview image in the fifth embodiment of the present technology. With reference to FIG. 28, a procedure of generating the preview image in the present embodiment will be described. The omnidirectional imaging section 151 images an omnidirectional image D11. Then, a masking area D12 is specified on the omnidirectional image. The masking execution section 154 performs the masking processing for the masking area D12 on the omnidirectional image D11 to thereby generate an omnidirectional image D13 on which the masking processing is performed for the masking area. The cut-out range determination section 153 determines the cut-out range based on the masking area D12. The cut-out/distortion correction section 155 cuts out the cut-out range from the omnidirectional image D13 on which the masking processing is performed for the masking area and performs the distortion correction processing for the cut-out range to thereby generate a cut-out/distortion-corrected image D14. The synthesis section 156 superimposes a balloon including therein the cut-out/distortion-corrected image D14 on which the masking processing is performed for the masking area on the omnidirectional image D11 to thereby generate a synthetic image D15.

In the viewer 250, the masking frame generation section 253 generates a masking frame D16. The masking frame superimposing section 254 superimposes the masking frame D16 on the synthetic image D15 to thereby generate a preview image D17.

Figure 29:
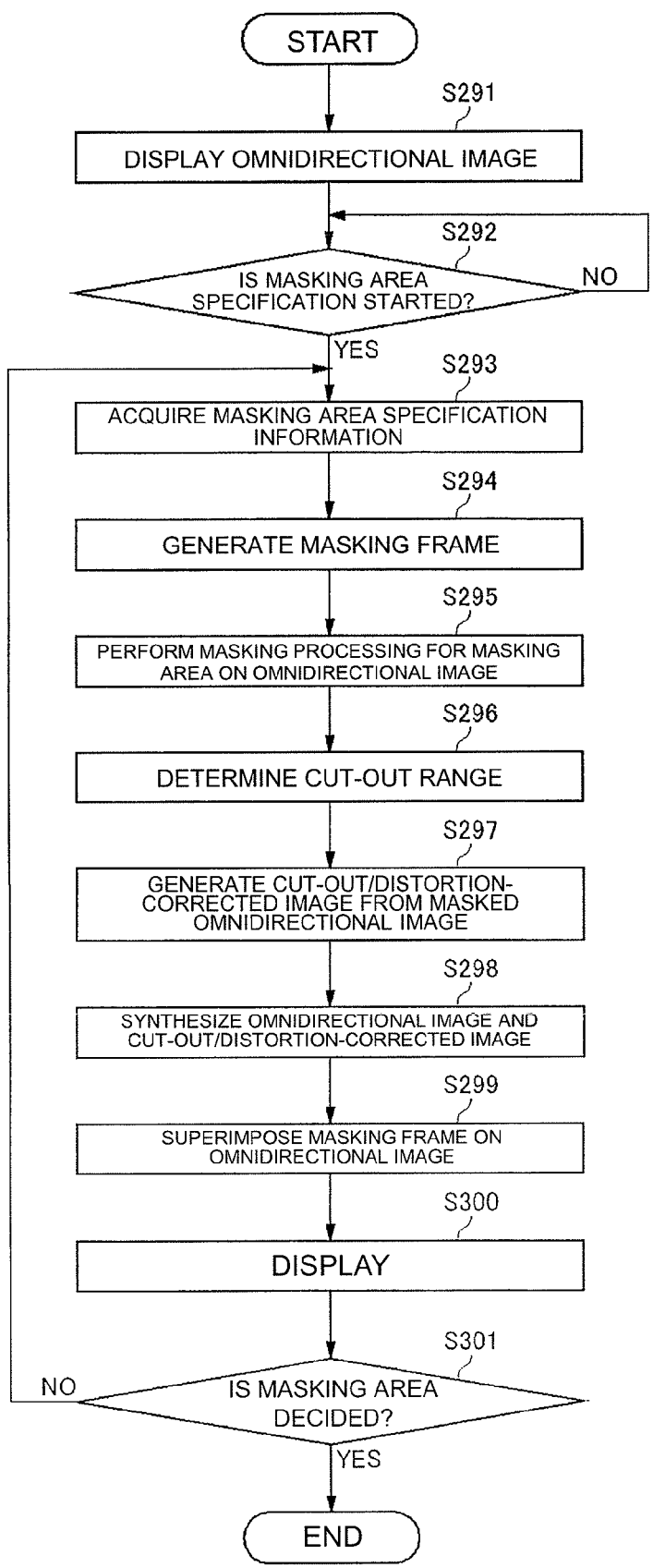
FIG. 29 is an operational flow diagram of the shooting system according to the fifth embodiment of the present technology.

FIG. 29 is an operational flow diagram of the shooting system according to the fifth embodiment of the present technology. The flow of FIG. 29 illustrates operation of the shooting system 105 in the masking area specifying mode. With reference to FIG. 29, an image display method according to the fifth embodiment will be described.

The omnidirectional imaging section 151 images an omnidirectional image, and the display section 256 displays the omnidirectional image (step S291). Then, it is determined whether or not the masking area specification is started by the input section 251 (step S292). Specifically, it is determined that the masking area specification is started by detecting that a start point of the masking area is clicked by operation of the input section 251. When the masking area specification is not started (NO in step S292), operation stands by until start of the masking area specification while displaying the omnidirectional image.

When the masking area specification is started, that is, when the start point of the masking area is clicked on the omnidirectional image (YES in step S292), the masking area determination section 252 calculates the masking area according to movement of the mouse pointer and transmits the specification information of the calculated masking area to the camera 150, as well as to the masking frame generation section 253. The masking area reception section 152 of the camera 150 acquires the masking area specification information (step S293). Further, the masking frame generation section 253 of the viewer 250 generates the masking frame based on the masking area specification information (step S294) and outputs the generated masking frame to the masking frame superimposing section 254. The masking frame superimposing section 254 superimposes the masking frame on the omnidirectional image, and the display section 256 displays the resultant image. The generation of the masking frame and superimposition thereof on the omnidirectional image are performed according to a position of the pointer while the pointer is being moved after start point is clicked.

Then, when an end point of the masking area is clicked, the masking area is temporarily decided, and the masking execution section 154 performs the masking processing for the temporarily decided masking area on the omnidirectional image (step S295), and cut-out range determination section 153 determines the cut-out range based on the temporarily decided masking area (step S296). Then, the cut-out/distortion correction section 155 cuts out the cut-out range from the omnidirectional image on which the masking processing is performed for the masking area and performs the distortion correction processing for the cut-out range to thereby generate the cut-out/distortion-corrected image (step S297). In the generated cut-out/distortion-corrected image, the masking processing is performed for the masking area. The synthesis section 156 synthesizes the omnidirectional image acquired from the omnidirectional imaging section 151 and cut-out/distortion-corrected image on which the masking processing is performed for the masking area to thereby generate the synthetic image (step S298) and transmits the generated synthetic image to the viewer 250.

When receiving the synthetic image, the masking frame superimposing section 254 superimposes the masking frame generated by the masking frame generation section 253 on the synthetic image to thereby generate the preview image and outputs the generated preview image to the display switching section 255 (step S299), and the display section 256 displays the preview image (step S300). It is determined whether or not the user decides the masking area displayed in the preview image through the input section 251 (step S301). When the masking area displayed in the preview image is decided (YES in step S301), this processing terminates. When the user cancels the masking area displayed in the preview image through the input section 251 (NO in step S301), the display switching section 253 switches the image to be output to the display section 254 to the omnidirectional image, and the flow returns to step S293 of acquiring the masking area specification information again.

As described above, in the present embodiment, the masking frame is generated in the viewer 250 and, further, in the viewer 250, the preview image is generated by superimposing the masking frame on the synthesis image or the omnidirectional image on which the masking frame is superimposed is generated. As described above, for specifying the masking area, the start point is specified, and then a rectangular frame having two diagonal vertexes of the start point and a current pointer position is generated and superimposed on the omnidirectional image. At this time, when a configuration is such that information of the start point and pointer position is transmitted to the camera 150, the rectangular frame is generated and superimposed on the omnidirectional image on the camera 150 side, and the resultant image is transmitted to the viewer 250, it may be difficult to display the rectangular frame on the omnidirectional image following movement of the pointer when a communication situation is bad. On the other hand, in the present embodiment, the masking frame is generated in the viewer 250 provided with the input section 251 for specifying the pointer position and display section 256 for displaying the omnidirectional image on which the masking frame is superimposed and superimposed on the omnidirectional image. Thus, irrespective of the communication situation between the camera 150 and viewer 250, the masking frame can be displayed in a superimposed manner on the omnidirectional image without delay.

Further, in the present embodiment, the cut-out range determination section 153 determines the cut-out range based on the masking area specification area, so that it is possible to confirm the cut-out/corrected image including the masking area together with the omnidirectional image. The configuration for determining the cut-out range based on the masking area specification information which has been described in the present embodiment can be applied to the shooting system according to the other embodiments of the present technology.

2-3. Sixth Embodiment

Figure 30:
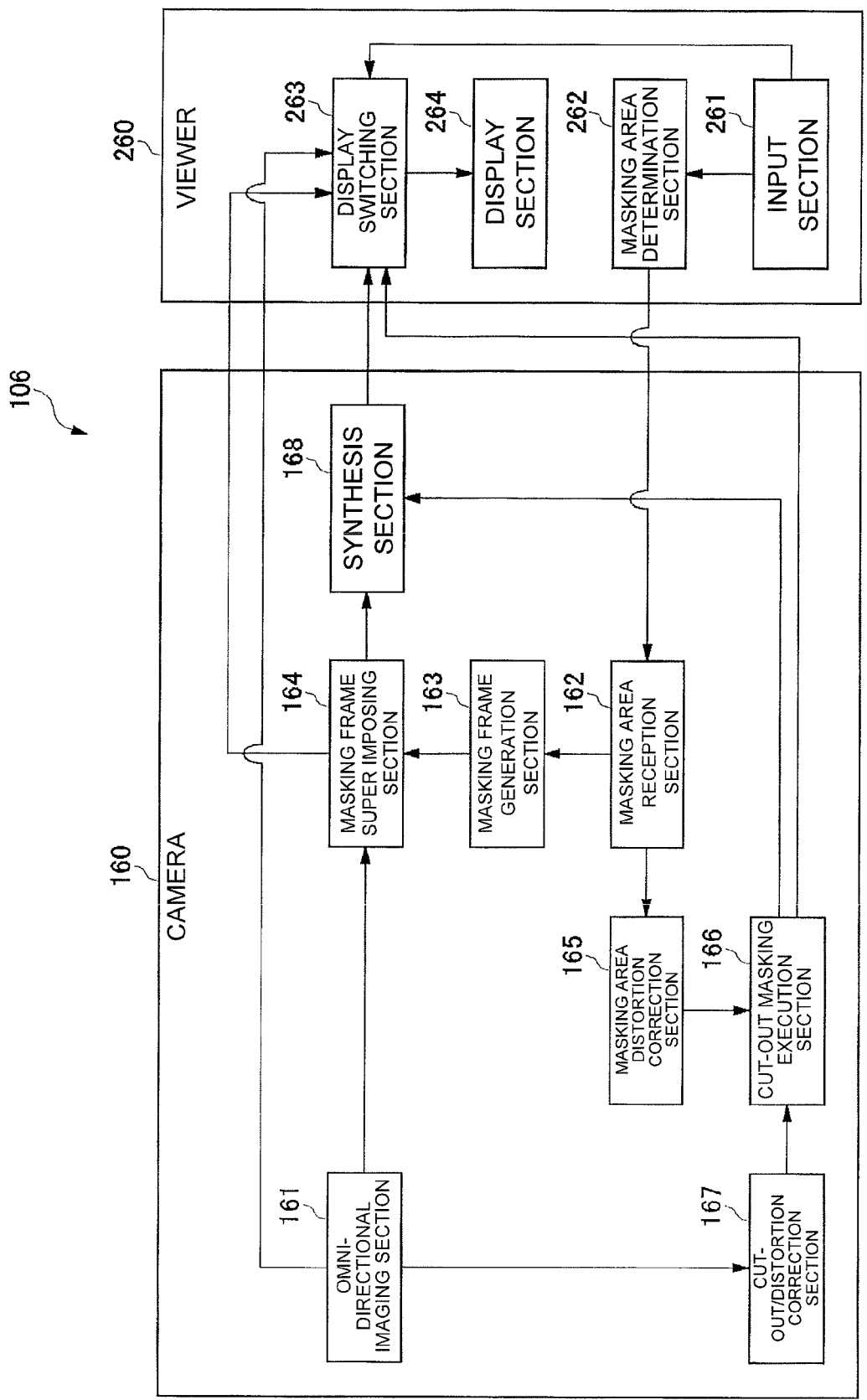
FIG. 30 is a block diagram of shooting system according to a sixth embodiment of the present technology.

The following describes a sixth embodiment of the present technology. FIG. 30 is a block diagram of an image display system according to the sixth embodiment of the present technology. As illustrated in FIG. 30, a shooting system 106 includes a camera 160 and a viewer 260 connected to each other. In a case where the camera 160 is a monitoring camera, the camera 160 is installed so as to be able to image a place to be monitored, and the viewer 260 is a device for a user to view an image imaged by the camera 160 and subjected to image processing. The viewer 260 may be, e.g., a personal computer or a mobile terminal. The camera 160 is so-called a network camera and may be connected to the viewer 260 by wire or wireless. Further, some or all of the constituent elements other than an omnidirectional imaging section 161 of the camera 160 may be provided in the viewer 260.

The camera 160 includes an omnidirectional imaging section 161, a masking area reception section 162, a masking frame generation section 163, a masking frame superimposing section 164, a masking area distortion correction section 165, a cut-out masking execution section 166, a cut-out correction section 167, and a synthesis section 168. The viewer 260 includes an input section 261, a masking area determination section 262, a display switching section 263, and a display section 264.

Hereinafter, descriptions of the same configurations as those of the fourth embodiment will be omitted. In the present embodiment, for generation of the cut-out/distortion-corrected image on which the masking processing is performed for the masking area, cut-out/distortion correction processing is performed for the omnidirectional image to generate the cut-out/distortion-corrected image, while the cut-out/distortion correction processing is performed also for the masking area using the same correction parameter (transform matrix) as that used in the cut-out/distortion correction processing for the omnidirectional image to thereby generate a cut-out/distortion-corrected masking area. Then, the masking processing is performed for the cut-out/distortion-corrected masking area in the cut-out/distortion-corrected image to generate the cut-out/distortion-corrected image on which the masking processing is performed for the masking area. A more specific description will be made below on this point.

When the input section 261 inputs coordinates of the start point and endpoint specified on the omnidirectional image, the masking area determination section 262 calculates the masking area and transmits the corresponding masking area specification information to the camera 160. The masking area reception section 162 of the camera 160 receives the masking area specification information and outputs the received masking area specification information to the masking area distortion correction section 165 and masking frame generation section 163.

The masking frame generation section 163 generates the masking frame based on the masking area specification information acquired from the masking area reception section 162 and outputs the generated masking frame to the masking frame superimposing section 164. The masking frame superimposing section 164 acquires the omnidirectional image from the omnidirectional imaging section 161 and superimposes the masking frame on the omnidirectional image to thereby generate the omnidirectional image on which the masking frame is superimposed and outputs the resultant omnidirectional image to the synthesis section 168.

On the other hand, the masking area distortion correction section 165 performs the cut-out/distortion correction processing for the masking area based on the masking area specification information acquired from the masking area reception section 162 to thereby generate the cut-out/distortion-corrected masking area and outputs the generated cut-out/distortion-corrected masking area to the cut-out masking execution section 166. The cut-out correction section 167 performs the cut-out/distortion correction processing for the omnidirectional image acquired from the omnidirectional imaging section 161 to thereby generate the cut-out/distortion-corrected image and outputs the generated cut-out/distortion-corrected image to the cut-out masking execution section 166.

The cut-out masking execution section 166 performs the masking processing for the cut-out/distortion-corrected masking area on the cut-out/distortion-corrected image to thereby generate the cut-out/distortion-corrected image on which the masking processing is performed for the masking area and outputs the generated cut-out/distortion-corrected image to the synthesis section 168. The synthesis section 168 acquires the omnidirectional image on which the masking frame is superimposed from the masking frame superimposing section 164, acquires the cut-out/distortion-corrected image on which the masking processing is performed for the masking area from the cut-out masking execution section 166, and uses the acquired images to generate the preview image as illustrated in FIG. 19. The display switching section 263 and display section 264 in the viewer 260 are the same as the display switching section 243 and display section 244 of the fourth embodiment, so descriptions thereof will be omitted.

Figure 31:
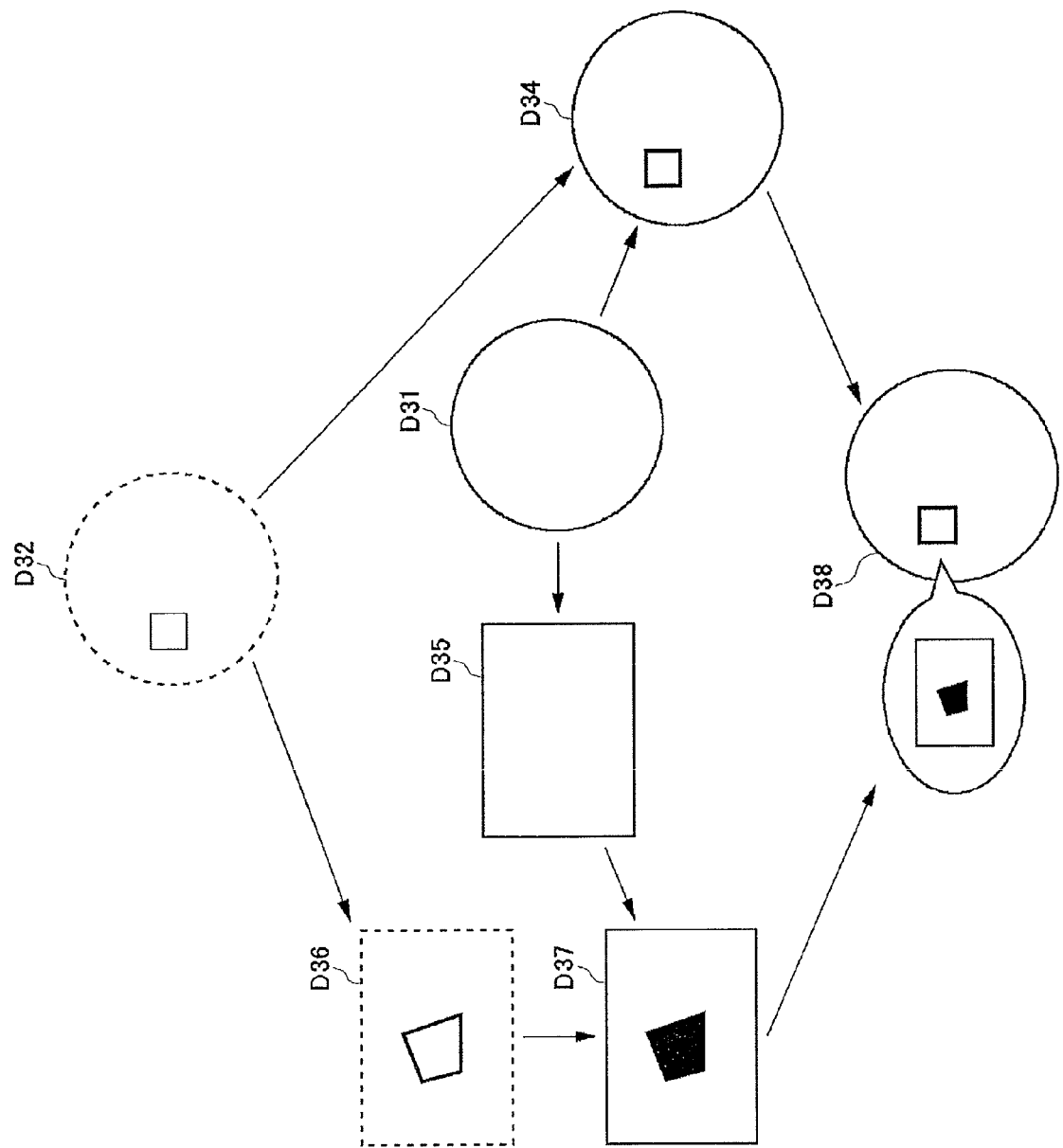
FIG. 31 is a flow diagram for explaining a procedure of generating the preview image in the sixth embodiment of the present technology.

FIG. 31 is a flow diagram for explaining a procedure of generating the preview image in the sixth embodiment of the present technology. With reference to FIG. 31, a procedure of generating the preview image in the present embodiment will be described. The omnidirectional imaging section 161 images an omnidirectional image D31. Then, a masking area D32 is specified on the omnidirectional image D3. Then, the masking frame generation section 163 generates the masking frame, and the masking frame superimposing section 164 superimposes the masking frame on the omnidirectional image D31 to thereby generate an omnidirectional image D34 on which the masking frame is superimposed.

On the other hand, the cut-out correction section 167 cuts out the cut-out range from the omnidirectional image D31 and performs the distortion correction processing for the cut-out range to thereby generate a cut-out/distortion-corrected image D35. The masking area distortion correction section 165 performs the same cut-out/distortion correction processing as that performed by the cut-out correction section 167 for a masking area D32 to thereby generate a cut-out/distortion-corrected masking area D36. Then, the cut-out masking execution section 166 performs the masking processing for the cut-out/distortion-corrected masking area D36 on the cut-out/distortion-corrected image D35 to thereby generate a cut-out/distortion-corrected image D37 on which the masking processing is performed for the masking area. Finally, the synthesis section 168 superimposes, on the omnidirectional image D34 in which the masking frame is superimposed on the masking area, a balloon including therein the cut-out/distortion-corrected image D37 on which the masking processing is performed for the masking area to thereby generate a preview image D38.

Figure 32:
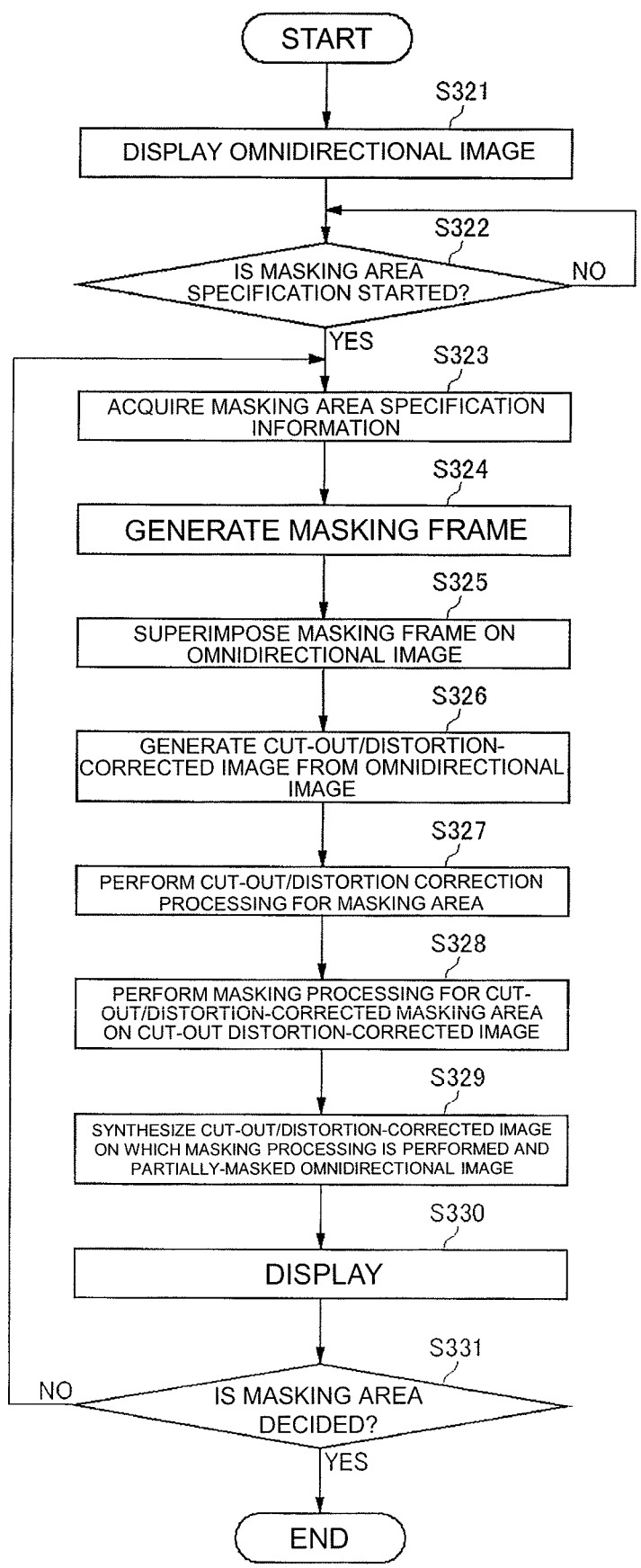
FIG. 32 is an operational flow diagram of the shooting system according to the sixth embodiment of the present technology.

FIG. 32 is an operational flow diagram of the shooting system according to the sixth embodiment of the present technology. The flow of FIG. 32 illustrates operation of the shooting system 106 in the masking area specifying mode. With reference to FIG. 32, operation of an image display method according to the sixth embodiment will be described.

The omnidirectional imaging section 161 images an omnidirectional image, and the display section 264 displays the omnidirectional image (step S321). Then, it is determined whether or not the masking area specification is started (step S322) by the input section 261. Specifically, it is determined that the masking area specification is started by detecting that a start point of the masking area is clicked by operation of the input section 261. When the masking area specification is not started (NO in step S322), operation stands by until start of the masking area specification while displaying the omnidirectional image.

When the masking area specification is started, that is, when the start point of the masking area is clicked on the omnidirectional image (YES in step S322), the masking area determination section 262 calculates the masking area according to movement of the mouse pointer and transmits the specification information of the calculated masking area to the camera 160. When the masking area reception section 162 of the camera 16n acquires the masking area specification information (step S323), the masking frame generation section 163 generates the masking frame based on the masking area specification information (step S324), the masking frame superimposing section 164 superimposes the masking frame on the omnidirectional image (step S325), and the display section 264 displays the resultant image. The generation of the masking frame and superimposition thereof on the omnidirectional image are performed according to a position of the pointer while the pointer is being moved after start point is clicked.

Then, when an end point of the masking area is clicked, the masking area is temporarily decided, and the masking frame superimposing section 164 outputs the omnidirectional image on which the masking frame is superimposed to the synthesis section 168. The cut-out correction section 167 performs the cut-out/distortion correction processing for the omnidirectional image to thereby generate the cut-out/distortion-corrected image (step S326). The masking area distortion correction section 165 performs the same correction processing as the cut-out/distortion correction processing performed in step S326 for a masking area to thereby generate the cut-out/distortion-corrected masking area (step S327). Then, the cut-out masking execution section 166 performs the masking processing for the cut-out/distortion-corrected masking area, generated in step S327, on the cut-out/distortion-corrected image, generated in step S326, on which the masking processing is performed (step S328).

The synthesis section 168 acquires the omnidirectional image on which the masking frame is superimposed from the masking frame superimposing section 164 and acquires the cut-out/distortion-corrected image on which the masking processing is performed for the masking area from the cut-out masking execution section 166. Then, the synthesis section 168 synthesizes the acquired images to generate the preview image as illustrated in FIG. 19 (step S329) and outputs the generated preview image to the display switching section 263. Then, the display section 264 displays the preview image (step S330). It is determined whether or not the user decides the masking area displayed in the preview image through the input section 261 (step S331). When the masking area displayed in the preview image is decided (YES in step S331), this processing terminates. When the user cancels the masking area displayed in the preview image through the input section 261 (NO in step S331), the display switching section 263 switches the image to be output to the display section 264 to the omnidirectional image, and the flow returns to step S323 of acquiring the masking area specification information again.

As described above, in the present embodiment, the cut-out/distortion correction processing is performed for the masking area and omnidirectional image using the same correction parameter, and the distortion-corrected image is subjected to the masking processing with the masking area obtained by the correction processing. According to the present embodiment, the masking processing is executed after the distortion correction processing, so that it is possible to use a display method of, e.g., not displaying a masked image but depicting only the frame in the preview image. Further, as described above, the configuration for determining the cut-out range based on the masking area specification information which has been described in the second embodiment can be applied to the present embodiment. In this case, information of the cut-out range determined by the masking area specification information is shared between the cut-out correction section 167 and masking area distortion correction section 165.

The fourth to sixth embodiments have thus been described. Various modifications can be made to the fourth to sixth embodiments. The following describes the various modifications.

2-4. Modifications

Figure 33A:
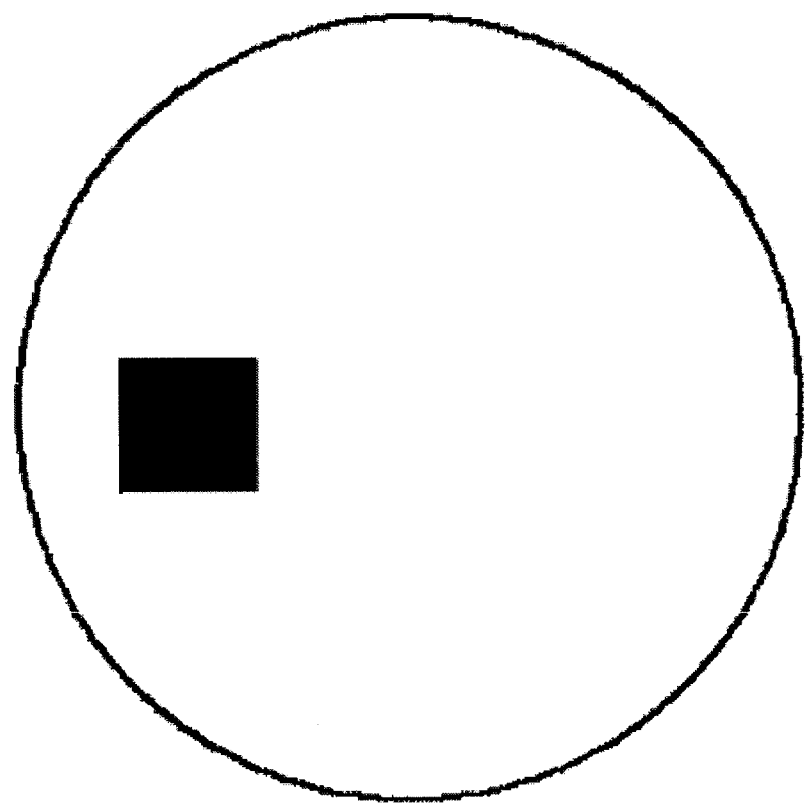
FIG. 33A is a view illustrating an example in which the masking area is specified on the omnidirectional image in the modification of the present technology.

FIGS. 33A to 33D are views each illustrating a modification of instruction operation of the preview image display of the present technology. FIGS. 33A to 33D illustrate display examples of operation from specification of the masking area to instruction of the preview image display in a case where a touch panel including a liquid crystal panel serving as the display section and a touch sensor serving as the input section is used. FIG. 33A is a view illustrating an example in which the masking area is specified on the omnidirectional image. The user makes a pinch-in operation on the touch panel displaying the omnidirectional image to thereby specify the masking area. Here, as in the case of the above embodiments, a rectangular area formed by vertical and horizontal sides having two points specified by the pinch-in operation as the vertexes is set as the masking area.

Figure 33B:
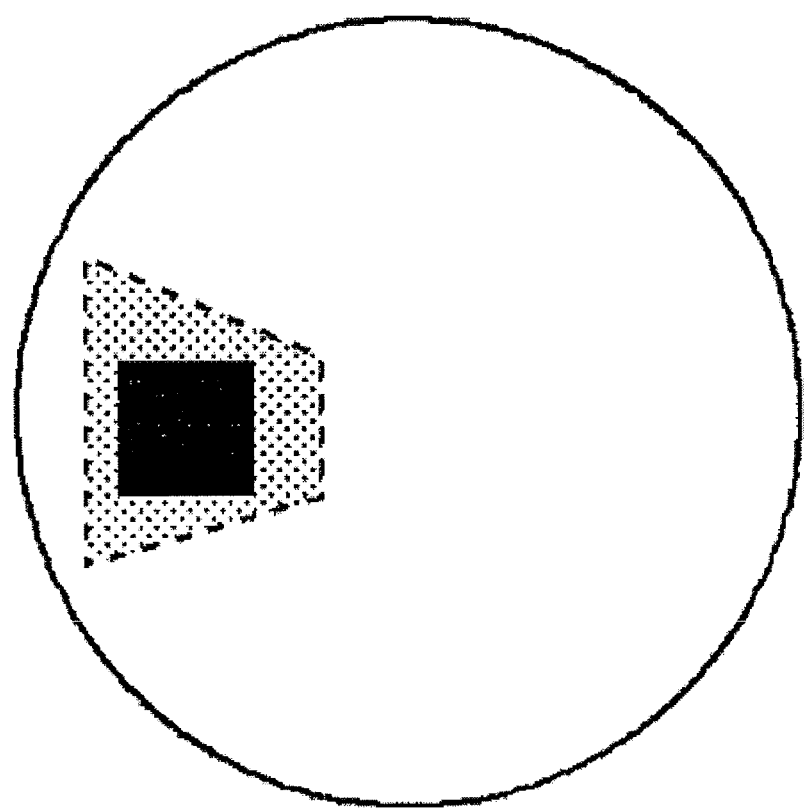
FIG. 33B is a view illustrating an example in which the cut-out range is specified on the omnidirectional image in the modification of the present technology.
Figure 33C:
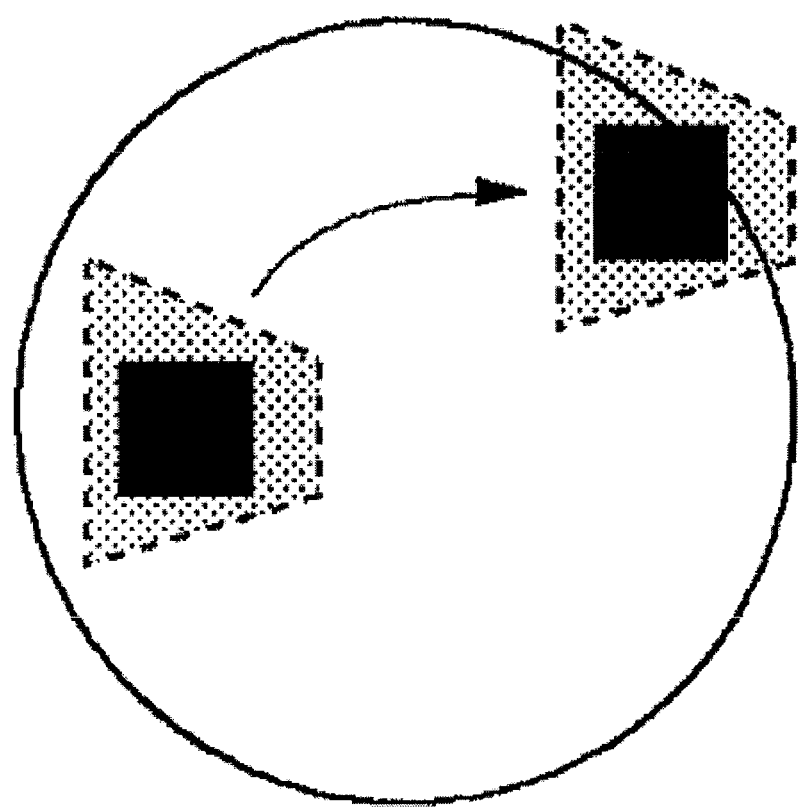
FIG. 33C is a view illustrating an example in which an instruction of display of the preview image on the omnidirectional image is issued in the modification of the present technology.
Figure 33D:
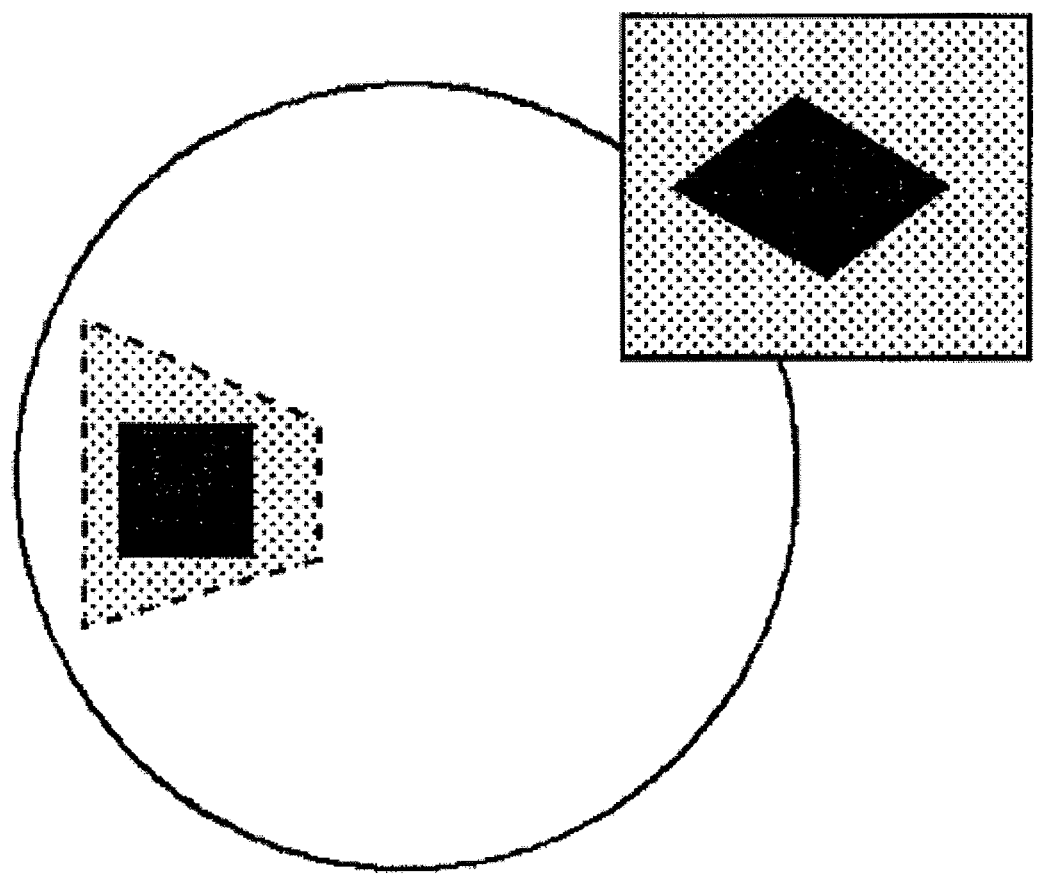
FIG. 33D is a view illustrating a display example of the preview image in the modification of the present technology.

FIG. 33B is a view illustrating an example in which the cut-out range is specified on the omnidirectional image. The user makes a pinch-out operation on the omnidirectional image on which the masking area is superimposed to thereby specify the cut-out range. Here, a shape in which two points specified by the pinch-out operation is two diagonal vertexes in the cut-out/corrected image whose cut-out direction is the radial direction is set as the cut-out range. FIG. 33C is a view illustrating an example in which an instruction of display of the preview image on the omnidirectional image is issued. When the user flicks the masking area or cut-out range, the cut-out/distortion-corrected image on which the masking processing is performed for the masking area on the omnidirectional image is displayed. FIG. 33D is a view illustrating a display example of the preview image. In the preview image according to the present modification, a balloon including the cut-out/distortion-corrected image is not displayed, but the cut-out/distortion-corrected image is directly displayed in a superimposed manner on the omnidirectional image. Further, in the preview image, the cut-out/distortion-corrected image is disposed at an end point of the flick operation.

As long as the preview image is configured to display simultaneously the omnidirectional image and cut-out/distortion-corrected image as in the present modification, the preview image is not limited to the example described in the above embodiments. For example, in the preview image, the omnidirectional image and cut-out/distortion-corrected image may be arranged in parallel.

Further, in the above embodiments, for the omnidirectional image, the masking frame is superimposed on the omnidirectional image so as to present the masking area; while for the cut-out/distortion-corrected image, the masking processing is actually performed for the masking area so as to present the masking area. However, the present technology is not limited to this. The masking area on the omnidirectional image may be subjected to the masking processing so as to represent the masking area on the omnidirectional image, and the masking frame may be superimposed on the cut-out/distortion-corrected image so as to present the masking area on the cut-out/distortion-corrected image.

Further, in the above embodiments, when specifying the masking area, the user specifies two points of start point and end point on the omnidirectional image and sets, as the masking area on the omnidirectional image, a rectangle formed by vertical and horizontal sides and having the specified two points as diagonal vertexes. However, the present technology is not limited to this. For example, the following procedure may be taken: specifying two points on the omnidirectional image to calculate, on the cut-out/distortion-corrected image, a rectangular area formed by vertical and horizontal sides and having the specified two points as the two vertexes; performing transform inverse to the cut-out/distortion correction processing for the calculated rectangular area to calculate the masking area on the omnidirectional image; and superimposing the calculated masking area on the omnidirectional image. In this procedure, the user specified the two points on the omnidirectional image; however, on the omnidirectional image, the rectangular having the specified two points as the diagonal vertexes is not displayed as the specified area to be processed, but a distorted area (which assumes a rectangle after the cut-out/distortion correction processing) is superimposed on the omnidirectional image. Further, it goes without saying that the masking area to be specified is not limited to the rectangle.

Further, in the above embodiments, the masking area is specified by specifying two points on the omnidirectional image. However, the present technology is not limited to this. A size and a shape of the masking area may previously be determined, and in this case, the user may specify only one point for specifying the position of the masking area having a predetermined size and a predetermined shape on the omnidirectional image.

Further, in the above embodiments, when the masking area is specified on the omnidirectional image, the cut-out/distortion-correction image on which the masking processing is performed for the masking area is synthesized with the omnidirectional image to thereby generate the preview image. However, the present technology is not limited to this. For example, the following procedure may be taken: previously displaying the cut-out/distortion-corrected image; specifying the masking area on the previously displayed cut-out/distortion-corrected image to present the specified masking area on the cut-out/distortion-corrected image; synthesizing the omnidirectional image on which the masking processing is performed for the masking frame representing the masking area and cut-out/distortion-corrected image; and displaying the resultant synthetic image.

Further, in the above embodiments, the examples in which the cut-out range is previously determined and in which the cut-out range is determined based on the specification of the masking area have been described; however, the cut-out range may be determined according to another method. For example, the cut-out range may be determined by user's specification of the cut-out range independent of the masking area specification. Further, a position of the cut-out range may be fixed or movable. Further, a different cut-out range may be set every time the user re-specifies the masking area after "canceling" the displayed preview image.

Further, in the above embodiments, one cut-out/distortion-corrected image on which the masking processing is performed for the masking area specified on the omnidirectional image is synthesized with the omnidirectional image to generate the preview image; however, a plurality of the cut-out/distortion-corrected images on each of which the masking processing is performed for the masking area may be displayed in the preview image. That is, even where one masking area is specified on the omnidirectional image, when the cut-out range set for the masking area is different, the masking area on the cut-out/distortion-corrected image corresponding to each cut-out range is accordingly different. Thus, when different cut-out ranges are set for the masking area, the preview image may display a plurality of the cut-out/distortion-corrected images, on each of which the masking processing is performed for the masking area, corresponding to the different cut-out ranges. Further, when a plurality of the masking areas is specified on the omnidirectional image, a preview image including a plurality of the cut-out/distortion-corrected images may be generated by performing the same processing as above for each masking area.

Further, in the above embodiments, the masking processing is processing of blacking out the processing range for privacy protection; however, the present technology is not limited to this. For example, it is possible to perform other processing for reducing an amount of information, such as processing (mosaic processing) of reducing a resolution of the masking area, so as to protect privacy. Further, it is possible to perform, as the masking processing, region of interest (ROI) processing of specifying an important range as a processing range and preferentially allocating a code amount to the processing range, so as to preferentially assure image quality of the processing range even on a low-speed communication network.

Further, in the above embodiments, the omnidirectional image imaging section images the omnidirectional image as the image having distortion using a fish-eye lens, and the image display system acquires this omnidirectional image; however, the image having distortion is not limited to the omnidirectional image as long as it is an image having distortion that can be corrected.

3. Seventh Embodiment

Figure 35:
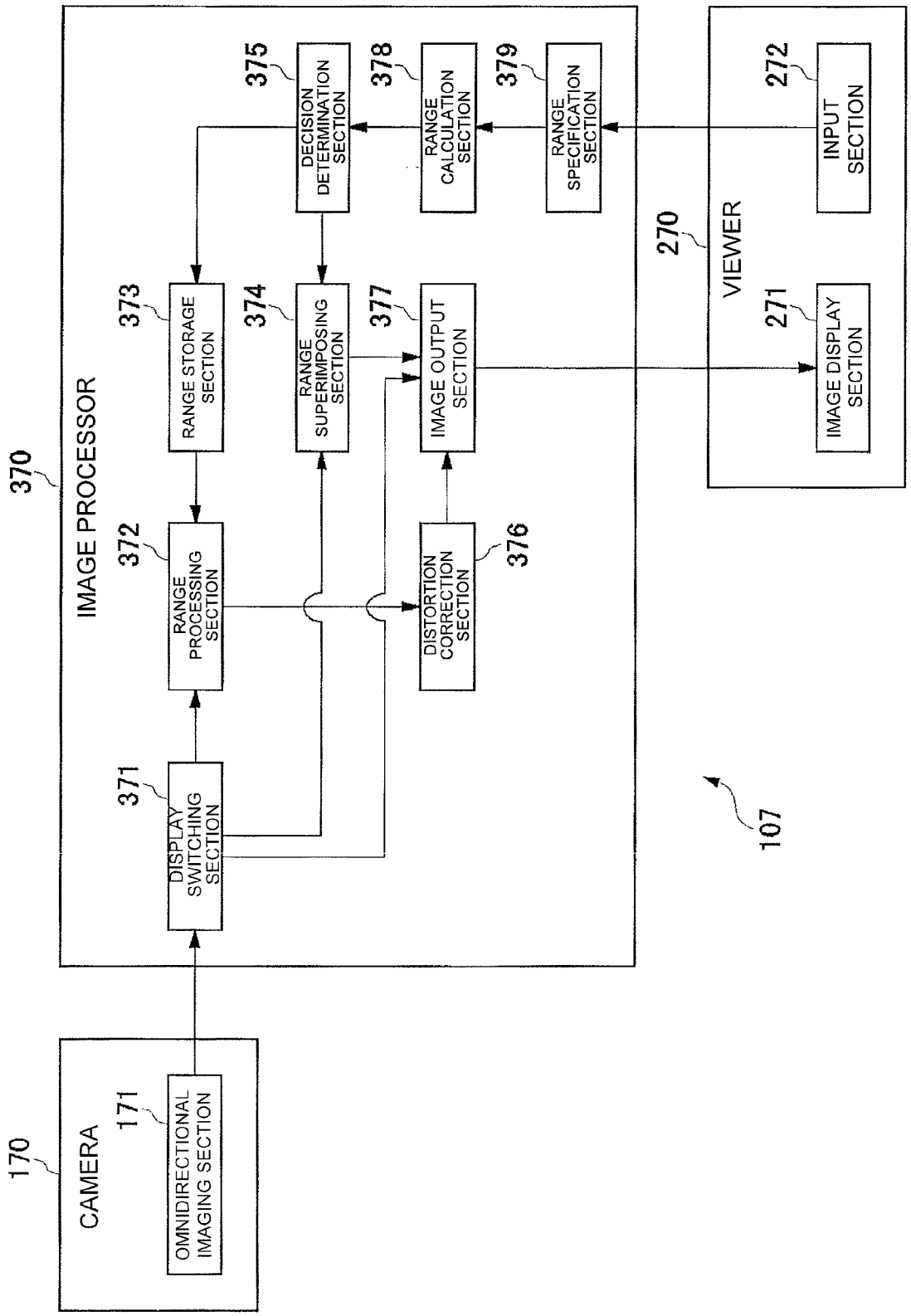
FIG. 35 is a block diagram of a shooting system according to the seventh embodiment of the present technology.

The following describes a seventh embodiment of the present technology. FIG. 35 is a block diagram of a shooting system according to the seventh embodiment of the present technology. As illustrated in FIG. 35, a shooting system 107 includes a camera 170, a viewer 270, and an image processor 370. The image processor 370 is connected with the camera 170 and viewer 270.

The camera 170 is used to shoot an image to be subject to image processing in the image processor 370 and to be displayed on the viewer 270. The camera 170 is fixed to a predetermined position so as to shoot an object to be shot.

The viewer 270 is a device for a user to view an image shot by the camera 170 and subjected to image processing in the image processor 370. The viewer 270 may be, e.g., a personal computer or a mobile terminal. In a case where the camera 170 is a monitoring camera, the camera 170 is installed so as to be able to shot a place to be monitored, and the viewer 270 is used by a person who monitors the image.

The shooting system 370 is disposed between the camera 170 and viewer 270 and connected thereto. The image processor 370 may be connected to the camera 170 and viewer 270 by wire or wireless. Further, some or all of the constituent elements of the image processor 370 may be provided in the camera 170 or the viewer 270.

The camera 170 includes an omnidirectional imaging section 171. The omnidirectional imaging section 171 is an imaging system having a fish-eye lens which is a kind of a wide-angle lens. The omnidirectional imaging section 171 is used to image a circular omnidirectional image. The omnidirectional image is the image having distortion imaged by a fish-eye lens using a projection system, such as a stereographic projection system, an equidistance projection system, an equisolid angle projection system or an orthogonal projection system. The omnidirectional imaging section 171 outputs the obtained omnidirectional image to the image processor 370. The image taken and output by the omnidirectional imaging section 171 may be a still image or a moving image.

The viewer 270 includes an input section 272 and an image display section 271. The input section 272 performs various input operations using an input device such as a mouse and a touch panel. Particularly, in the present embodiment, the input section 272 performs input for position specification and for range decision on the omnidirectional image shot by the camera 170.

The image display section 271 displays an image output from the image processor 370. The image display section 271 may be, e.g., a liquid crystal display panel. The image display section 271 displays a preview image for a user to specify a processing range in a range specification mode to be described later, while displays a normal image on which the processing range is subjected to predetermined processing in a normal mode to be described later.

The image processor 370 includes a display switching section 371, a range processing section 372, a range storage section 373, a range superimposing section 374, a decision determination section 375, a distortion correction section 376, an image output section 377, a range calculation section 378, and a range specification section 379. The image processor 370 operates in a normal mode or a range specification mode. The normal mode is a mode for displaying the image shot by the camera 170 on the viewer 270, and the range specification mode is a mode for determining a processing range.

The display switching section 371 receives an input of the omnidirectional image shot by the omnidirectional imaging section 171 and then determines an output destination of the omnidirectional image. The display switching section 371 outputs the input image to the range processing section 372 in the normal mode while outputs the input image to the range superimposing section 374 in the range specification mode. The display switching section 371 outputs, to the image output section 377, information indicating which one of the sections 374 and 371 is determined as the output destination.

The normal mode includes a plurality of display modes, such as a mode for displaying a panoramic image, a mode for displaying a plurality of the cut-out/distortion-corrected images, and a mode for displaying a single cut-out/distortion-corrected image. The display switching section 371 outputs, together with the input image, information related to the display mode to the range processing section 372.

The range processing section 372 acquires the omnidirectional image from the display switching section 371 and uses information related to the processing range stored in the range storage section 373 to perform image processing for the processing range in the omnidirectional image. In the present embodiment, the range processing section 372 performs, as the image processing, masking processing of blacking out the processing range. Thus, the processing range corresponds to the masking area.

The range processing section 372 adopts a processing range corresponding to the display mode from the processing range stored in the range storage section 373. Further, when the omnidirectional image is directly displayed in a case where a plurality of processing ranges corresponding, respectively, to a plurality of display modes is stored in the range storage section 373, the range processing section 372 set, as the processing range, a range obtained by combining (AND processing) the plurality of processing ranges.

The range storage section 373 stores information related to the processing range to be subjected to image processing by the range processing section 372. In a case where the normal mode includes the plurality of display modes, the range storage section 373 stores the processing range for each display mode. The information related to the processing range is acquired from the decision determination section 375.

The range storage section 373 may store the processing range as a set of coordinates of positions on an outer periphery (frame) of the processing range on the omnidirectional image or may store the processing range as a set of functions representing curves constituting the outer periphery (frame) of the processing range.

Figure 36A:
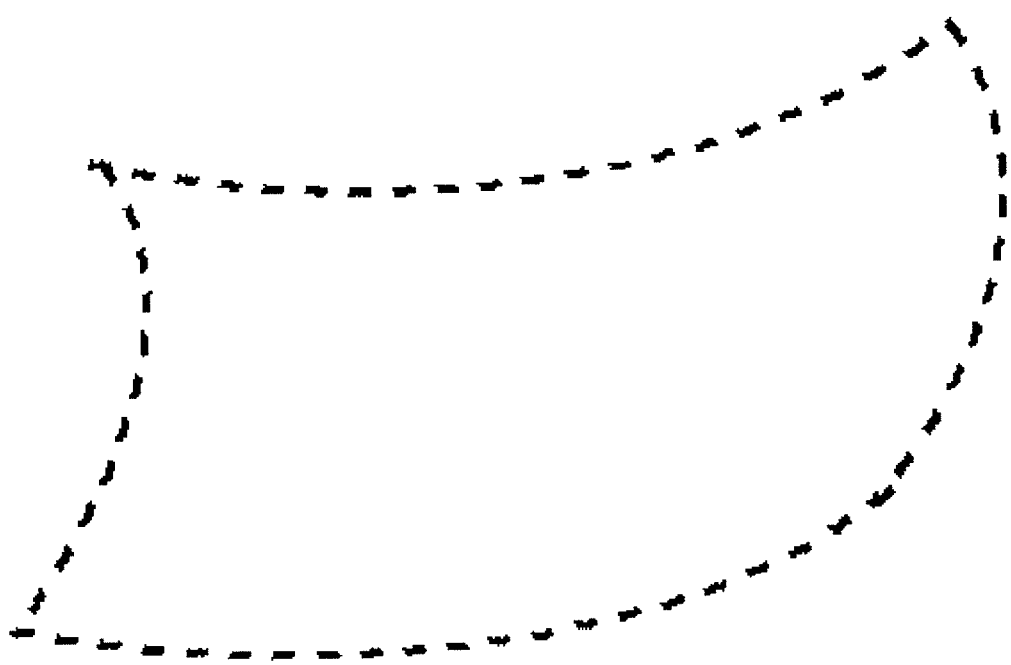
FIG. 36A is a view illustrating a processing range (when stored as a set of coordinates) stored in a range storage section according to the seventh embodiment of the present technology.
Figure 36B:
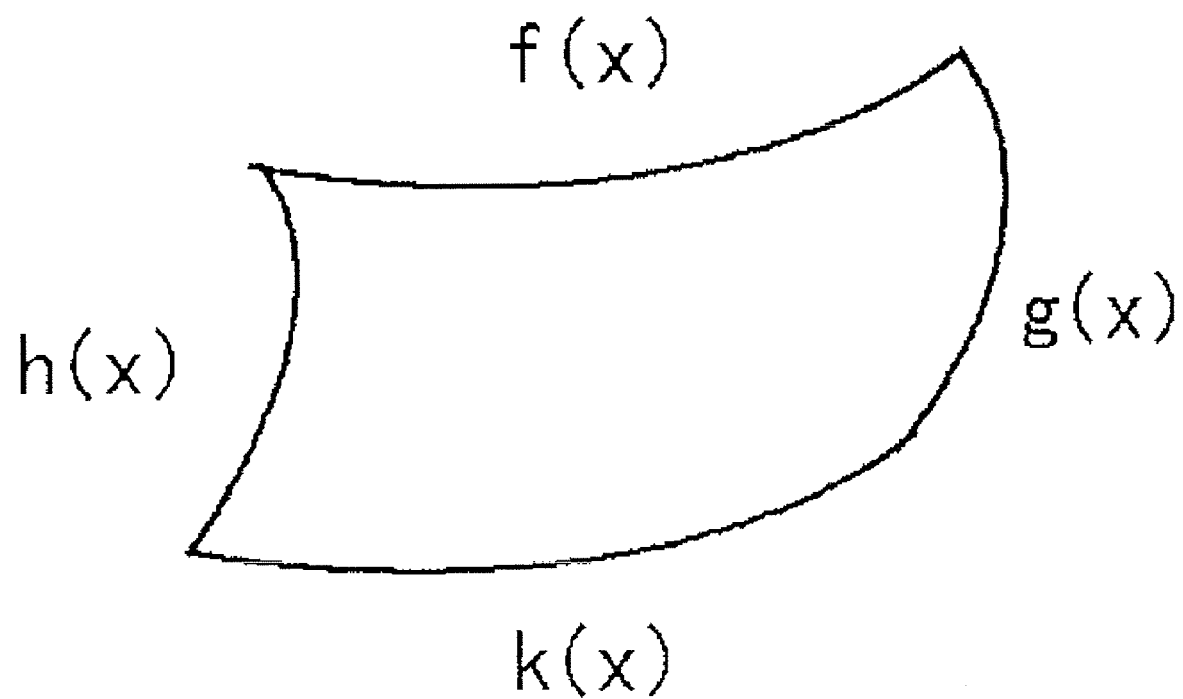
FIG. 36B is a view illustrating a processing range (when stored as a set of functions) stored in the range storage section according to the seventh embodiment of the present technology.

FIGS. 36A and 36B are each a view illustrating the processing range stored in the range storage section 373. FIG. 36A illustrates a case where the processing range is stored as a set of coordinates, and FIG. 36B illustrates a case where the processing range is stored as a set of functions. In FIG. 36A, the range storage section 373 stores coordinates (x0, y0), (x1, y1), . . . of all points (pixels) constituting the outer periphery of the processing range. In FIG. 36B, the range storage section 373 stores four functions f(x), g(x), h(x), and k(x) respectively representing curves constituting the outer periphery of the processing range.

The range superimposing section 374, decision determination section 375, range calculation section 378, and range specification section 379 are used in the range specification mode. The mode (range specification mode or normal mode) to be selected is specified by user operation through the input section 272 of the viewer 270, and the input information is given to the image processor 370.

The range superimposing section 374 acquires the omnidirectional image from the display switching section 371 in the range specification mode, superimposes image information representing an undecided processing range output from the decision determination section 375 on the acquired omnidirectional image, and outputs the resultant image to the image output section 377. In the present embodiment, the image information representing the processing range is a line segment surrounding the processing range. However, the present technology is not limited to this, but the image information may be another information such as a filled processing range.

When the omnidirectional image is displayed as the preview image on the image display section 271 of the viewer 270 in the range specification mode, the range specification section 379 acquires the coordinates that the user specifies on the displayed omnidirectional image through the input section 272 and outputs the acquired coordinates to the range calculation section 378.

Figure 37A:
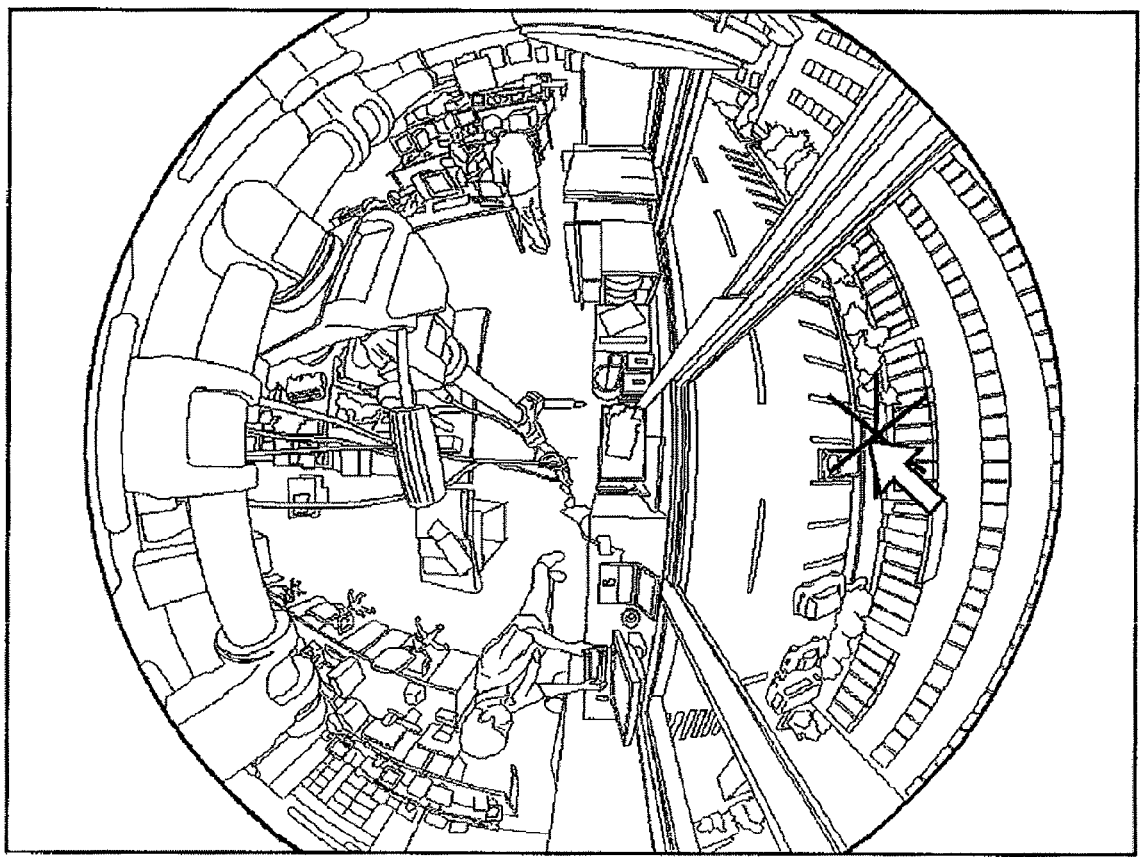
FIG. 37A is a view for explaining specification of a start point of the processing range made by a user in the seventh embodiment of the present technology.
Figure 37B:
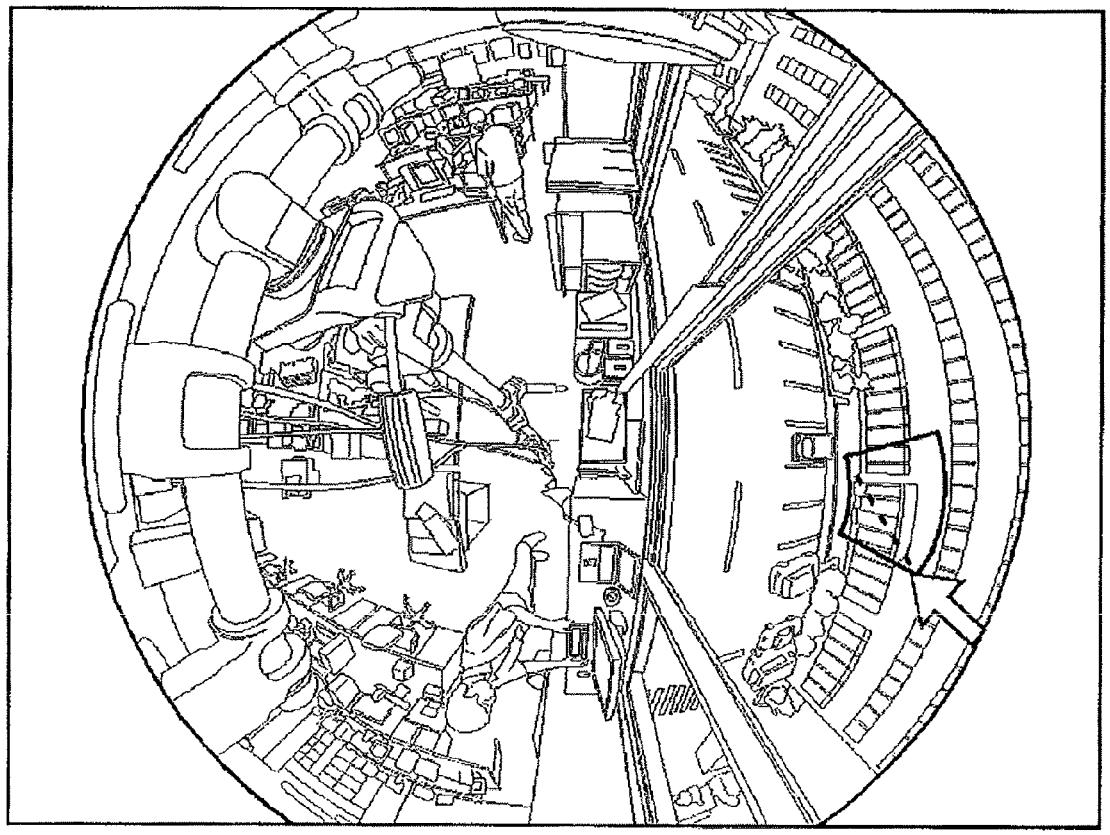
FIG. 37B is a view for explaining specification of an end point of the processing range made by a user in the seventh embodiment of the present technology.

FIGS. 37A and 37B are each a view for explaining the range specification made by the user. FIG. 37A is a view for explaining start of the range specification, and FIG. 37B is a view for explaining operation during the range specification or decision of the range specification. When the omnidirectional image as the preview image for the range specification is displayed on the image display section 271, the user specifies the processing range on the displayed omnidirectional image. In the present embodiment, the input section 272 is a device that moves a pointer using a mouse, and the thus configured input section 272 is used to specify start point and end point.

The user specifies two diagonal vertexes of a range that assumes a rectangle after the distortion correction processing. Specifically, the user uses the input section 272 to put a pointer over a portion to be set as the start point as illustrated in FIG. 37 followed by clicking, and the pointer is dragged to a portion to be set as the end point as illustrated in FIG. 37B. When the drag operation is terminated at the portion to be set as the end point, the pointer position at that time is set as the end point. With the above operation, the start point and end point are decided. During the drag operation, a processing range calculated from the start point and end point corresponding to a position of the pointer being dragged is displayed in a superimposed manner on the preview image, as illustrated in FIG. 37B. While the pointer is being dragged, the range specification section 379 outputs coordinates of the start point and coordinates of the end point corresponding to a position of the pointer being dragged to the range calculation section 378; after the termination of the drag operation, the range specification section 379 outputs coordinates of the start point and coordinates of the decided end point to the range calculation section 378.

The range calculation section 378 uses the coordinates of the start point and end point acquired from the range specification section 379 to calculate a range on the omnidirectional image that assumes a rectangle after the distortion correction processing. A shape of the range on the omnidirectional image that assumes, after the distortion correction processing, a rectangle having two diagonal vertex specified by the range specification section 379 varies depending on the distortion correction parameter, i.e., a distortion correction method (panoramic correction, cut-out/distortion correction, and the like) or a position (cut-out center) and an angle of view (zoom magnification) of the area to be subjected to the distortion correction in the cut-out/distortion correction.

Thus, for calculation of the shape on the omnidirectional image that assumes the rectangle having the specified two diagonal vertexes, information of the parameter (hereinafter, referred to as "distortion correction parameter") for the distortion correction to be performed for the omnidirectional image is required. The distortion correction parameter includes, e.g., a distortion correction method (panoramic correction, cut-out/distortion correction, and the like) and a position (cut-out center) and an angle of view (zoom magnification) of the area to be subjected to the distortion correction in the cut-out/distortion correction.

When the distortion method is the cut-out/distortion correction, and the cut-out position is previously fixed, the range calculation section 378 may have information of the cut-out position. When there is a plurality of the previously fixed cut-out positions, the range calculation section 378 may have the information for each display range thereof. Such a fixed cut-out position is used to monitor comings and goings through a door, and the position to be subjected to the cut-out/distortion correction is fixed to a position corresponding to the door. When the distortion correction parameter is specified by the user, the range calculation section 378 may acquire user's input to the input section 272 concerning the distortion correction parameter from the range specification section 379 and determine the distortion correction parameter based on the acquired input. The distortion correction parameter is shared with the distortion correction section 376 and, in the normal mode, the distortion correction section 376 performs the distortion correction based on the distortion correction parameter.

Figure 38A:
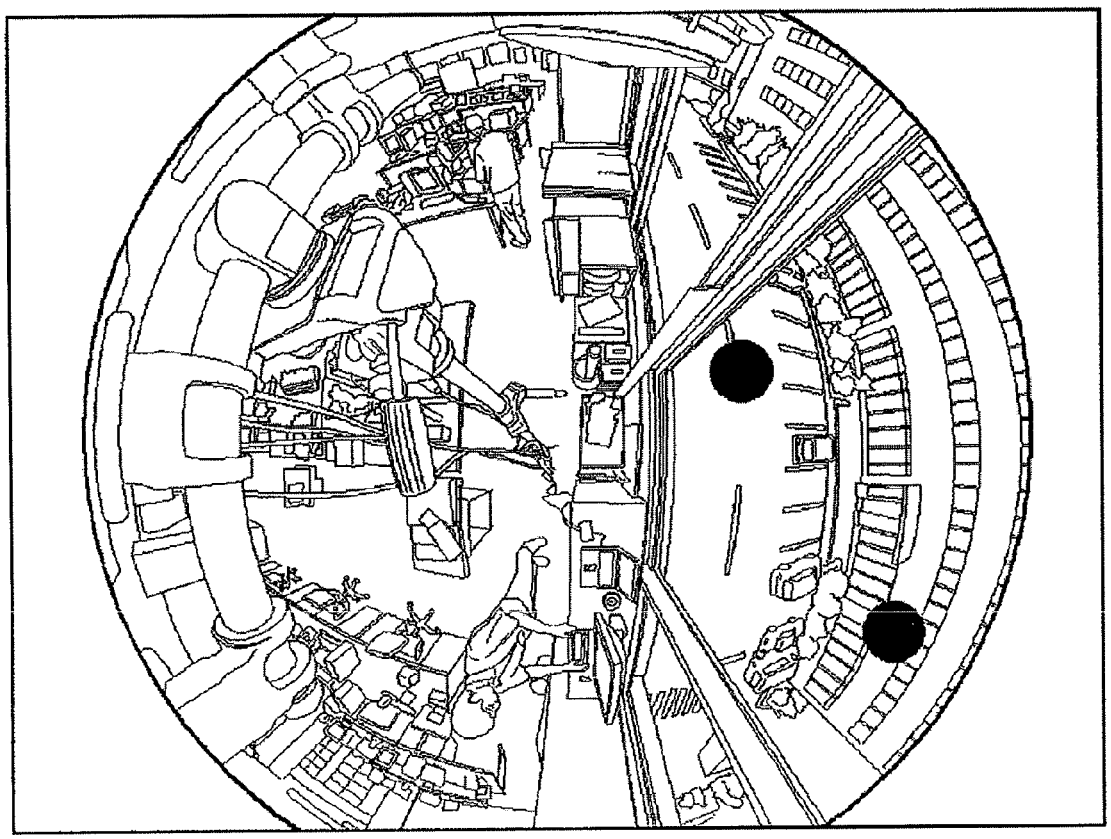
FIG. 38A is a view illustrating the start point and end point of the processing range specified on the omnidirectional image in the seventh embodiment of the present technology.
Figure 38B:
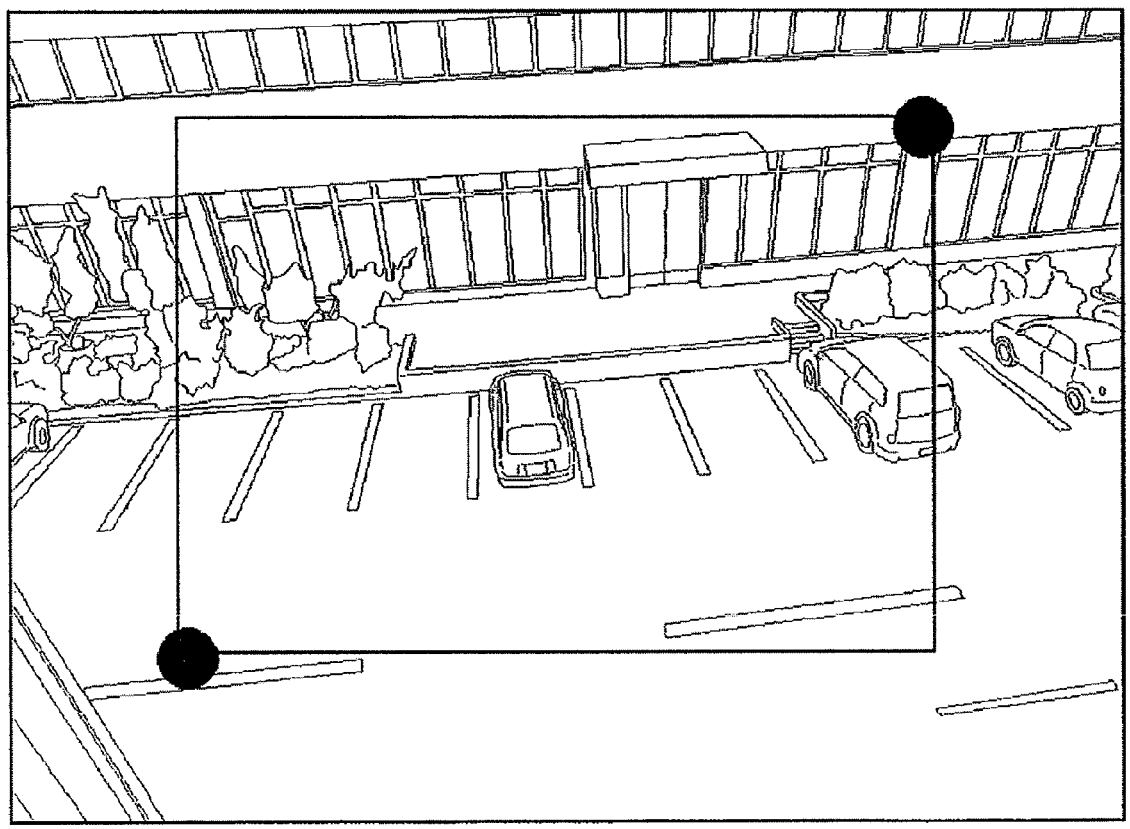
FIG. 38B is a view illustrating a display range determined based on specification of the processing range in the seventh embodiment of the present technology.

The distortion correction parameter to be used for calculation of the processing range may be determined based on the specification of the processing range made by the user. FIGS. 38A and 38B are each a view illustrating processing of determining a display range based on the specification of the processing range. FIG. 38A is a view illustrating the start point and end point of the processing range specified on the omnidirectional image, and FIG. 38B is a view illustrating a state where the processing range illustrated in FIG. 38A is displayed on an image after the cur-out/distortion correction.

As illustrated in FIG. 38A, when the two diagonal vertexes of the processing range that assumes a rectangle after the distortion correction processing are specified by the above-described procedure, the range calculation section 378 determines a cut-out position in the distortion correction parameter such that the cut-out center is positioned at a midpoint between the two vertexes. The cut-out view angle (zoom magnification) may be fixed or determined according to a distance between the start point and end point. For example, it is possible to set the distortion correction parameter such that a line connecting the start point and end point has a certain proportion to a diagonal line of the cut-out range. In the example of FIGS. 38A and 38B, the distortion correction parameter is determined such that the line connecting the start point and end point has 70% of the diagonal line of the cut-out range, and the midpoint between the start point and endpoint is located at the center of the cut-out range. When the start point and end point are set as the two diagonal vertexes (corners) of the cut-out range, the processing range and cut-out range coincide with each other. In this case, the range processing section 372 performs image processing for the entire cut-out range.

After the distortion correction parameter has thus been determined, the range calculation section 378 acquires the coordinates of the start point and end point from the range specification section 379 and then uses the distortion correction parameter and information of the start point and end point of the processing range to calculate a processing range on the omnidirectional image. The processing range on the omnidirectional image is a range that assumes a rectangle after the distortion correction processing performed based on the distortion correction parameter.

Figure 39:
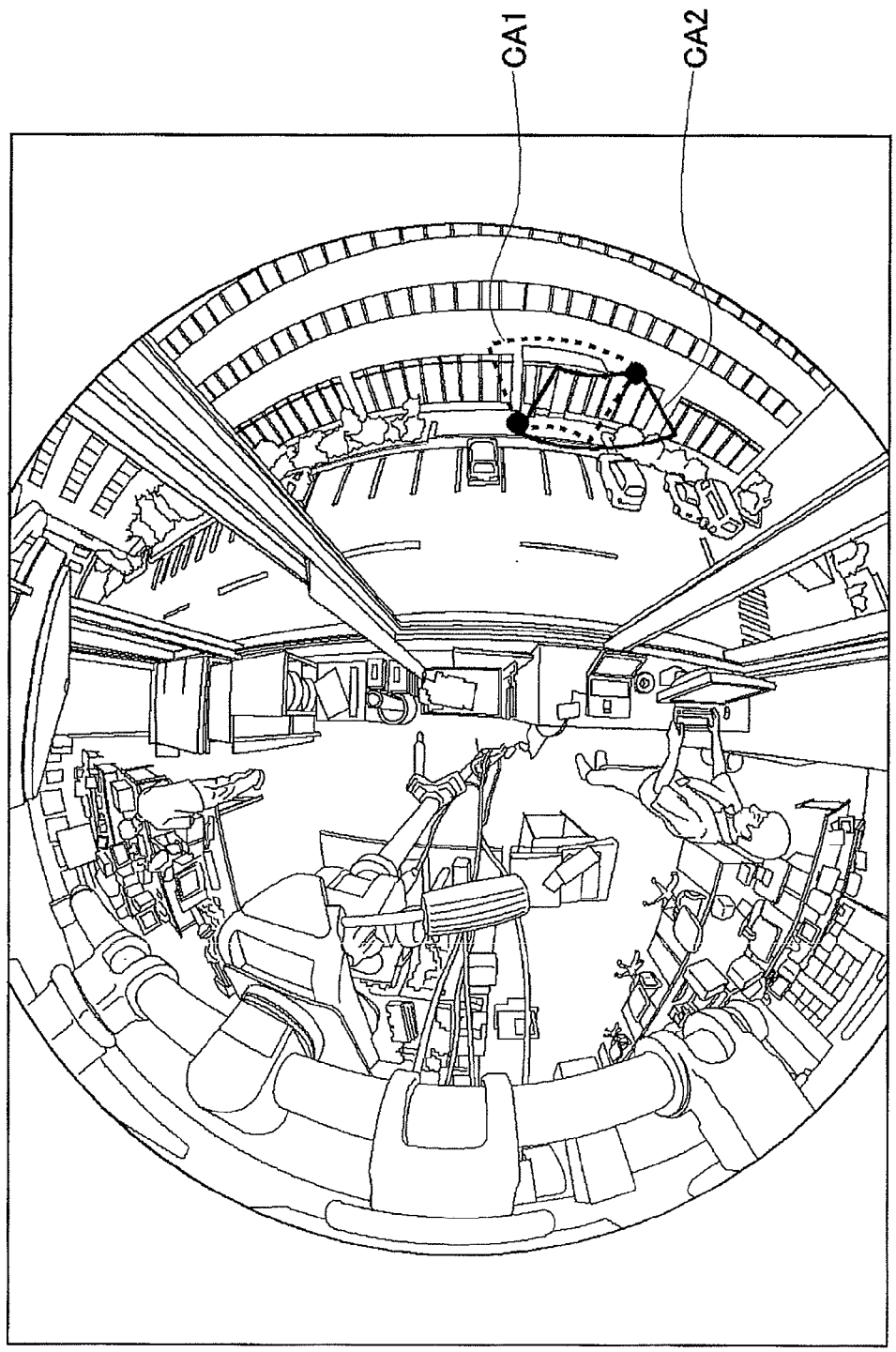
FIG. 39 is a view illustrating the processing range displayed in a superimposed manner on the preview image in the seventh embodiment of the present technology.

When a plurality of the display modes is set, the range calculation section 378 calculates the range that assumes a rectangle after the distortion correction processing using the distortion correction parameters corresponding to respective display modes. FIG. 39 is a view illustrating the processing range displayed in a superimposed manner on the preview image. Hereinafter, the distortion correction parameter is assumed to include a first distortion correction parameter (for, e.g., cut-out/distortion corrected image corresponding to an arbitrary partial range) and a second distortion correction parameter (for, e.g., panoramic image).

Upon acquisition of the information of the start point and end point, the range calculation section 378 calculates the processing range that assumes a rectangle after the correction based on each of the first and second distortion correction parameters.

The range calculation section 378 calculates a first rectangle having, as the diagonal vertexes, start point and end point obtained by coordinate transform based on the first distortion correction parameter. The range calculation section 378 performs, for the first rectangle, inverse transform of the coordinate transform that is previously performed according to the first distortion correction parameter. In this case, the range calculation section 378 performs coordinate transform using an inverse function of a transform function for a coordinate transform method indicated by the first distortion correction parameter. As a result, the first rectangle assumes a distorted shape. The distorted shape corresponds to a first processing range CA1 on the omnidirectional image illustrated in FIG. 39.

The range calculation section 378 calculates a second rectangle having, as the diagonal vertexes, start point and end point obtained by coordinate transform based on the second correction parameter. The range calculation section 378 performs, for the second rectangle, inverse transform of the coordinate transform that is previously performed according to the second distortion correction parameter. As a result, the second rectangle assumes a distorted shape. The distorted shape corresponds to a first processing range CA2 on the omnidirectional image illustrated in FIG. 39.

When the user has not decided the endpoint (for example, when the user is dragging the mouse), the decision determination section 375 outputs the processing range calculated by the range calculation section 378 to the range superimposing section 374 and when receiving a deciding action (for example, termination of the mouse drag operation) that the user makes for the input section 272, the decision determination section 375 stores the processing range that the range calculation section 378 calculates at that time point in the range storage section 373.

The range superimposing section 374 receives an input image (omnidirectional image) from the display switching section 371 in the range specification mode, superimposes the processing range output from the decision determination section 375 on the omnidirectional image, and outputs the resultant image to the image output section 377. When the plurality of processing ranges corresponding to the plurality of display ranges is calculated by the range calculation section 378 as described above, the range superimposing section 374 superimposes all the processing ranges on the omnidirectional image.

The distortion correction section 376 is used in the normal mode. In the normal mode, the omnidirectional image input to the display switching section 371 is output to the range processing section 372, where image processing is performed for the processing range stored in the range storage section 373, and the omnidirectional image that is partially subjected to the image processing is input to the distortion correction section 376.

The distortion correction section 376 performs the distortion correction processing for the omnidirectional image (on which image processing is performed for the processing range) input to generate a distortion-corrected image. When there is a plurality of display modes, i.e., distortion correction methods, and a plurality of processing ranges corresponding to the plurality of display modes are stored in the range storage section 373, the range processing section 372 reads out the processing range according to the display mode and performs image processing for the read out processing range. When the cut-out/distortion correction processing is performed, the cut-out center may be different from the center of the processing range and, in this case, the processing range is positioned offset from the center of the cut-out range and assumes a slightly distorted shape. Further, when the processing range is calculated based on a plurality of cut-out centers, image processing should be performed for the processing range calculated based on a cut-out center closest to that used in the distortion correction section 376.

Then, also in the distortion correction section 376, the cut-out/distortion correction processing is performed on the display range corresponding to the display mode. When the display mode is a mode for displaying a panoramic image, the cut-out/distortion-corrected image is the panoramic image; while the display mode is a mode for displaying a cut-out arbitrary range, the cut-out/distortion-corrected image is an image obtained by cutting out the arbitrary partial range followed by the distortion correction processing for the cut out range. The cut-out/distortion-corrected image generated by the distortion correction section 376 is output to the image output section 377.

The image output section 377 outputs the image output from the range superimposing section 374 to the image display section 271 of the viewer 270 in the range specification mode, while outputs the image output from the distortion correction section 376 to the image display section 271 of the viewer 270. The image output section 377 acquires, from the display switching section 371, information indicating which one of the image output from the range superimposing section 374 and image output from the distortion correction section 376 is to be output, that is, whether the current mode is the range specification mode or normal mode.

The image display section 271 displays the image output from the image output section 377 as the preview image in the range specification mode, and displays the image output from the image output section 377 as a normal image that is partially subjected to image processing.

Figure 40A:
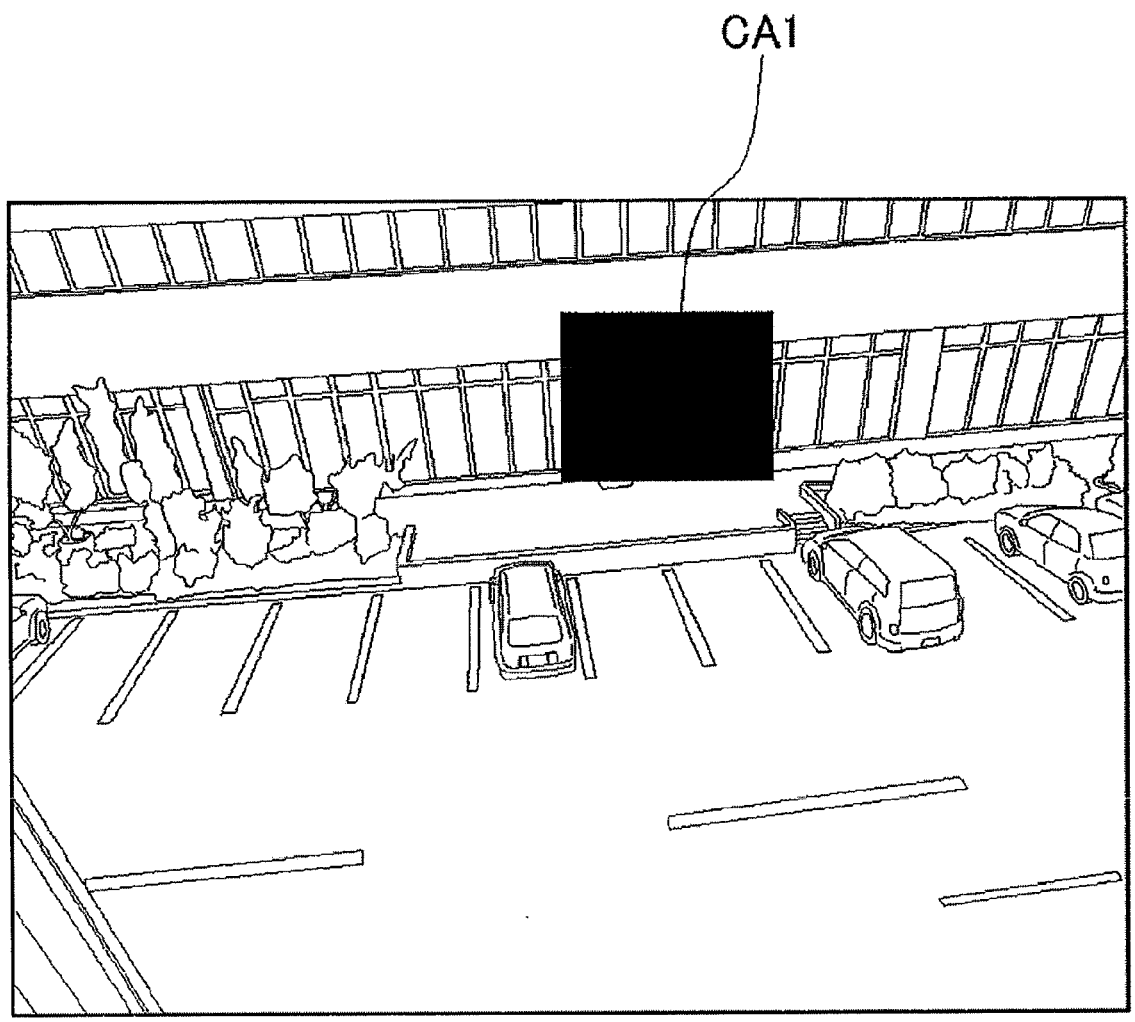
FIG. 40A is a view illustrating a display example of a cut-out/distortion-corrected image in a normal mode in the seventh embodiment of the present technology.
Figure 40B:
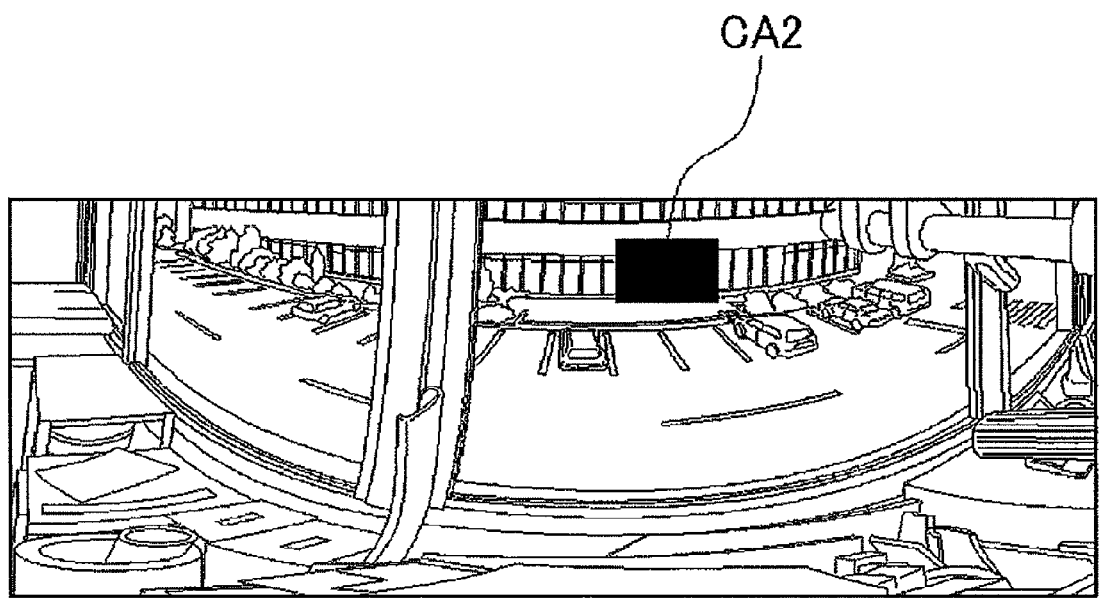
FIG. 40B is a view illustrating a display example of a panoramic image in the normal mode in the seventh embodiment of the present technology.

FIGS. 40A and 40B are each a view illustrating an example of display on the image display section 271 in the normal. FIG. 40A illustrates an example in which the cut-out/distortion-corrected image obtained by cutting out the arbitrary partial range from the omnidirectional image, followed by the distortion correction processing for the cut out range, and FIG. 40B illustrates an example in which the panoramic image obtained by developing a right half of the omnidirectional image in a panoramic manner.

As illustrated in FIG. 40A, the first processing range CA1 superimposed on the omnidirectional image in FIG. 39 assumes a rectangle on the cut-out/distortion-corrected image, and the rectangular processing range is subjected to the masking processing. Further, as illustrated in FIG. 40B, the second processing range CA2 superimposed on the omnidirectional image in FIG. 39 assumes a rectangle on the panoramic image, and the rectangular processing range is subjected to the masking processing.

Figure 34:
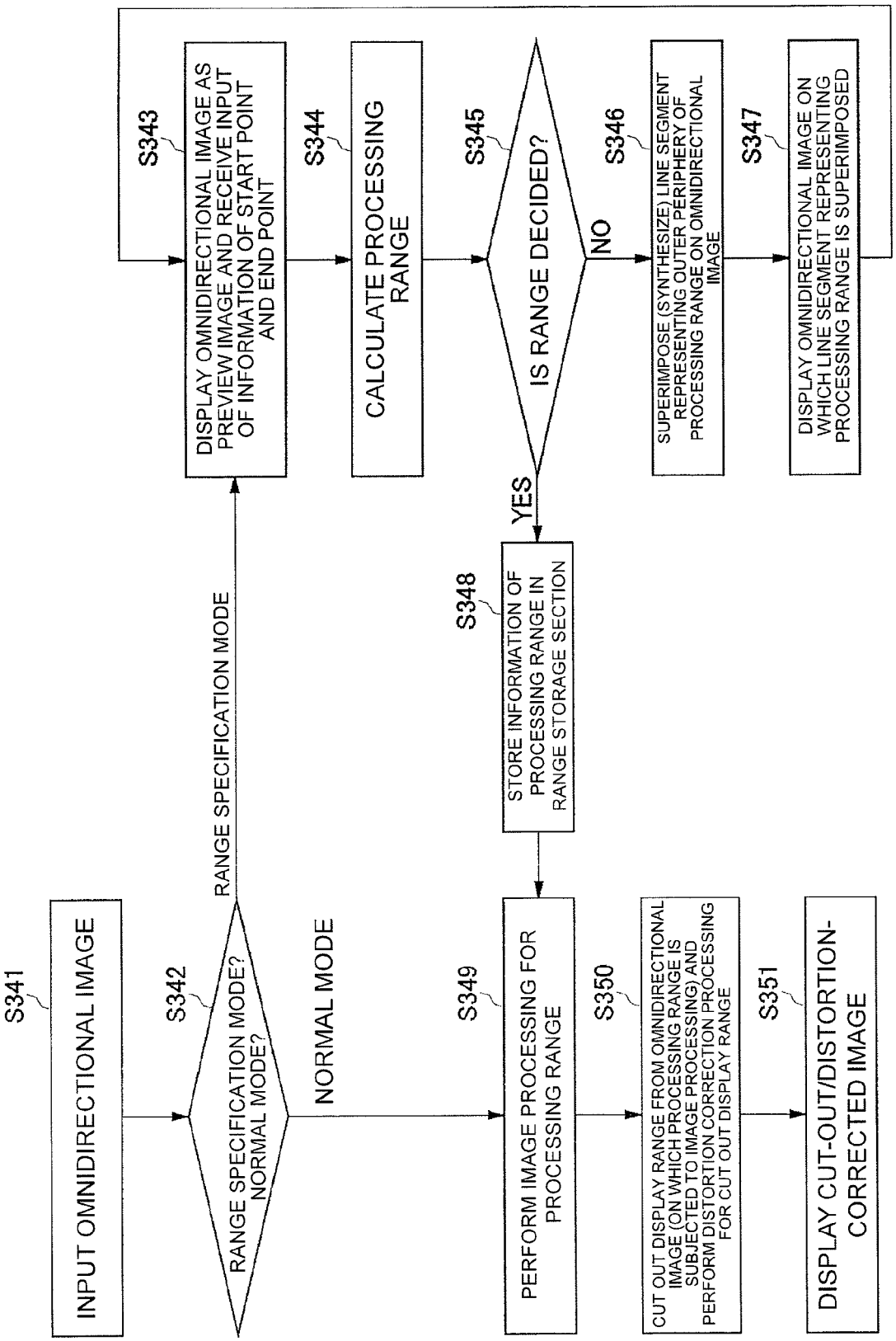
FIG. 34 is a flowchart illustrating operation of a shooting system according to a seventh embodiment of the present technology.

The following describes operation of the image processor 370. FIG. 34 is a flowchart illustrating operation of the image processor 370. The display switching section 371 inputs the omnidirectional image from the omnidirectional imaging section 171 (step S341) and determines whether the current mode is the range specification mode or normal mode (step S342).

When the current mode is the range specification mode, ("range specification mode" in step S342), the display switching section 371 outputs the omnidirectional image (input image) to the range superimposing section 374. Then, the omnidirectional image is supplied to the image display section 271 through the image output section 377 to be displayed thereon as the preview image, and information of the start point and end point for specifying the processing range input through the input section 272 using the preview image is input to the range specification section 379 (step S343).

The range calculation section 378 uses the information of the start point and endpoint input to the range specification section 379 and information of the display range to perform the coordinate transform of the start point and end point, calculates a rectangle having the coordinate-transformed start point and end point as the diagonal vertexes, and performs, for the calculated rectangle, inverse transform of the previous coordinate transform, to thereby calculate the processing range (step S344).

The decision determination section 375 determines whether or not the range is decided (step S345), and when the range is not decided (NO in step S345), outputs a line segment representing an outer periphery of the processing range calculated by the range calculation section 378 to the range superimposing section 374. The range superimposing section 374 then superimposes (synthesizes) the line segment on the omnidirectional image input from the display switching section 371 (step S346). The omnidirectional image on which the line segment representing the processing range is output to the image display section 271 through the image output section 377 to be displayed thereon (step S347). FIG. 37 illustrates an example of the displayed image.

The user determines whether the displayed processing range is acceptable or not while confirming the preview image on which the line segment representing the processing range and uses the input section 272 to perform action of deciding the processing range (terminating the mouse drag operation) or action of continuing the range specification (continuing the mouse drag operation). When the processing range is not decided, and processing of steps S345, S346, and S347 terminates, the processing flow returns to step S343 where the user is prompted to specify a new end point.

When the processing range is decided (YES in step S345), the range deciding section 375 outputs information of the processing range to the range storage section 373 so as to store the processing range in the range storage section 373 (step S348) After completion of the processing of step S348, the operation mode is shifted to the normal mode. In a case where the operation mode is shifted to the normal mode through step S348 or where it is determined in step S342 that the current mode is the normal mode, the range processing section 372 applies the processing range input from the range storage section 373 to the omnidirectional image input from the display switching section 371 and performs image processing for the processing range (step S349).

Figure 41A:
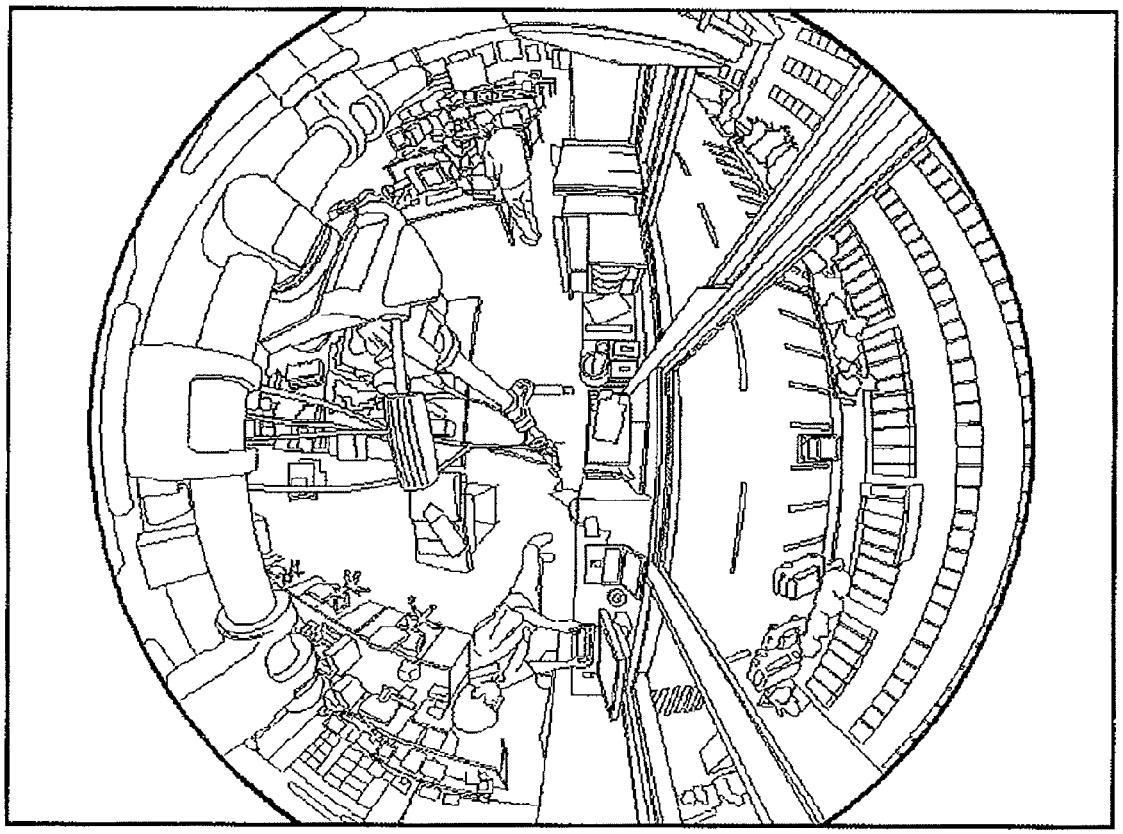
FIG. 41A is a view illustrating an example of the conventional omnidirectional image.
Figure 41B:
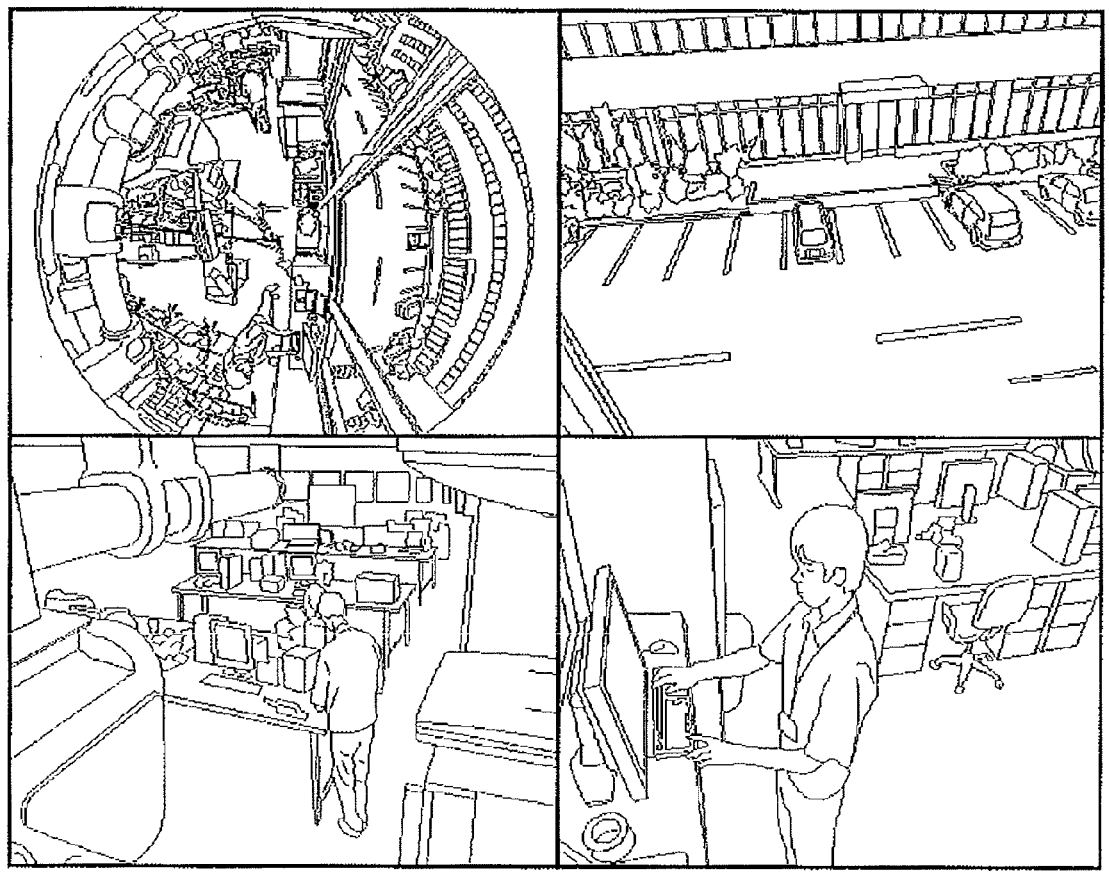
FIG. 41B is a view illustrating an example in which cut-out images corresponding to a plurality of cut-out ranges are displayed in a juxtaposed manner, together with the conventional omnidirectional image.
Figure 41C:
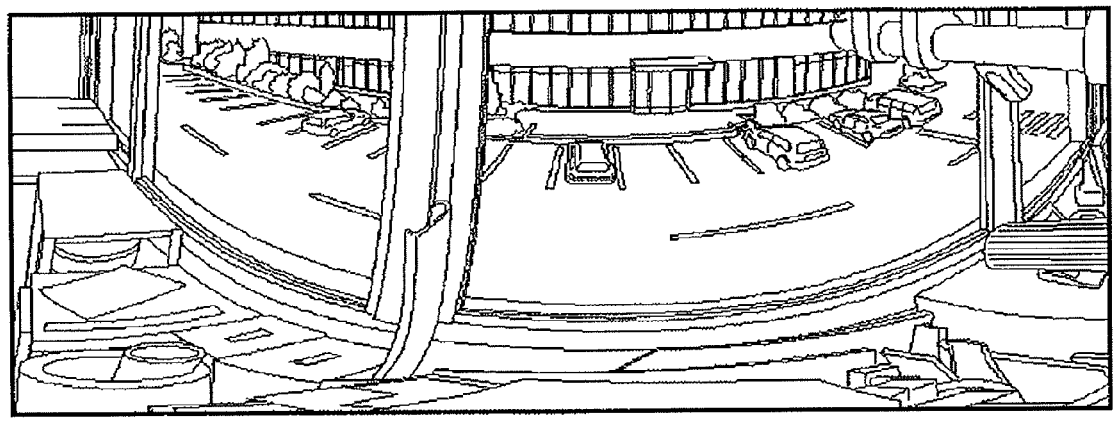
FIG. 41C is a view illustrating a display example of a panoramic image corresponding to the conventional omnidirectional image.

The distortion correction section 376 acquires the omnidirectional image on which the processing range is subjected to image processing by the range processing section 372, cuts out the display range from the omnidirectional image, and performs the distortion correction processing for the cut-out display range to thereby generate the cut-out/distortion-corrected image (step S350). The image output section 377 outputs the cut-out/distortion-corrected image generated by the distortion correction section 376 to the image display section 271, and the image display section 271 displays the cut-out/distortion-corrected image (step S351). FIGS. 40A and 41B each illustrate an example of the displayed image.

As described above, according to the shooting system of the present embodiment, when the user specifies, on the omnidirectional image, the two diagonal vertexes of the range to be set as the processing range, the range that will be a rectangular range having the specified two points as the two diagonal vertexes after the omnidirectional image is subjected to the distortion correction processing by the distortion correction section 376 is displayed on the omnidirectional image, thereby allowing the user to confirm, on the omnidirectional image, the processing range that assumes a rectangle after the omnidirectional image is subjected to the distortion correction processing. Further, the processing range corresponding to a position of the pointer during the mouse drag operation is displayed, thereby making it possible to confirm whether or not a user specified position falls within the processing range when the current pointer position is decided as the end point. Further, when there are a plurality of the distortion correction methods (that is, when there are a plurality of display ranges corresponding to the plurality of display modes), processing ranges that each assumes a rectangle after the distortion correction processing corresponding to the plurality of display modes can be confirmed on the omnidirectional image simultaneously. This makes it possible to confirm whether or not the user specified position falls within the processing range in every display mode.

The seventh embodiment of the present technology has thus been described. Various modifications can be made to the above embodiment within the scope of the present technology. For example, although image processing is performed for an inside of the processing range in the above embodiment, the image processing may be performed for an outside of the processing range. For example, the image processing is not performed for the processing range that has been specified as a range to be displayed, but the masking processing may be performed for a surrounding area thereof. Further, it is possible to perform (region of interest (ROI) processing of specifying an important range as the processing range and preferentially allocating a code amount to the processing range, so as to preferentially assure image quality of the processing range even on a low-speed communication network.

Further, in the above embodiment, the range to be cut out by the distortion correction section 376 may be determined based on the range specified by the range specification section 379 and, in this case, the entire specified range may be set as the processing range; however, in this case, this processing range may be set as the range to be subjected to the cut-out processing by the distortion correction section 376. In this case, the range processing section 372 cuts out the processing range as the image processing, and the distortion correction section 376 performs the distortion correction processing for an image corresponding to the cut range acquired from the range storage section 373.

Further, in the above embodiment, the range calculation section 378 calculates the processing range that assumes a rectangle after the distortion correction processing; however, the processing range to be obtained after the distortion correction processing may have another shape, such as an ellipse or a circle. Further, when the processing range to be obtained after the distortion correction processing has a shape other than the rectangle, the user may specify three or more points as points for calculating the processing range. Further, when a shape and a size of the processing range are fixed, the user may specify only the position of the processing range (for example, user may specify only one point representing a center of the processing range).

Further, after the information of the processing range specified and decided by the user is stored in the range storage section 373, the user may use the input section 272 to perform operation for the stored processing range to deform the processing range on the preview image, that is, to change the specification of the processing range. Also in this case, the processing range to be deformed is always deformed into a shape that assumes a predetermined shape such as a rectangle after the distortion correction processing.

Further, in the above embodiment, the omnidirectional image imaging section 171 images the omnidirectional image as the image having distortion using a fish-eye lens, and the image processor 370 acquires this omnidirectional image; however, the image having distortion is not limited to the omnidirectional image as long as it is an image having distortion that can be corrected.

4. Eighth Embodiment

The following describes an eighth embodiment of the present technology. As described above, the omnidirectional image can be deformed into the panoramic image. Further, it is possible to display the cut-out/distortion-corrected image obtained by cutting out a part of the omnidirectional image and perform correction processing for the cut out part. In this case, by changing in real time the cut-out position, a PTZ camera function can be achieved. As described above, the omnidirectional image can be displayed in various modes. Further, in a video camera, there may be a case where image processing is performed for a specified arbitrary range. For example, the masking processing for privacy protection is performed.

However, when the range specification is made using the method as described in Patent Literature 2, that specifies an arbitrary range on the image having distortion, a shape of the range changes depending on presence/absence of the distortion correction processing, a difference in display mode, or an image cut-out position. This complicates the range specification to be conducted by a user, and a position of the specified range is difficult to understand. Further, in the technology described in Patent Literature 2, it is necessary to project a large number of coordinates before and after the distortion correction processing and, accordingly, an amount of information to be processed becomes extremely large.

Thus, in the present embodiment, a shooting system capable of enhancing easiness of user's range specification operation and reducing a processing amount of information concerning the range shared before and after the distortion correction processing will be described.

Figure 42:
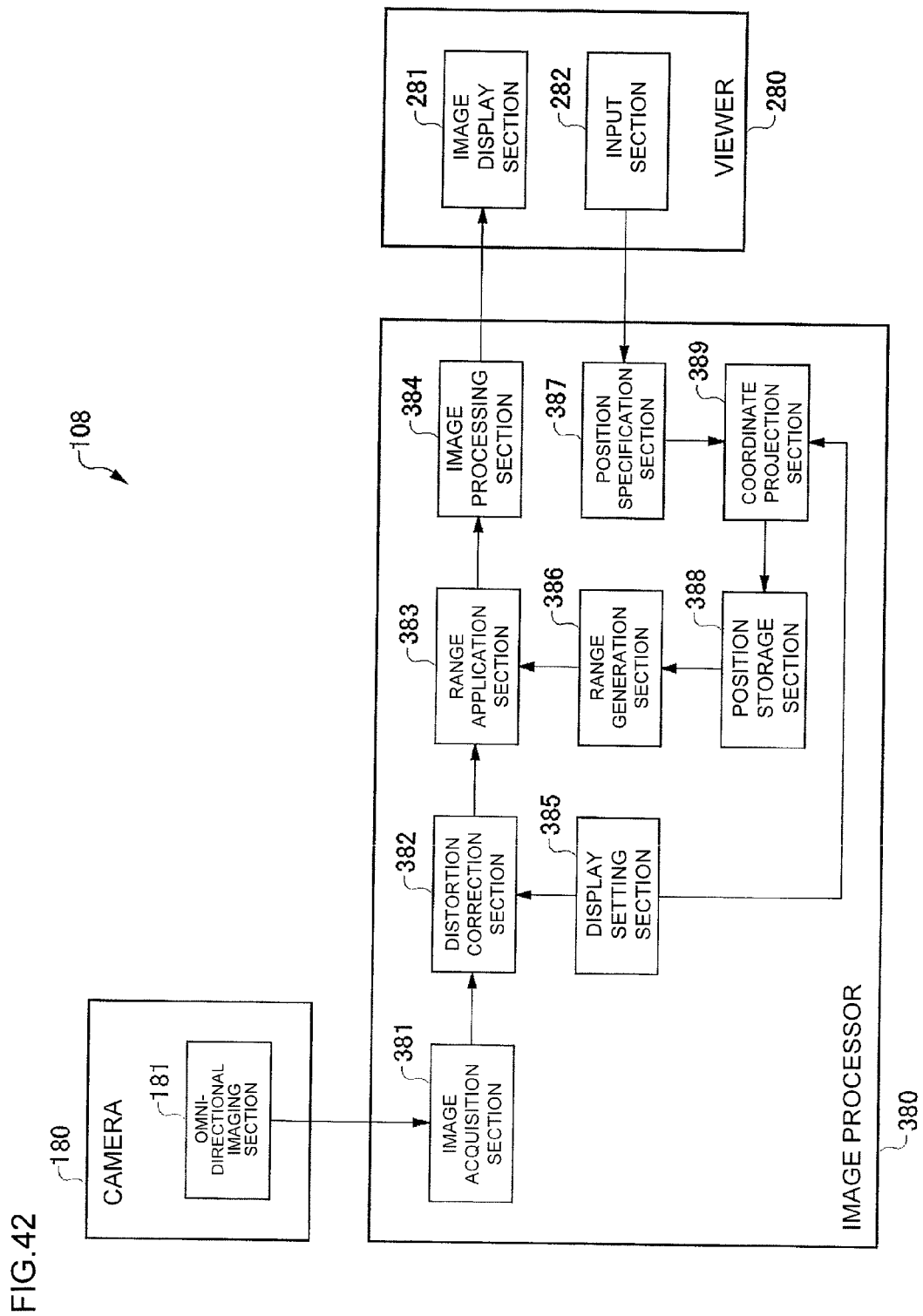
FIG. 42 is a block diagram illustrating a configuration of a shooting system according to an eighth embodiment of the present technology.

FIG. 42 is a block diagram illustrating a configuration of a shooting system 108 according to the eighth embodiment of the present technology. As illustrated in FIG. 42, an image processor 380 is connected with a camera 180 and a viewer 280 to constitute the shooting system 108.

The camera 180 is used to shoot an image to be subject to image processing in the image processor 380 and to be displayed on the viewer 280. The camera 180 is fixed to a predetermined position so as to shoot an object to be shot.

The viewer 280 is a device for a user to view an image shot by the camera 180 and subjected to image processing in the image processor 380. The viewer 280 may be, e.g., a personal computer or a mobile terminal. In a case where the camera 180 is a monitoring camera, the camera 180 is installed so as to be able to shot a place to be monitored, and the viewer 280 is used by a person who monitors the image.

The image processor 380 is disposed between the camera 180 and viewer 280 and connected thereto. The image processor 380 may be connected to the camera 180 and viewer 280 by wire or wireless. Further, some or all of the constituent elements of the image processor 380 may be provided in the camera 180 or the viewer 280.

The camera 180 includes an omnidirectional imaging section 181. The omnidirectional imaging section 181 is an imaging system having a fish-eye lens which is a kind of a wide-angle lens. The omnidirectional imaging section 181 is used to image a circular omnidirectional image. The omnidirectional image is the image having distortion imaged by a fish-eye lens using a projection system, such as a stereographic projection system, an equidistance projection system, an equisolid angle projection system or an orthogonal projection system. The omnidirectional imaging section 181 outputs the obtained omnidirectional image to the image processor 380. The image taken and output by the omnidirectional imaging section 181 may be a still image or a moving image.

The viewer 280 includes an input section 282 and an image display section 281. The input section 282 performs various input operations using an input device such as a mouse and a touch panel. Particularly, in the present embodiment, the input section 282 performs input for position specification on the omnidirectional image shot by the camera 180.

The image display section 281 displays an image output from the image processor 380. The image display section 281 may be, e.g., a liquid crystal display panel. The image display section 281 displays an image for a user to specify a processing range in a range specification time to be described later, and displays an image on which the processing range is subjected to predetermined processing at an image display time to be described later.

The image processor 380 includes an image acquisition section 381, a distortion correction section 382, a range application section 383, an image processing section 384, a display setting section 385, a range generation section 386, a position specification section 387, a position storage section 388, and a coordinate projection section 389. The image processor 380 has two functions of creating, from an image shot by the camera 180, an image to be displayed on the viewer 280 and specifying the processing range.

The image acquisition section 381 acquires the omnidirectional image shot by the omnidirectional imaging section 181 of the camera 180.

Figure 49A:
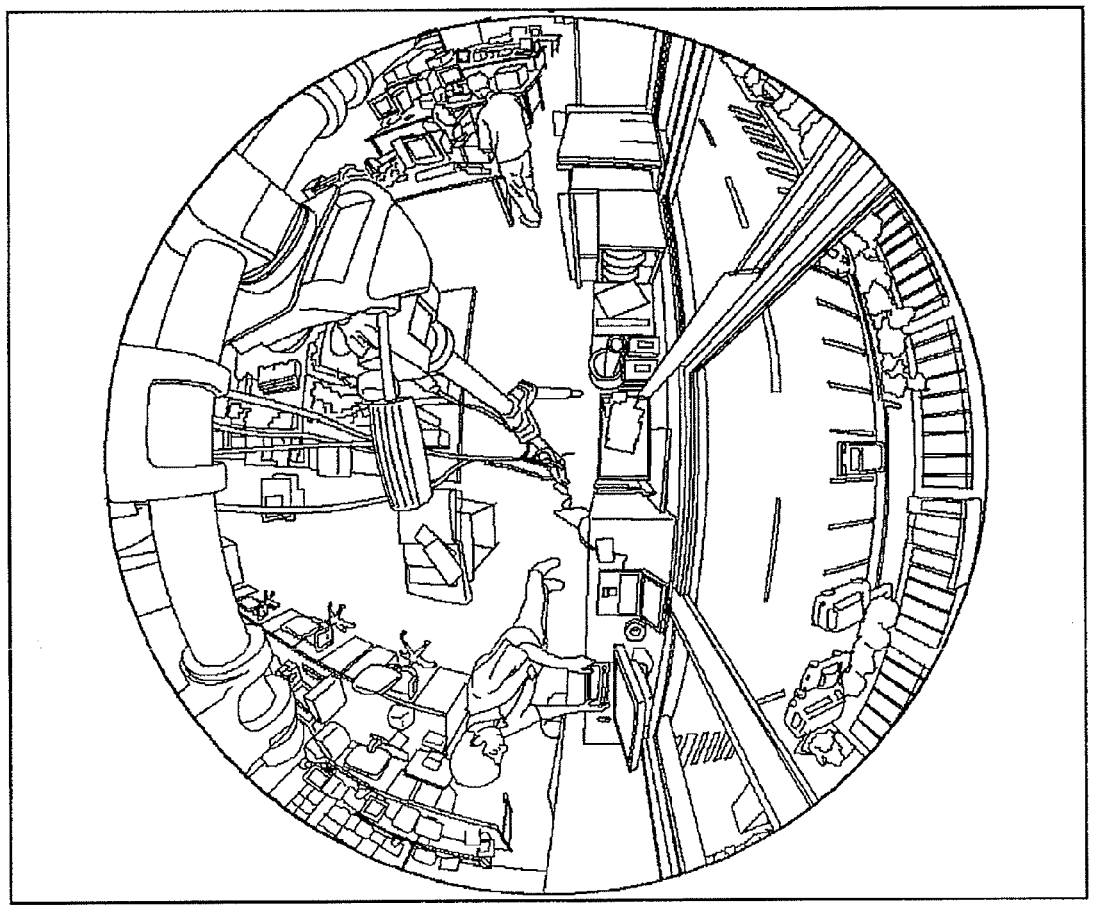
FIG. 49A is a view illustrating an example of the conventional omnidirectional image.
Figure 49B:
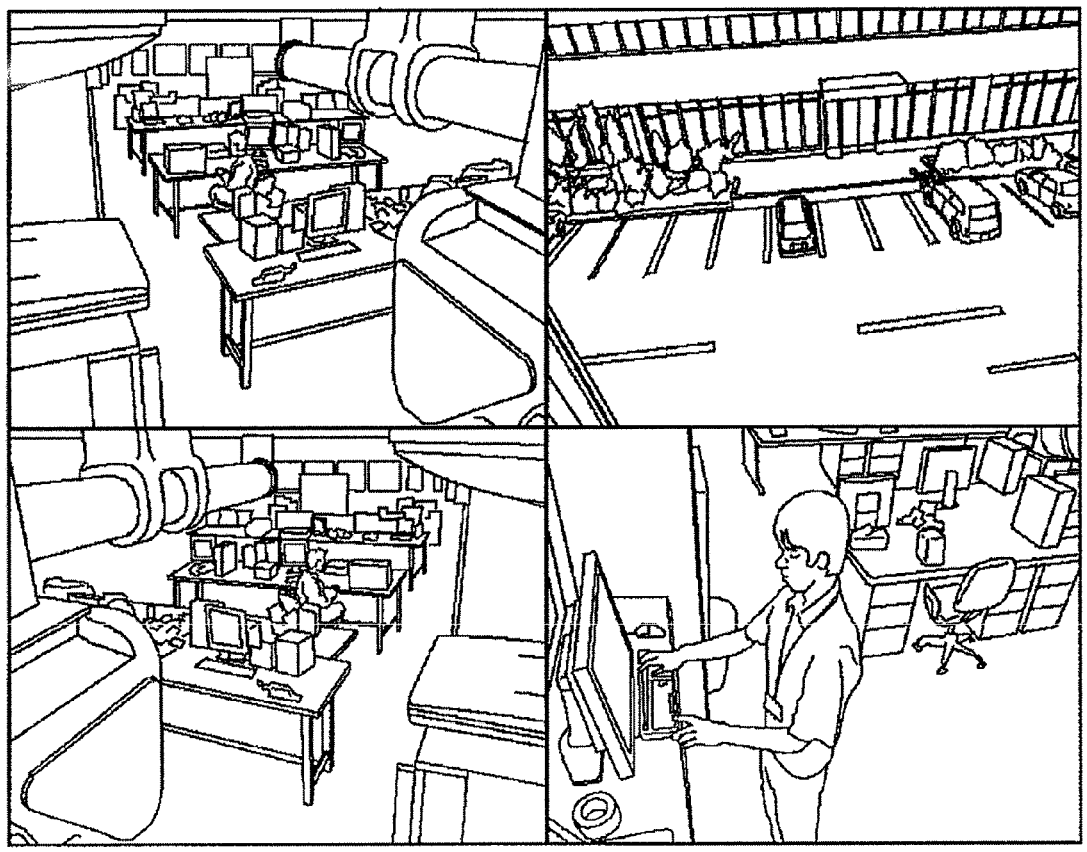
FIG. 49B is a view illustrating an example in which cut-out images corresponding to a plurality of cut-out ranges are displayed in a juxtaposed manner, together with the conventional omnidirectional image.
Figure 49C:
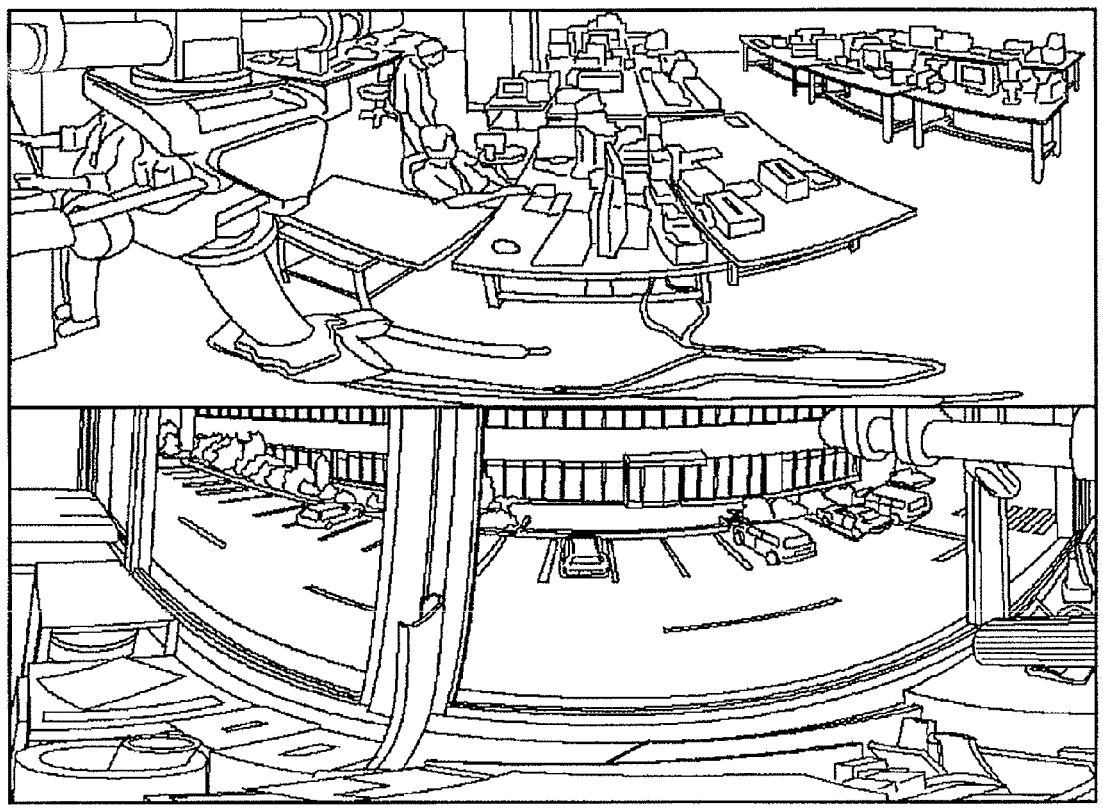
FIG. 49C is a view illustrating a display example of a panoramic image corresponding to the conventional omnidirectional image.

The distortion correction section 382 performs distortion correction processing for the omnidirectional image acquired by the image acquisition section 381. Various distortion correction methods are assumed, and the correction method to be used is determined by a distortion correction parameter. FIG. 49A is a view illustrating an example of a conventional omnidirectional image, FIG. 49B is a view illustrating an example in which cut-out images corresponding to a plurality of cut-out ranges are displayed in a juxtaposed manner, together with the conventional omnidirectional image, and FIG. 49C is a view illustrating a display example of a panoramic image of the conventional omnidirectional image. For example, there are available a method as illustrated in FIG. 49B that displays a plurality of ranges that is cut out from the omnidirectional image of FIG. 49A and then subjected to the correction processing (hereinafter, referred to cut-out/distortion correction processing) and a method as illustrated in FIG. 49C that displays panoramic images, one above the other, each with 180-degree viewing angle generated from the omnidirectional image (hereinafter, referred to panoramic correction or panoramic development). In the present embodiment, the distortion correction section 382 performs the cut-out/distortion correction processing or panoramic processing and outputs the resultant image. The distortion correction parameter includes the above distortion correction method and a parameter (for example, in the cut-out/distortion correction processing, a cut-out position and size) required in the method.

The display setting section 385 sets the distortion correction parameter for the distortion correction processing by the distortion correction section 382. When the distortion correction processing is not performed, the display setting section 385 does not set the distortion correction parameter. The distortion correction parameter set by the display setting section 385 is supplied to the distortion correction section 382, range generation section 386, and coordinate projection section 389.

The range application section 383 acquires an image that is subjected to the distortion correction processing from the distortion correction section 382, adds range information generated by the range generation section 386 to the acquired image, and outputs the resultant image. The added range information is used as a processing range for arbitrary image processing. When the range generation section 386 does not generate the range information, the range application section 383 outputs directly the input image.

The image processing section 384 acquires, from the range application section 383, the image added with the range information and performs arbitrary image processing for a range corresponding to the range information. The image processing may be applied to an inverse range of the range information. In the present embodiment, the image processing section 384 performs, as the image processing, privacy masking processing of blacking out the processing range. Thus, the processing range corresponds to the masking area.

The position specification section 387 transmits coordinate information on the display image based on input operation performed through the input section 282. In the present embodiment, position information corresponds to a coordinate value of one point on the image to be displayed on the image display section 281.

The coordinate projection section 389 transforms, based on the distortion correction parameter set by the display setting section 385, the coordinate information on the display image input from the position specification section 387 into coordinate information on the omnidirectional image.

The position storage section 388 stores the coordinate information (hereinafter, referred to as "position information") on the omnidirectional image input from the coordinate projection section 389. In the present embodiment, the position storage section 388 stores one point in an orthogonal coordinate system on the omnidirectional image. The position information may use other coordinate system such as a polar coordinate system and may be retained in the form of a position information table that can be used in common between different display settings.

The range generation section 386 generates, based on the position information stored in the position storage section 388 and distortion correction parameter set by the display setting section 385, range information representing a prescribed shape located at a specified position. In the present embodiment, the range generation section 386 transforms the position coordinates on the omnidirectional image stored in the position storage section 388 into a coordinate system on the image that is subjected to the distortion correction processing based on the distortion correction parameter and generates, as the range information, a circle having a fixed radius and centering on the obtained position coordinates.

Figure 43:
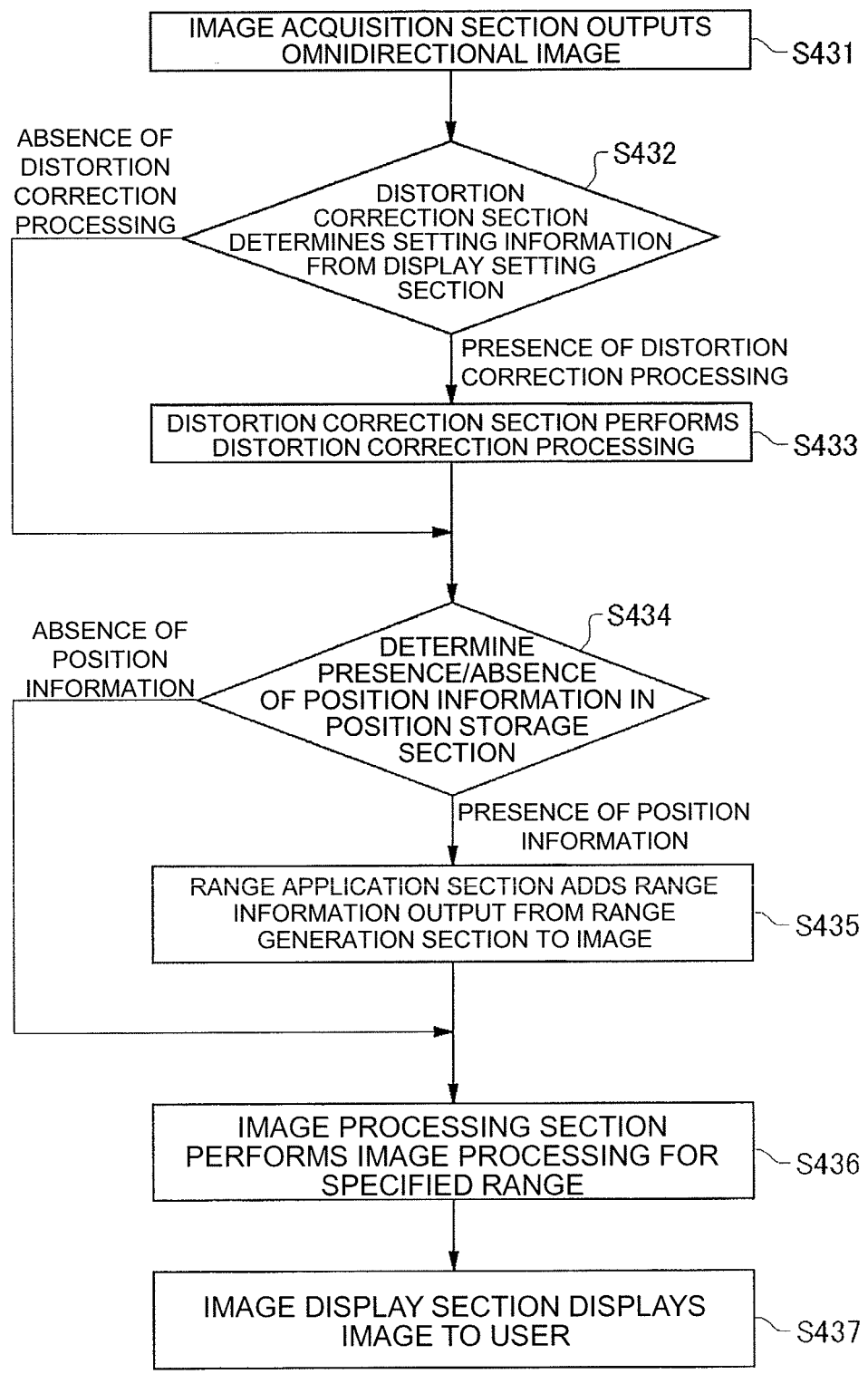
FIG. 43 is a flowchart illustrating processing in a shooting system according to the eighth embodiment of the present technology.

The following describes operation of the image processor 380. The operation of the image processor 380 includes two operations of image display and range setting. First, the image display operation will be described. FIG. 43 is a flowchart illustrating processing in the image display device according to the eighth embodiment of the present technology. The image acquisition section 381 outputs the omnidirectional image input from the camera 180 to the distortion correction section 382 (step S431), and the distortion correction section 382 determines whether the distortion correction parameter to be received from the display setting section 385 is present or absent (step S432).

When the distortion correction parameter is present, the distortion correction section 382 performs the distortion correction processing based on the distortion correction parameter (step S433) When the distortion correction parameter is absent, processing of step S433 is skipped, and the processing flow proceeds to step S434.

Then, it is determined whether the position information of the position storage section 388 is present or absent (step S434). The position information of the position storage section 388 is generated when range setting operation to be described later is performed. When the range setting is performed, that is, when the position information is present, the range generation section 386 outputs the range information corresponding to the position information, and the range application section 383 adds the range information to the image output from the distortion correction section 382 (step S435). When the range setting is not performed, or setting is reset, that is, when the range information is absent, the addition of the range information is not made.

Figure 44:
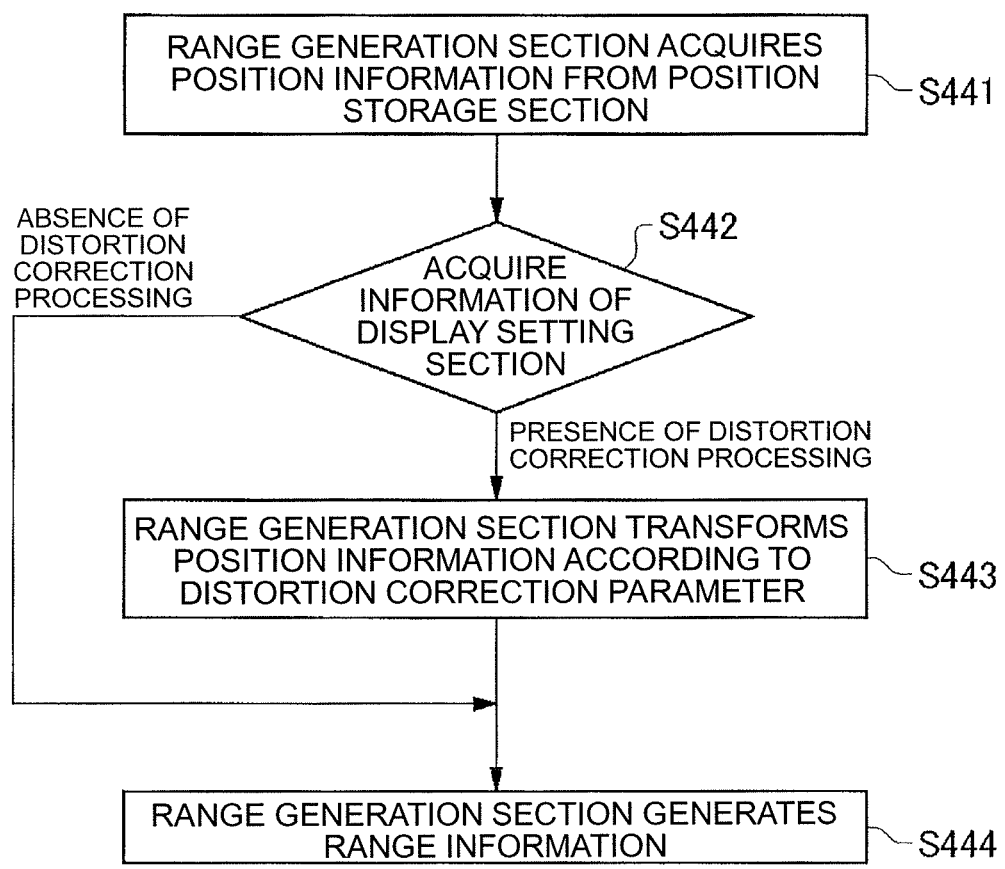
FIG. 44 is a flowchart illustrating processing in a range generation section according to the eighth embodiment.

Here, details of generation of the range information will be described. FIG. 44 is a flowchart illustrating processing in the range generation section according to the present embodiment. The range generation section 386 acquires the position information from the position storage section (step S441). In the present embodiment, the position information corresponds to coordinates of one point on the omnidirectional image. Then, the range generation section 386 determines whether the distortion correction parameter of the display setting section 385 is present or absent (step S442).

When the distortion correction processing is present, the range generation section 386 transforms the position information based on the distortion correction parameter acquired from the display setting section 385. In the present embodiment, the coordinates on the omnidirectional image is transformed into coordinates on the image that is subjected to the distortion correction processing (step S443). When the distortion correction processing is absent, the processing flow proceeds to step S444, skipping step S443. Subsequently, the range generation section 386 generates the range information representing a prescribed shape with position information finally obtained set as a base point (step S444). In the present embodiment, a circle having a prescribed radius and centering on the finally obtained position coordinates after the distortion correction processing is formed as the range information. The position information finally obtained when the distortion correction parameter is absent means coordinates on the omnidirectional image (position information retained in the position storage section 388).

Returning back to the flowchart of the image processor 380, the image output from the range application section 383 is input to the image processing section 384, and the image processing section 384 applies arbitrary image processing to the processing range represented by the range information added to the image (step S436). The image that is subjected to the image processing is output to the image display section 281 and displayed to the user (step S437).

Figure 45:
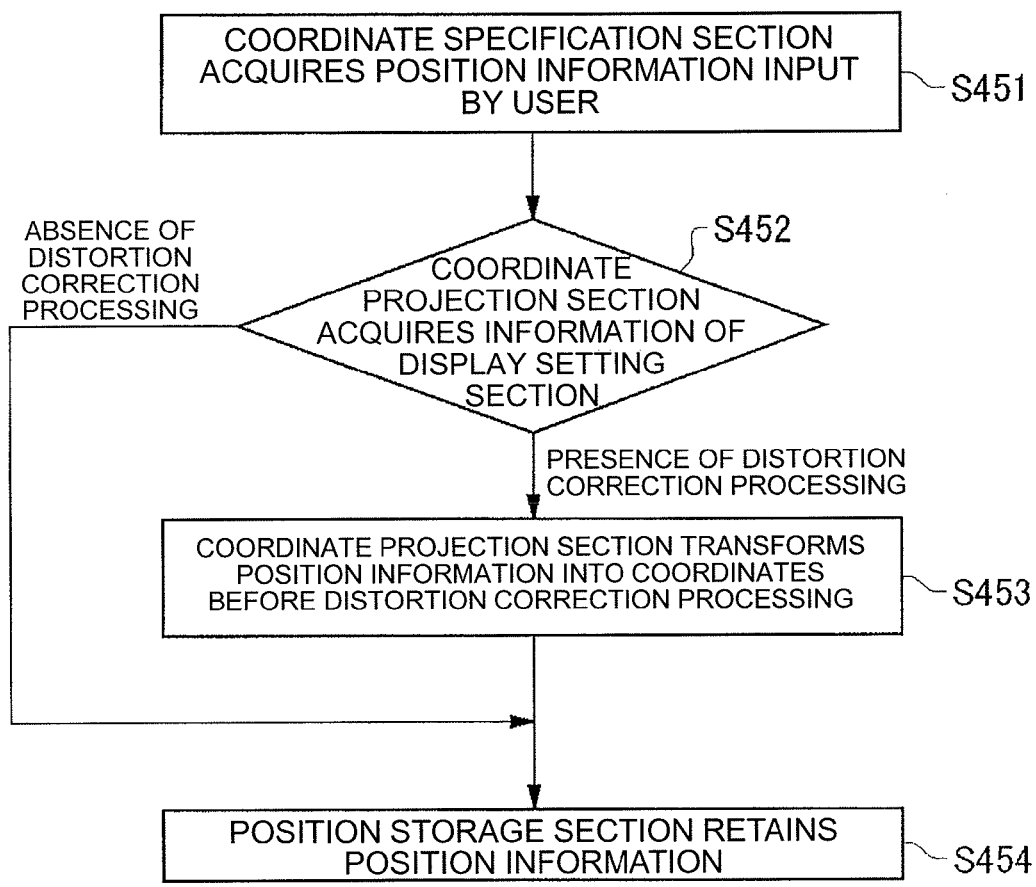
FIG. 45 is a flowchart illustrating processing of generating position information in the eighth embodiment of the present technology.

Subsequently, the range setting operation to be performed in the image processor 380 will be described. FIG. 45 is a flowchart illustrating processing of generating the position information in the present embodiment. The position specification section 387 outputs the position information on the image displayed on the image display section 281 according to user's input information from the input section 282 (step S451). The coordinate projection section 389 receives the setting information of the display setting section 385 and determines the presence/absence of the distortion correction parameter (step S452).

When the distortion correction parameter is present in the setting information, the coordinate projection section 389 transforms, based on the distortion correction parameter, the position information into coordinates on the omnidirectional image before the distortion correction processing (step S453). When it is determined in step S452 that the distortion correction parameter is absent, the position information is unnecessary, so that step S453 is skipped, and the processing flow proceeds to step S454. Finally, the coordinates on the omnidirectional image are retained as the position information in the position storage section (step S454).

Figure 46:
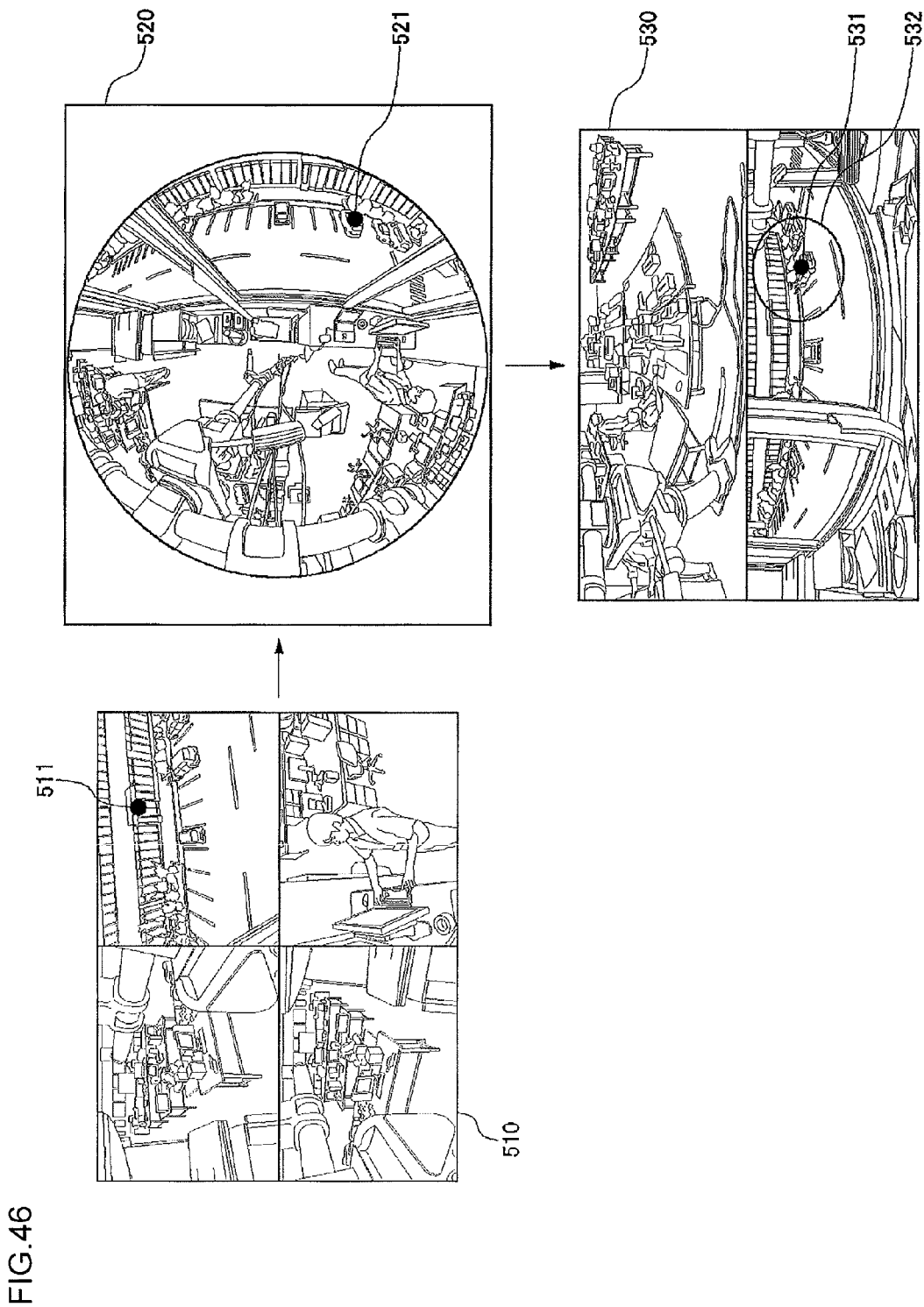
FIG. 46 is a view illustrating an example of image processing in the eighth embodiment of the present technology.

FIG. 46 is a view illustrating an example of the image processing in the present embodiment. With reference to FIG. 46, an example in which the range specification is made on the image, and the image that is subjected to image processing is displayed will be described. A distortion-corrected image 510 is an image including a plurality of portions on an omnidirectional image 520 that are subjected to the cut-out/distortion correction processing by the distortion correction section 382. The user specifies a position 511 for the range specification on the distortion-corrected image 510 through the input section 282.

Then, the coordinate projection section 389 uses the distortion correction parameter for creation of the cut-out/distortion-corrected image 510 from the omnidirectional image 520 to transform the specified position 511 into coordinates 521 on the omnidirectional image 520. Subsequently, the position storage section 388 stores the coordinates 521 obtained after transform.

Subsequently, assume that the user selects the panoramic development as the distortion correction parameter. Then, the display setting section 385 switches the distortion correction parameter from the cut-out/distortion correction to panoramic development. The distortion correction section 382 performs the panoramic development to create a panoramic development image 530. The range generation section 386 uses the coordinates 521 read out from the position storage section 388 and distortion correction parameter to calculate coordinates 531 on the panoramic development image. Subsequently, the range generation section 386 generates, as a range 532, a circle having a prescribed shape such that a point represented by the coordinates 531 is positioned at a center of the circle.

Subsequently, the range application section 383 applies the generated range 532 to the panoramic development image 530. Further, the image processing section 384 performs privacy processing for the range 532. Finally, the image display section 281 displays the image that is subjected to the privacy processing. In specifying the position 511, a circle having a prescribed shape may be displayed, centering on the coordinates 511.

As described above, according to the image processor 380 of the present embodiment, user's specification of only one point on the distortion-corrected image allows achievement of image processing for an arbitrary range on the image. Further, at the time of image processing, the range to be subjected to the image processing always assumes the same shape irrespective of the presence/absence of the distortion correction processing or the parameter type, thereby achieving user-friendly image display.

Figure 47A:
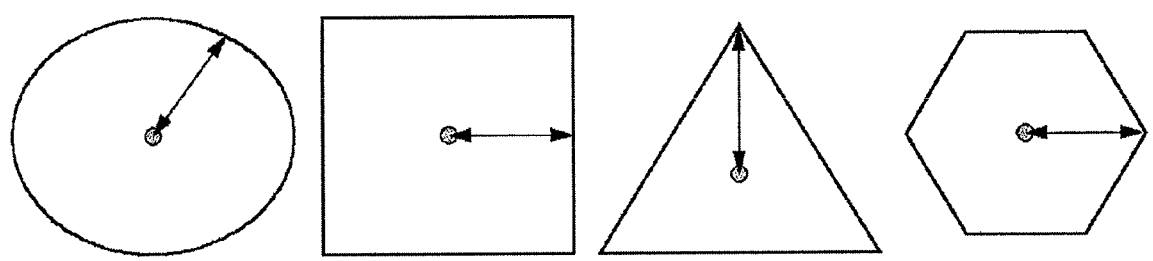
FIG. 47A is a view illustrating an example of range information according to the eighth embodiment of the present technology.
Figure 47B:
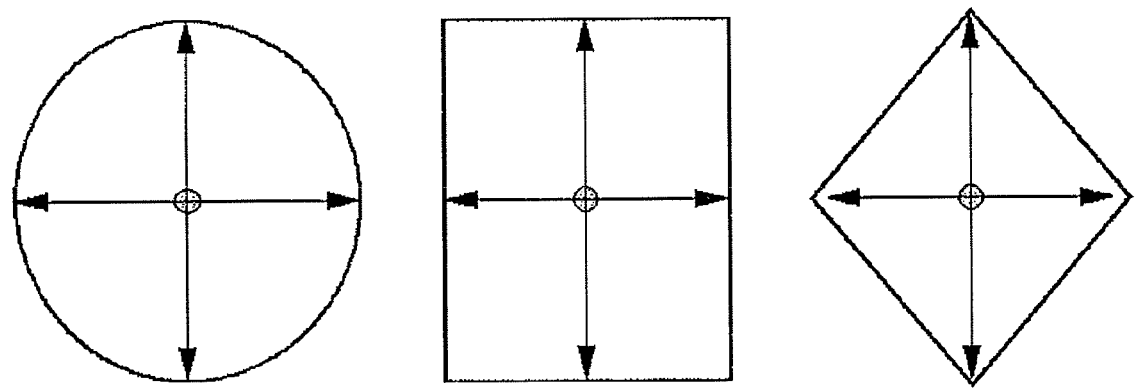
FIG. 47B is a view illustrating an example of range information according to the eighth embodiment of the present technology.

The eighth embodiment of the present technology has thus been described. Various modifications can be made to the eighth embodiment within the scope of the present technology. For example, shapes other than the circle may be used as the range. FIGS. 47A and 47B are views each illustrating an example of the range information according to the eighth embodiment of the present technology. FIG. 47A illustrates a case where a circle, a square, a regular triangle, and a regular hexagon are used as the shape of the range. FIG. 47B illustrates a case where an ellipse, an oblong, and a rhombus are used as the shape of the range.

Figure 48:
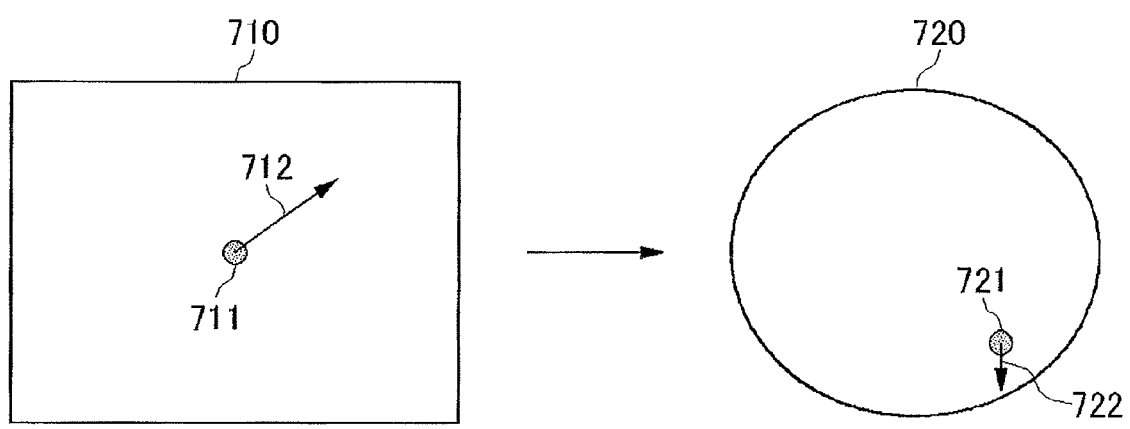
FIG. 48 is a view illustrating an example of specification of a direction of a shape in the eighth embodiment of the present technology.

When the shape other than the circle is used as the range, it is necessary to determine a direction of the shape. As a method of determining the direction, there can be considered a method in which the user specifies also the direction of the shape in performing the position specification, in addition to the position thereof. FIG. 48 is a view illustrating an example of specification of the direction of the shape in the eighth embodiment of the present technology. A reference numeral 710 is a displayed image that is subjected to the distortion correction processing by the distortion correction section 382, and the user specifies a position 711 and a direction 712 as the range specification. Preferably, the user taps the position 711 on a touch panel with his or her finger and slides the finger along the direction 712. In the ellipse illustrated in FIG. 47A, the user may be prompted to determine an aspect ratio of the ellipse. Further, the size of the shape can be set by adjusting a release point of the finger being slid.

Alternatively, as the method for determining the direction, it can be considered a method that sets a certain direction on the image as a default direction and sets the range according to the default direction. Specifically, the direction of the shape may be set such that an arrow in FIG. 47A coincides with a vertical direction of the image.

Further, in the above embodiment, the coordinates on the omnidirectional image are used as the position information; however, any information may be used as long as it can be associated with one point on the omnidirectional image. For example, when distortion correction parameter and the coordinates on the distortion-corrected image may be set as the position information. In this case, it is possible to associate the coordinates on the distortion-corrected image with the coordinates on the omnidirectional image by using the distortion-corrected parameter. Further, coordinates in an absolute space may be obtained by transform for use as the position information.

Further, the size of the shape may be varied according to a zoom magnification of the distortion correction parameter. When the zoom magnification is high (when an object in the image is enlarged for display), the size of the shape is set small; while, when the zoom magnification is low, the size of the shape is set large. Thus, even when the zoom magnification is changed, it is possible to perform image processing for the same target on the image.

Further, in the above embodiment, the omnidirectional image imaging section 181 shoots the omnidirectional image using a fish-eye lens, and the image processor 380 acquires this omnidirectional image; however, the image to be shot is not limited to the omnidirectional image as long as it is an image having distortion that can be corrected.

The first to eighth embodiments have been described as preferred embodiments of the present technology. It can be appreciated that various modifications may be made to the above individual embodiments and that and all such modifications within the spirit and scope of the present technology are included in the appended claims.

Further, a given embodiment and modifications of the given embodiment or other possibilities may be additionally or alternatively applied to another embodiment wherever feasible.

INDUSTRIAL APPLICABILITY

As described above, the present technology has an effect of improving appearance of the masked area included in the distortion-corrected image obtained as a result of the distortion correction processing for the image having distortion and is useful as an image processor or the like for performing the distortion correction processing for the image having distortion, and applying the masking processing to a partial area of the image having distortion.

REFERENCE SIGNS LIST

100 Camera
11 Casing
12 Dome cover
13 Base
14 Optical unit
15 Main board
16 Fish-eye lens
17 Openable/closable cover
18 Mounting bracket
19 Lens holder
20 Packing material
21 Sensor board
22 Through hole
23 Fixing screw
24 MOS holder 25 MOS bracket
26 Fixing screw
28 Support post
29 Fitting boss
27 Coil spring
101 to 103 Shooting system
110, 120, 130 Camera
111 Omnidirectional imaging section
112 Masking data retaining section
113 Masking execution section
114 Cut-out parameter setting section
115 Cut-out/distortion correction section
126 Masking area shaping section
1261 Corrected masking area generation section
1262 Corrected masking area shaping section
1263 Inverse transform/correction section
137 Masking area distortion correction section
138 Masking area shaping section
210, 220, 230 Viewer
211 Masking area detection section
212 Masking area shaping section
213 Output section
104 to 106 Shooting system
140, 150, 160 Camera
141, 151, 161 Omnidirectional imaging section
142, 152, 162 Masking area reception section
143, 253, 163 Masking frame generation section
144, 254, 164 Masking frame superimposing section
145, 154 Masking execution section
146, 155, 167 Cut-out/distortion correction section
147, 156, 168 Synthesis section
153 Cut-out range determination section
165 Masking area distortion correction section
166 Cut-out masking execution section
240, 250, 260 Viewer
241, 251, 261 Input section
242, 252, 262, Masking area determination section
243, 255, 263 Display switching section
244, 256, 264 Display section
107 Shooting system
170 Camera
171 Omnidirectional imaging section
270 input section
370 Image processor
371 Display switching section
372 Range processing section
373 Range storage section
374 Range superimposing section
375 Decision determination section
376 Distortion correction section
377 Image output section
378 Range calculation section
379 Range specification section
108 Shooting system
180 Camera
181 Omnidirectional imaging section
280 Viewer
281 Image display section
282 Input section
380 Image processor
381 Image acquisition section
382 Distortion correction section
383 Range application section
384 Image processing section
385 Display setting section
386 Range generation section
387 Position specification section
388 Position storage section
389 Coordinate projection section

The invention claimed is:

1. A method for processing an image comprising:
receiving an input image having distortion;
receiving position information input by a user on the received input image;
generating a first image by correcting the input image having distortion;
translating a position on the input image having distortion indicated by the received position information into a position on the generated first image;
setting, on the generated first image, a first mask area having a predetermined shape and including the position on the generated first image translated from the position on the input image having distortion; and
performing mask processing on the set first mask area on the generated first image.

2. The method for processing an image according to claim 1, further comprising:
displaying, on display, the generated first image on which the mask processing is performed.

3. The method for processing an image according to claim 1, further comprising:
setting, on the input image, a mask area having a predetermined shape that is the same as the predetermined shape of the first mask area and including the position on the input image having distortion translated into the position on the generated first image; and
performing mask processing on the set mask area on the input image.

4. The method for processing an image according to claim 3, further comprising:
displaying, on a display, the input image on which the mask processing is performed.

5. The method for processing an image according to claim 1, further comprising:
generating a second image, distinct from the first image, by correcting the input image having distortion;
translating the position on the input image having distortion indicated by the received position information into a position on the generated second image;
setting, on the generated second image, a second mask area having a predetermined shape that is the same as the predetermined shape of the first mask area and including the position on the generated second image translated into the position on the input image having distortion; and
performing mask processing on the set second mask area on the generated second image.

6. The method for processing an image according to claim 5, further comprising:
displaying, on a display, the generated second image on which the mask processing is performed.

7. The method for processing an image according to claim 5, wherein
the generated first image comprises a plurality of distortion corrected images, each of the distortion corrected images corresponds to a different portion of the input image having distortion.

8. The method for processing an image according to claim 5, wherein
the generated second image comprises a plurality of distortion corrected images, each of the distortion corrected images corresponds to a different portion of the input image having distortion.

9. The method for processing an image according to claim 8, wherein
the generated first image comprises a plurality of distortion corrected images, each of the distortion corrected images corresponds to a different portion of the input image having distortion, and
the number of the distortion corrected images in the generated first image is greater than the number of the distortion corrected images in the generated second image.

10. The method for processing an image according to claim 5, wherein
the generated first image comprises a plurality of panoramic images, and
the generated second image comprises a plurality of distortion corrected images, each of the distortion corrected images corresponds to a different portion of the input image having distortion designated by a user.

11. The method for processing an image according to claim 5, wherein
a first parameter is used for generating the first image for correcting distortion of the input image, and
a second parameter, distinct from the first parameter, is used for generating the second image for correcting distortion of the input image.

12. The method for processing an image according to claim 1, wherein
the received position information include a coordinate on the input image having distortion, and
the first mask area is set so that the coordinate becomes a center of the predetermined shape.

13. The method for processing an image according to claim 1, wherein
the predetermined shape comprises a circle or a polygonal shape.

14. The method for processing an image according to claim 1, wherein
a first parameter used for generating the first image for correcting distortion of the input image defines a zoom magnification, and
when setting the first mask area, a size of the predetermined shape is determined according to the zoom magnification defined by the first parameter.

15. A system for processing an image comprising:
a processor;
a memory storing instructions, that when executed by the processor, cause the processor to perform operations including:
receiving an input image having distortion;
receiving position information input by a user on the received input image;
generating a first image by correcting the input image having distortion;
translating a position on the input image having distortion indicated by the received position information into a position on the generated first image;
setting, on the generated first image, a first mask area having a predetermined shape and including the position on the generated first image translated from the position on the input image having distortion; and
performing mask processing on the set first mask area on the generated first image.

16. The system for processing an image according to claim 15, the operations further comprising:
setting, on the input image, a mask area having a predetermined shape that is the same as the predetermined shape of the first mask area and including the position on the input image having distortion translated into the position on the generated first image; and
performing mask processing on the set mask area on the input image.

17. The system for processing an image according to claim 15, the operations further comprising:
generating a second image, distinct from the first image, by correcting the input image having distortion;
translating the position on the input image having distortion indicated by the received position information into a position on the generated second image;
setting, on the generated second image, a second mask area having a predetermined shape that is the same as the predetermined shape of the first mask area and including the position on the generated second image translated into the position on the input image having distortion; and
performing mask processing on the set second mask area on the generated second image.

* * * * *